US010332135B2

(12) United States Patent
Tavares et al.

(10) Patent No.: US 10,332,135 B2
(45) Date of Patent: Jun. 25, 2019

(54) FINANCIAL DATA NORMALIZATION SYSTEMS AND METHODS

(75) Inventors: Silvio Tavares, NE Atlanta, GA (US); Susan Fahy, Melville, NY (US); Dennis Carlson, NE Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 791 days.

(21) Appl. No.: 13/412,451

(22) Filed: Mar. 5, 2012

(65) Prior Publication Data

US 2012/0191506 A1   Jul. 26, 2012

Related U.S. Application Data

(63) Continuation-in-part of application No. 13/408,482, filed on Feb. 29, 2012, now Pat. No. 8,781,874, which is a continuation-in-part of application No. 13/314,988, filed on Dec. 8, 2011, now Pat. No. 8,306,846, which is a continuation-in-part of application No. 13/032,878, filed on Feb. 23, 2011, now abandoned, which is a continuation-in-part of application No. 12/758,397, filed on Apr. 12, 2010, now Pat. No. 8,195,500.

(51) Int. Cl.
  *G06Q 30/00* (2012.01)
  *G06Q 30/02* (2012.01)

(52) U.S. Cl.
  CPC ..... *G06Q 30/0202* (2013.01); *G06Q 30/0201* (2013.01)

(58) Field of Classification Search
  None
  See application file for complete search history.

(56) References Cited

U.S. PATENT DOCUMENTS

| | | | |
|---|---|---|---|
| 5,500,513 | A | 3/1996 | Langhans et al. |
| 5,832,458 | A | 11/1998 | Jones |
| 6,078,891 | A | 6/2000 | Riordan et al. |
| 6,151,582 | A | 11/2000 | Huang et al. |
| 6,633,851 | B1 | 10/2003 | Engler et al. |
| 6,839,682 | B1 | 1/2005 | Blume et al. |
| 7,328,169 | B2 | 2/2008 | Temares et al. |

(Continued)

OTHER PUBLICATIONS

International Search Report and Written Opinion of PCT/US2011/032102 dated Oct. 25, 2011, 11 pages.

(Continued)

*Primary Examiner* — Stephanie Z Delich
(74) *Attorney, Agent, or Firm* — Kilpatrick Townsend & Stockton LLP

(57) ABSTRACT

Systems and methods are described for generating indexed sales data by aggregating point of sale (POS) datasets are aggregated from transactions at a plurality of POS terminals. The POS datasets for each transaction include a transaction amount, a merchant classifier, and a transaction time. An industry subset of the aggregated POS datasets is obtained for a given timeframe based on the merchant classifier. This industry subset comprises transactions for a given industry. A sales value is calculated for the industry subset, and a monthly fluctuation factor is applied to the sales value. Also, a normalization factor is applied to the sales value based on a percentage of the sales value relative to an overall market size to obtain the indexed sales value.

19 Claims, 40 Drawing Sheets

(56) References Cited

U.S. PATENT DOCUMENTS

| | | | |
|---|---|---|---|
| 7,451,134 B2 | 11/2008 | Krakowiecki et al. | |
| 7,610,214 B1* | 10/2009 | Dwarakanath et al. | 705/7.31 |
| 7,672,889 B2 | 3/2010 | Brooks | |
| 7,792,697 B2 | 9/2010 | Bhagchandani et al. | |
| 7,853,469 B2 | 12/2010 | Maitland et al. | |
| 7,890,367 B2 | 2/2011 | Senghore et al. | |
| 7,937,286 B2 | 5/2011 | Newman et al. | |
| 8,027,891 B2 | 9/2011 | Preston et al. | |
| 8,195,500 B2 | 6/2012 | Tavares et al. | |
| 8,224,687 B2 | 7/2012 | Tavares et al. | |
| 8,255,268 B2 | 8/2012 | Rane et al. | |
| 8,306,846 B2 | 11/2012 | Tavares et al. | |
| 8,328,094 B2 | 12/2012 | Proud et al. | |
| 8,417,561 B2 | 4/2013 | Ghosh et al. | |
| 2001/0016819 A1 | 8/2001 | Kolls | |
| 2002/0026348 A1 | 2/2002 | Fowler et al. | |
| 2002/0073006 A1* | 6/2002 | Goldman | 705/35 |
| 2002/0082920 A1 | 6/2002 | Austin et al. | |
| 2002/0116252 A1 | 8/2002 | Saito et al. | |
| 2003/0018550 A1 | 1/2003 | Rotman et al. | |
| 2003/0216981 A1 | 11/2003 | Tillman | |
| 2004/0088221 A1 | 5/2004 | Katz et al. | |
| 2004/0225556 A1 | 11/2004 | Willen et al. | |
| 2004/0230472 A1 | 11/2004 | Venkat et al. | |
| 2004/0260607 A1* | 12/2004 | Robbins et al. | 705/14 |
| 2005/0090911 A1 | 4/2005 | Ingargiola et al. | |
| 2005/0091146 A1 | 4/2005 | Levinson | |
| 2006/0143072 A1 | 6/2006 | Herman et al. | |
| 2006/0151598 A1 | 7/2006 | Chen et al. | |
| 2006/0218278 A1* | 9/2006 | Uyama et al. | 709/226 |
| 2007/0050229 A1 | 3/2007 | Tatro et al. | |
| 2007/0055597 A1 | 3/2007 | Patel et al. | |
| 2007/0083430 A1 | 4/2007 | Summer | |
| 2007/0100728 A1* | 5/2007 | Rotman et al. | 705/36 R |
| 2007/0179836 A1 | 8/2007 | Juang et al. | |
| 2008/0033587 A1 | 2/2008 | Kurita et al. | |
| 2008/0262900 A1* | 10/2008 | Duffy et al. | 705/10 |
| 2008/0270363 A1 | 10/2008 | Hunt et al. | |
| 2008/0313017 A1* | 12/2008 | Totten | 705/10 |
| 2009/0006151 A1 | 1/2009 | Zarghami et al. | |
| 2009/0048884 A1 | 2/2009 | Olives et al. | |
| 2009/0276293 A1 | 11/2009 | Zellner et al. | |
| 2009/0299536 A1 | 12/2009 | Beekhuis | |
| 2009/0319931 A1 | 12/2009 | Hutchings et al. | |
| 2009/0327045 A1 | 12/2009 | Olives et al. | |
| 2010/0070376 A1 | 3/2010 | Proud et al. | |
| 2010/0076813 A1 | 3/2010 | Ghosh et al. | |
| 2010/0287029 A1 | 11/2010 | Dodge et al. | |
| 2011/0035278 A1 | 2/2011 | Fordyce, III et al. | |
| 2011/0035280 A1 | 2/2011 | Fordyce, III et al. | |
| 2011/0060753 A1 | 3/2011 | Shaked et al. | |
| 2011/0087519 A1 | 4/2011 | Fordyce, III et al. | |
| 2011/0087546 A1 | 4/2011 | Fordyce, III et al. | |
| 2011/0087547 A1 | 4/2011 | Amaro et al. | |
| 2011/0087550 A1 | 4/2011 | Fordyce, III et al. | |
| 2011/0093327 A1 | 4/2011 | Fordyce, III et al. | |
| 2011/0093335 A1 | 4/2011 | Fordyce, III et al. | |
| 2011/0184822 A1 | 7/2011 | Matkovic | |
| 2011/0191234 A1 | 8/2011 | Kiron | |
| 2011/0196754 A1 | 8/2011 | Proud et al. | |
| 2011/0251870 A1 | 10/2011 | Tavares et al. | |
| 2011/0251907 A1 | 10/2011 | Tavares et al. | |
| 2012/0084117 A1 | 4/2012 | Tavares et al. | |
| 2012/0089436 A1 | 4/2012 | Tavares et al. | |
| 2012/0089438 A1 | 4/2012 | Tavares et al. | |
| 2012/0215589 A1 | 8/2012 | Tavares et al. | |
| 2012/0233090 A1 | 9/2012 | Tavares et al. | |
| 2013/0151344 A1 | 6/2013 | Tavares et al. | |

OTHER PUBLICATIONS

Ahmed, "Applications of Data Mining in Retail Business" Proceedings of the International Conference on Information Technology: Coding and Coputing (ITCC'04), Computer Society, 2004, 5 pages.

Author Unknown, "December Transaction Growth Was Healthy," SpendTrend, Edition: Dec. 2009, Jan. 11, 2010, 4 pages, First Data Corporation.

Fox, et al., "Consumer Shopping and Spending Across Retail Formats," Journal of Business, Jan. 2001, 58 pages.

Author Unknown, "SpendTrend—December Transaction Growth Was Healthy: Dec. 2009 Edition", First Data Corporation (Jan. 11, 2010).

Bolt, W., et al., "Incentives at the counter: An empirical analysis of surcharging card payments and payment behaviour in the Netherlands", *Journal of Banking & Finance* vol. 34, Issue 8 (2010): pp. 1738-1744.

Borzekowski, R. and Elizabeth K. Kiser, "The choice at the checkout: Quantifying demand across payment instruments", *International Journal of Industrial Organization*, vol. 26, Issue 4 (2008): pp. 889-902.

Ching, Andrew T., and Fumiko Hayashi, "Payment card rewards programs and consumer payment choice", *Journal of Banking & Finance* vol. 34.8 (2010): pp. 1773-1787.

Hong, Ilyoo B., "A new framework for interorganizational systems based on the linkage of participants' roles", *Information & Management* vol. 39.4 (2002): pp. 261-270.

Klee, E., "Families' use of payment instruments during a decade of change in the US payment system", *Finance and Economics Discussion Paper* Jan. 2006, Board of Governors of the Federal Reserve System, United States of America (2006).

Markose, Sheri M., and Yiing Jia Loke. "Network Effects on Cash-Card Substitution in Transactions and Low Interest Rate Regimes", *The Economic Journal of the Royal Economic Society* vol. 113, No. 487 (2003): pp. 456-476.

Simon, J., et al., "Price incentives and consumer payment behaviour", *Journal of Banking & Finance* vol. 34, Issue 8 (2010): pp. 1759-1772.

Mulhern, F. J., "Retail marketing: From distribution to integration," *International Journal of Research in Marketing*, vol. 14, (1997):pp. 103-124.

M2 Presswire, "Research and Markets: UK Retail Finance 2002." *ProQuest*. 2003. Retrieved on Apr. 18, 2012 from http://proquest.umi.com/pqdweb?did=293384461&sid=5&Fmt=3&clientId=19649&RQT=309&Vname=PQD.

* cited by examiner

| MERCHANT OUTLET | DAY | | DAILY TOTAL |
|---|---|---|---|
| GAS STATION DALLAS | 1 | TRANSACTION | 4 |
| GAS STATION DALLAS | 1 | $ VOLUME | $138.89 |
| GAS STATION DALLAS | 2 | TRANSACTION | 4 |
| GAS STATION DALLAS | 2 | $ VOLUME | $106.38 |
| GAS STATION BOSTON | 1 | TRANSACTION | 4 |
| GAS STATION BOSTON | 1 | $ VOLUME | $147.7 |
| GAS STATION BOSTON | 2 | TRANSACTION | 4 |
| GAS STATION BOSTON | 2 | $ VOLUME | $135.22 |
| GENERAL MERCH DENVER | 1 | TRANSACTION | 5 |
| GENERAL MERCH DENVER | 1 | $ VOLUME | $160.24 |
| GENERAL MERCH DENVER | 2 | TRANSACTION | 5 |
| GENERAL MERCH DENVER | 2 | $ VOLUME | $129.24 |
| GENERAL MERCH ATLANTA | 1 | TRANSACTION | 5 |
| GENERAL MERCH ATLANTA | 1 | $ VOLUME | $247.58 |
| GENERAL MERCH ATLANTA | 2 | TRANSACTION | 5 |
| GENERAL MERCH ATLANTA | 2 | $ VOLUME | $145.58 |

FIG.10B

➜ ACTIVATIONS BY INDUSTRY

ACTIVATION DOLLAR VOLUME GROWTH SLOWS TO 2.0%
DECEMBER DOLLAR VOLUME GROWTH IN ACTIVATIONS WAS 2.0%, A DECREASE FROM NOVEMBER'S STRONG GROWTH OF 8.6%. SPECIALTY RETAIL DOLLAR VOLUME GROWTH WAS -1.1% IN DECEMBER AFTER POSTING A 7.3% INCREASE IN NOVEMBER. CONSUMERS APPEAR TO HAVE PURCHASED THE BULK OF THEIR GIFT CARDS EARLY IN THE HOLIDAY SHOPPING SEASON.

| | Q1 10 | Q2 10 | Q3 10 | NOV 10 | DEC 10 |
|---|---|---|---|---|---|
| TOTAL | 2.6% | 6.4% | 4.6% | 8.6% | 2.0% |
| SPECIALTY RETAIL | 8.4% | 12.1% | 13.1% | 7.3% | -1.1% |
| CASUAL DINING | 4.1% | 5.2% | 1.4% | 8.1% | 8.9% |
| QSR | 12.6% | 15.0% | 11.2% | 16.5% | 11.9% |

DOLLAR VOLUME GROWTH IN GIFT CARD ACTIVATIONS BY INDUSTRY

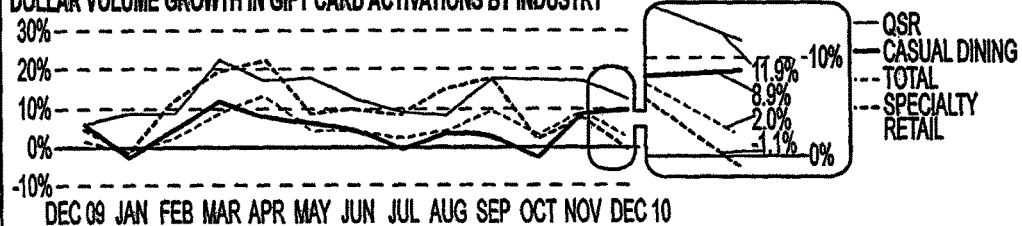

ACTIVATION TRANSACTION GROWTH SLOWS
OVERALL YEAR-OVER-YEAR TRANSACTION GROWTH WAS 2.1% IN DECEMBER, ENDING THREE CONSECUTIVE MONTHS OF DOUBLE-DIGIT INCREASES. SPECIALTY RETAILERS SAW ACTIVATION TRANSACTION GROWTH DECLINE -5.9%. THIS MARKED THE LOWEST YEAR-OVER-YEAR TRANSACTION GROWTH FOR SPECIALTY RETAIL SINCE JANUARY 2010.

| | Q1 10 | Q2 10 | Q3 10 | NOV 10 | DEC 10 |
|---|---|---|---|---|---|
| TOTAL | 2.7% | 2.7% | 3.9% | 10.0% | 2.1% |
| SPECIALTY RETAIL | 8.3% | 2.7% | 6.2% | 4.4% | -5.9% |
| CASUAL DINING | 7.0% | 5.4% | 2.8% | 9.1% | 9.1% |
| QSR | 10.7% | 13.7% | 10.8% | 15.6% | 9.0% |

TRANSACTION GROWTH IN GIFT CARD ACTIVATIONS BY INDUSTRY

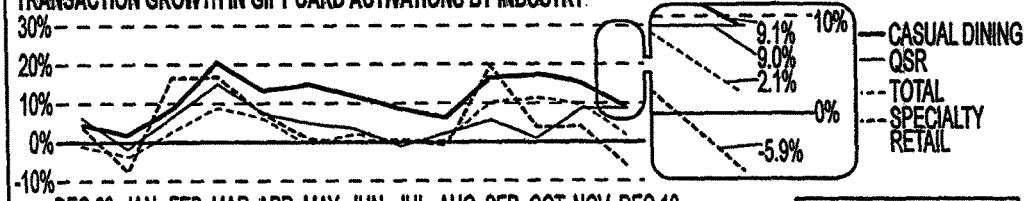

ACTIVATION AVERAGE TICKETS CONTINUE TO IMPROVE
THE AVERAGE TICKETS ON ACTIVATIONS WERE DOWN -0.1% IN DECEMBER, WHICH MARKS THE SECOND CONSECUTIVE MONTH OF IMPROVEMENT FROM OCTOBER'S LOW OF -8.0%. THE DEEP DISCOUNTING CONDUCTED BY MERCHANTS THIS HOLIDAY SEASON KEPT AVERAGE TICKET VALUES DOWN.

| | Q1 10 | Q2 10 | Q3 10 | NOV 10 | DEC 10 | DEC 09 | DEC 10 |
|---|---|---|---|---|---|---|---|
| TOTAL | -0.1% | 3.6% | 0.7% | -1.3% | -0.1% | $29.81 | $29.79 |
| SPECIALTY RETAIL | 0.0% | 9.2% | 6.5% | 2.8% | 5.1% | $43.27 | $45.47 |
| CASUAL DINING | -2.7% | -0.2% | -1.4% | -0.9% | -0.2% | $28.58 | $28.52 |
| QSR | 1.6% | 1.2% | 0.3% | 0.7% | 2.7% | $13.68 | $14.06 |

AVERAGE TICKET GROWTH IN GIFT CARD ACTIVATIONS BY INDUSTRY

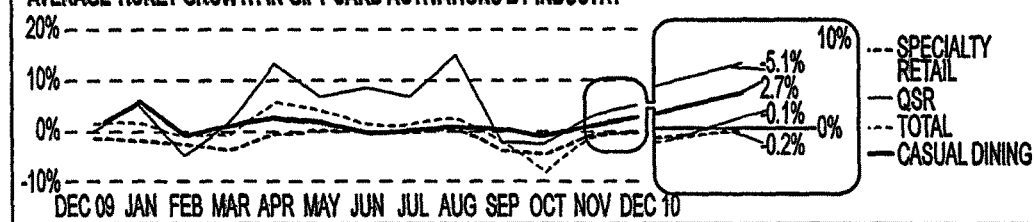

FIG.34

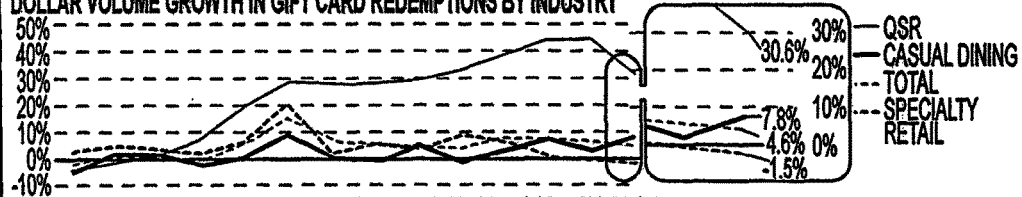
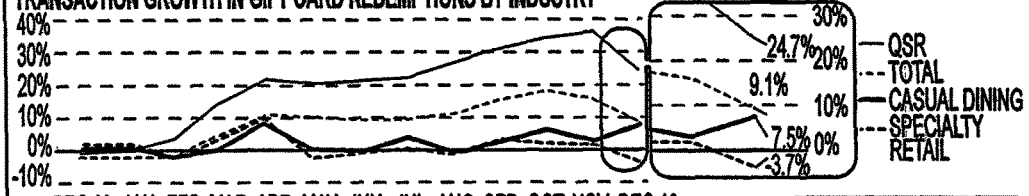
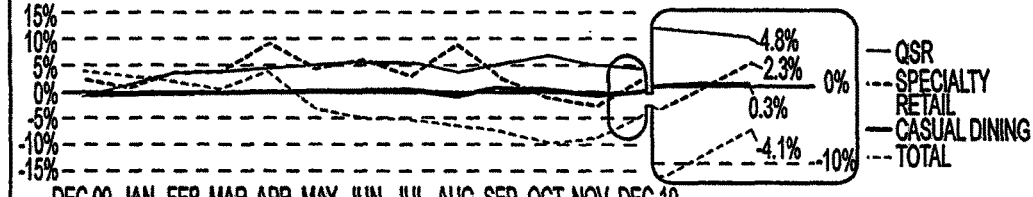
FIG.35

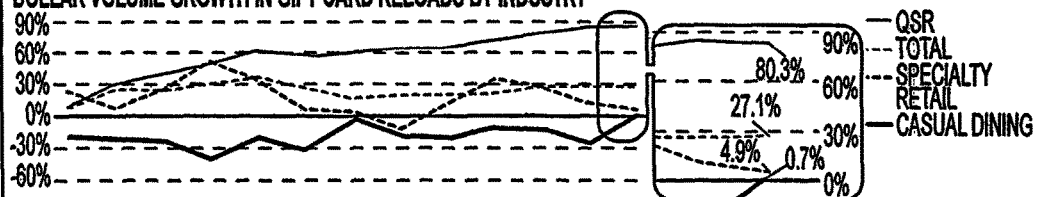
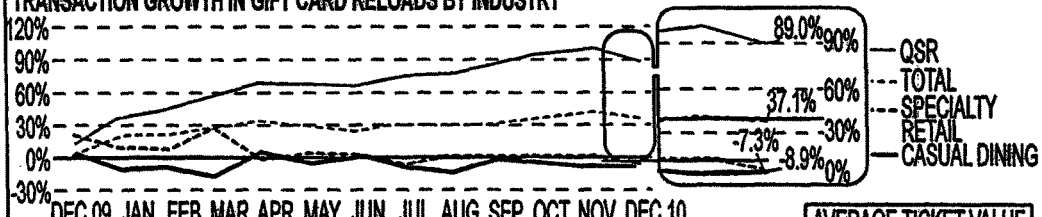
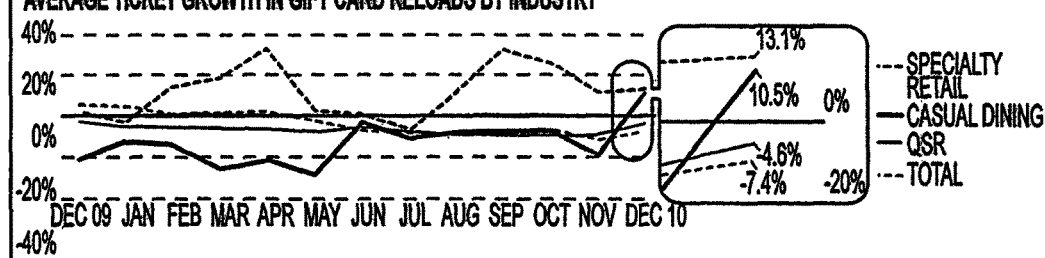
FIG.36

FINANCIAL DATA NORMALIZATION SYSTEMS AND METHODS

CROSS REFERENCES TO RELATED APPLICATIONS

This application is a continuation in part application and claims the benefit of copending U.S. patent application Ser. No. 13/408,482, filed Feb. 29, 2012, which is a continuation in part application of copending U.S. patent application Ser. No. 13/314,988, filed Dec. 8, 2011, which is a continuation-in-part of U.S. patent application Ser. No. 13/032,878, filed Feb. 23, 2011, which is a continuation-in-part of U.S. patent application Ser. No. 12/758,397, filed Apr. 12, 2010, the complete disclosure of which is herein incorporated by reference.

FIELD

The present invention relates, in general, to market tracking and reporting and, more particularly, to market tracking and reporting using aggregated point-of-sale data.

BACKGROUND

Market trends may result from many types and levels of factors. For example, markets may be affected by various macro- and micro-economic trends, seasonal trends, social trends, corporate trends, etc. Each of these trends may, in turn, be affected by many other types of trends. As such, it may be difficult to develop meaningful data about many markets without supplementing large amounts of diverse types of market data with extensive amounts of data mining, analysis, and assumptions.

Typically, public and private entities may indirectly obtain market data through interviews and/or other techniques. For example, a government employee may contact representative merchant locations to ask about overall performance for a given timeframe (e.g., the past month). Investors may then obtain and analyze this indirect market information in making investment decisions.

These and other techniques, however, may provide limited market information. For example, interviewed merchants or merchant locations may provide inaccurate information, may not actually be representative of the market, etc. Further, delays in obtaining these types of market data may be undesirable for investors and/or other stakeholders.

BRIEF SUMMARY

In one embodiment, the invention provides an exemplary method for normalizing POS sales data for selected timeframes. According to the method, point of sale (POS) datasets are aggregated from a plurality of POS terminals. Each POS terminal is configured to collect transaction data as a function of transactions effectuated via the POS terminal. Further, the POS datasets for each transaction comprise a transaction amount, a merchant classifier, and a transaction time. An industry subset of the aggregated POS datasets is obtained for a given timeframe based on the merchant classifier. This industry subset comprises transactions for a given industry.

A sales value is calculated for the industry subset, and a time-based fluctuation factor is applied to the sales value to account for sales fluctuations that are related at least in part to seasonality. Also, a normalization factor is applied to the sales value based on a percentage of the sales value relative to an overall market size to obtain an indexed sales value for the given timeframe.

This indexed sales value permits realistic sales growth comparisons between different timeframes with certain factors, such as seasonality, eliminated. For example, the given timeframe may comprise a calendar month, and the index may be compared against the index for another calendar month.

In some cases, the sales value index may be used to predict future sales. In such cases, seasonality affects can be reintroduced to predict the future sales.

The projected sales volume may be shown in dollars. Or, in some cases, a scaling factor may be applied to the projected sales volume to provide an indexed value.

In another aspect, the monthly fluctuation factor is calculated by using a time series of historical daily data (such as sales) to project the expected monthly fluctuation factor. Additionally, seasonal events (such as holidays and other events) are taken into account for a given month. All fluctuation factors may be balanced against a norm of 1, so a fluctuation factor less than 1 suggests a month will have less spend than the average month while a fluctuation factor greater than 1 suggests a month will have more spend than the average month.

In another embodiment, the invention provides an exemplary system for projecting future sales data. The system may optionally include an aggregation subsystem that is communicatively coupled with a point of sale (POS) network that in turn comprises a plurality of POS terminals. The POS network is configured to aggregate POS datasets from the plurality of POS terminals, where each POS terminal is configured to collect transaction data as a function of transactions effectuated via the POS terminal. The POS datasets for each transaction comprise a transaction amount, a merchant classifier, and a transaction time.

The system may also include a data storage subsystem that is communicatively coupled with the aggregation subsystem and is configured to store the aggregated POS data from the plurality of POS terminals. The system may further include a processing subsystem that is communicatively coupled with the data storage subsystem. The processing subsystem normalizes sales data for a given timeframe by obtaining an industry subset of the aggregated POS datasets for a given timeframe based on the merchant classifier. The industry subset comprises transactions for a given industry. A sales value is calculated for the industry subset, and a time-based fluctuation factor is applied to the sales value to account for certain time based fluctuations that are due to factors such as seasonality, holidays or other specific events that would impact spending behavior, general industry growth, and the like. A normalization factor is applied to the sales value based on a percentage of the sales value relative to an overall market size to obtain an indexed sale value.

In one aspect, the processing subsystem is further configured to calculate the indexed sales value in dollars. The processing subsystem may also be further configured to apply a scaling factor to the indexed sales value.

In some cases, the given timeframe comprises a calendar month to permit sales comparisons between different months. Also, future monthly sales may be projected based on trends for indexes of previous months. In one aspect, the monthly fluctuation factor is calculated by using a time series of historical daily data from the POS transaction data to project the expected monthly fluctuation factor. Additionally, seasonal events (such as holidays and other events) are taken into account for a given month. All fluctuation factors may be balanced against a norm of 1, so a fluctuation factor less than 1 suggests a month will have less spend than the average month while a fluctuation factor greater than 1 suggests a month will have more spend than the average month.

Among other things the invention also provides systems and methods for tracking and/or reporting market trend data according to point-of-sale (POS) data.

In one embodiment, market trend reports may be generated by aggregating POS datasets from a plurality of POS terminals. Each POS terminal is associated with terminal data that can be used to identify a merchant associated with a transaction. Each POS terminal is also configured to collect transaction data as a function of transactions effectuated via the POS terminal. The POS dataset for each of the POS terminals can be defined in terms of the terminal data and the transaction data. Requests may be received to generate a market trend report corresponding to a given market. A market dataset is identified from the aggregated POS data, and market trend data is generated from the market dataset. Further, graphical report data can be output as a function of the market trend data and is usable by a user device to display a market trend report.

In one aspect, the graphical report data permits the display of a growth comparison comprising the growth of the given market as compared to a previous time, such as a growth comparison from one moth of the year to the same month of the following year. In another aspect, the graphical report data permits the display of the growth comparison over a certain amount of time using a line graph. In this way a display of multiple months (as compared to previous months) may be displayed in a single graph.

The given market may comprise one or more industries, and the market dataset may be identified by mapping the merchant identifier to a certain industry. The given market could also comprise one or more geographical regions, and the market dataset may be identified by determining a geographical region where the POS terminals are located, such as, for example, by zip code. The graphical report data may also permit a numeric display of a growth percentage at a snapshot in time. This numeric display may be superimposed over a map of the geographic region. In a further aspect, the given market may comprise one or more payment instrument types, and the market dataset may be identified by a payment type identifier. A variety of payment instrument types may be used, such as credit payment instruments, debit payment instruments, open loop prepaid payment instruments, closed loop prepaid payment instruments, mobile payment instruments, e-commerce payment instruments and the like.

The graphical report data may also permit a numeric display at a snapshot in time of a growth percentage. This display may be superimposed over a line graph of the growth, such as when moving a pointer over the line graph. In some cases, a user may request to see only certain industries. The graphical report data may be modified to show the selected industries.

In some embodiments, the user may request to see the growth of certain industries by geographical region. The graphical report data may be modified to show the industry growth by geographical region. In other embodiments, the user may wish to see only certain payment instrument types, and the graphical report data may be modified to show the selected payment instrument types.

In another aspect, the user may wish to see a certain type of growth comparison, such as the dollar volume of growth, average ticket item growth or growth in the number of transactions. A graphical report data may be output to display the requested type of growth comparison.

In another option, the graphical report data permits the display of a growth comparison for a given merchant. The growth comparison comprises the growth of the given market for the given merchant as compared to a previous time. Optionally, the graphical report data further permits the display of the growth comparison for the given merchant along with a growth comparison for an aggregation of similarly situated merchants. Conveniently, this may be provided as part of a regular statement that is send to a merchant.

Another feature is the ability to include macroeconomic data that is relevant to the market trend report. A correlation is made between a trend event and the macroeconomic data, and the graphical report data describes this correlation.

In certain embodiments, the reports relate to closed-loop pre-paid payment instruments. In such cases, the report may show activations of the pre-paid instruments, such as by displaying activations by industry or geographical region. Further, activations may be shown by dollar volume of growth, average ticket item growth or by growth in the number of transactions. Reports may also be generated to show redemptions or reloads associated with the pre-paid instruments.

The invention further provides an exemplary system for market reporting suing point-of-sale (POS) data. The system includes an aggregation subsystem that is communicatively coupled with a POS network comprising a plurality of POS terminals. The aggregation subsystem is configured to aggregate POS datasets from the POS terminals. Each POS terminal is associated with terminal data that in turn is associated with a merchant identifier. Each POS terminal is configured to collect transaction data as a function of transactions effectuated via the POS terminal. The POS dataset for each of the POS terminals comprises the terminal data and the transaction data.

The system further comprises a data storage subsystem that is communicatively coupled with the aggregation subsystem and is configured to store the aggregated POS data from the POS terminals. A trend processing subsystem is communicatively coupled with the POS data store and is configured to generate a market trend for a market. This is done by identifying a market dataset from the aggregated POS data, and generating market trend data from the market dataset. A reporting subsystem is communicatively coupled with the trend processing subsystem and is configured to output graphical report data as a function of the market trend data in response to the reporting request.

Embodiments use actual aggregated data (e.g., transaction and terminal data) from a large number of POS terminals to generate macro-level trends for merchants, merchant types, geographical regions, markets, market segments, etc. For example, POS datasets are aggregated from a number of POS terminals, each located at a merchant outlet location, such that each POS dataset includes location data and transaction data for its respective POS terminal. A reporting request is received for a market trend report corresponding to a designated market over a designated timeframe. A market dataset is identified from the portion of the aggregated POS data corresponding to the designated timeframe and market. Unreliable portions of the data may be discarded. Market trend data is then calculated as a function of the reliable portion of the market dataset, and graphical report data is output as a function of the market trend data in response to the reporting request.

In one set of embodiments, a system is provided for market reporting according to point-of-sale (POS) data. The system includes an aggregation subsystem, a data storage subsystem, a trend processing subsystem, and a reporting subsystem. The aggregation subsystem is in communication with a POS network having a number of POS terminals, and is configured to aggregate POS datasets from the POS terminals in the POS network. Each POS terminal is disposed at a merchant associated with terminal data indicating at least one of a number of merchant identifiers and at least one of a number of merchant classifiers, and each is configured to collect transaction data as a function of transactions effectuated via the POS terminal. The POS dataset for each of the POS terminals includes the terminal data and the transaction data for the respective POS terminal.

The data storage subsystem is in communication with the aggregation subsystem and is configured to store the aggregated POS data from one of the POS terminals in the POS network. The trend processing subsystem is in communication with the POS data store and is configured to generate a market trend for a market over a timeframe by: identifying a market dataset from the aggregated POS data, the market dataset including the POS datasets corresponding to the timeframe and to POS terminals having terminal data indicating a merchant classifier corresponding to the market; calculating a reliable portion of the market dataset as a function of the POS datasets in the market dataset; and generating the market trend as a function of the reliable portion of the market dataset. The reporting subsystem is in communication with the trend processing subsystem and is configured to output graphical report data as a function of the market trend generated by the trend processing system. The graphical report data is configured to be displayed on a user device.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 10A-10D illustrate an example of an illustrative data flow, according to one embodiment.

FIG. 34 illustrates a market trend report showing activations of closed loop prepaid payment instruments by industry.

FIG. 35 illustrates a market report showing redemptions by industry for closed loop prepaid transaction instruments.

FIG. 36 illustrates a market report that shows reloads by industry for closed loop prepaid payment instruments.

DETAILED DESCRIPTION OF THE INVENTION

Figure 1:
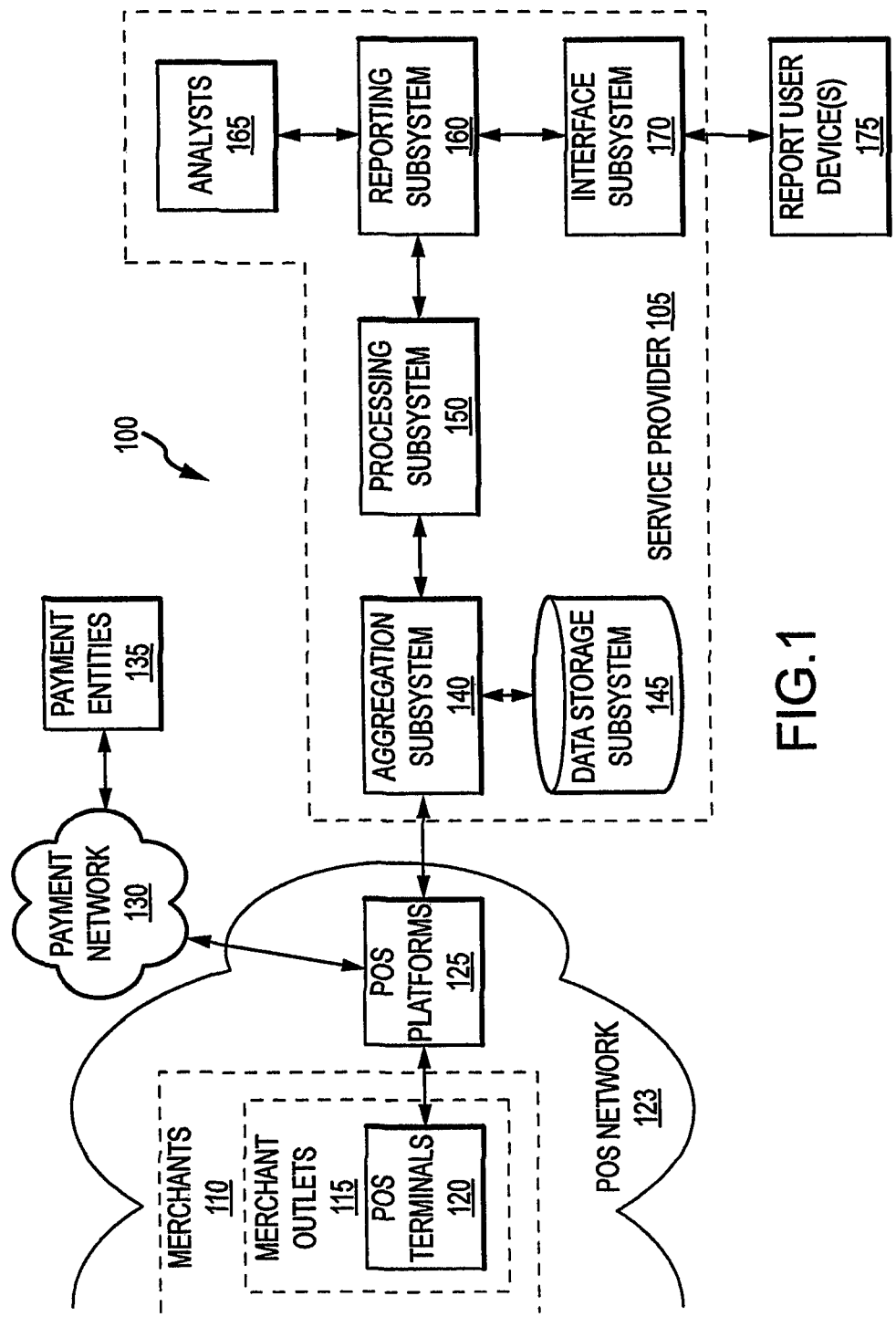
FIG. 1 shows a block diagram of an illustrative market network, according to various embodiments.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

It is well appreciated by investors, consumers, corporate officers, and other market participants that understanding various states and trends of markets can prove extremely valuable. It is also well appreciated by market participants that it may be difficult, or even impossible, to get a complete and accurate picture of many markets. For example, many market trends typically result from a large number of factors having varying types and magnitudes of effects on the market at issue. Further, many of these factors depend on data that may be difficult or impossible to obtain, including, for example, certain types of proprietary data, data from diverse and often-unreliable sources, etc.

In one typical example, market trends are generated by collecting data from a number of indirect sources. Public and private agencies may contact representative merchant locations to ask about overall performance for a given timeframe (e.g., the past month), various market reporters may gather rumors, speculation, and snippets of data from multiple sources, etc. Investors and analysts may then cull this indirect market information to make educated guesses about current and future market positions.

Notably, many typical techniques for gathering market data may provide limited and/or undesirable results. For example, interviews, rumors, and speculation all have a potential of generating inaccurate information, information that is not representative of the market (e.g., information restricted to a subset of market participants, to a particular geographic region, etc.), etc. Additionally, much of these types of information can only be gathered retrospectively (e.g., a merchant location may only be able to accurately answer questions about its performance for a month after the books have been closed for the month). As such, there may be delays in obtaining these data, which may be undesirable for investors and/or other stakeholders.

Among other things, embodiments described herein exploit actual transaction data aggregated from point-of-sale (POS) terminals to generate and report market trend data. In some embodiments, data from very large numbers of POS terminals are used to generate complete and accurate market trend data in a substantially timely fashion, for example in comparison to using interviews, sample surveys, and/or other indirect techniques.

For example, the transaction data from the POS terminals may be used to look for certain trends, such as to see whether sales are increasing or decreasing, or to predict or project future sales based on previous sales. To do so, a variety of factors need to be considered. For instance, merely taking one month's sales data and using that to determine a change from a previous month or to predict what will happen in a future month is usually not accurate, even if a difference in the number of days for each month is taken into account. This is because of seasonality as well as other monthly factors will influence sales data. As one example, October sales will often be a poor predictor of November sales because of the increased retail sales at the end of November due to the upcoming Christmas holiday. Accordingly, in some aspects, the invention provides various "monthly factors" that may be applied to a given month in order to permit a given month's sales data to be compared with that of other months. Although described in terms of monthly factors, it will be appreciated that such factors could be used for any defined timeframe.

The monthly factors may be derived based on a number of considerations. Such considerations may include time series of historical daily data from the POS transaction data, external data sources such as historical macroeconomic indicators, indication of specific events, either positive or negative that may have occurred, and the like.

Another issue in using aggregated POS data to predict future sales is that the aggregated POS data may not include all POS data for the relevant geography. For example, the collected and aggregated POS data may be only a percentage of all transactions that occur in the United States, such as, for example, forty percent. In order to predict a total sales volume, another normalization factor may need to be applied based on the percentage of the collected POS transaction data relative to the total market size.

Turning first to FIG. 1, a block diagram of an illustrative market network 100 is shown, according to various embodiments. As illustrated, a service provider 105 is in communication with a number of POS terminals 120 that are in further communication with a payment network 130. Transactions are effectuated via the POS terminals 120 (e.g., using payment cards and/or other known forms of payment). In some embodiments, payment entities 135 interact with the payment network 130, for example, to perform various authorization and/or other functions relating to the transactions. Data from the transactions may be aggregated by the service provider 105 for use in generating market report data. In some embodiments, one or more report user devices 175 are in communication with the service provider 105, for example, to exploit the generated market report data.

Use of POS terminals 120 in effectuating transactions is well known in the art. As such, and for the sake of clarity, specific operations of POS terminals 120, POS networks 123, payment networks 130, payment entities 135, etc. will not be fully described herein. Rather, these and related terms and phrases should be broadly construed to include any transaction facilitating devices, systems, and techniques that are useable in the context of the various embodiments described herein.

For example, as used herein, POS terminals 120 may include cash registers, and any other alternative and/or peripheral devices or systems, including hardware and/or software, for effectuating transactions between a merchant and a consumer. POS platforms 125, as used herein, include any hardware and/or software for facilitating communications between one or more POS terminals 120 and the payment network 130 and/or service provider 105. In one embodiment, the POS platforms 125 include proprietary platforms, such as merchant platforms offered by First Data Corporation. In some embodiments, one or more interfaces are included with the POS terminals 120 and/or the POS platforms 125 to facilitate use by end consumers (e.g., cardholders, payors, etc.), salespersons, etc. The POS network 123, as used herein, is intended to broadly include any type of physical or virtual network, including one or more communications networks, corporate networks, etc. For example, a large number of globally distributed POS terminals 120 may, in some embodiments, be considered as part of a global POS network 123, even where some or all of the POS terminals 120 in the POS network 123 may not be in communication with one another.

As used herein, "POS terminals" are intended to include both physical terminals located at brick and mortar locations as well as virtual terminals (some type of computer system) capable of receiving and processing transaction requests. For example, financial transactions occurring other than at brick and mortar locations can include Internet transactions (typically involving a merchant web site or other payment portal, such as PayPal), mobile transactions made using a mobile device or phone, and the like. For these transactions, payment information is transmitted over some type of network to a computer system that is capable of receiving such transactions and then processing them to complete the financial transaction. It will be appreciated, however, that some transactions using mobile devices (such as mobile phones, iPads, and the like) can be made by directly or indirectly interfacing with POS terminals located in brick and mortar locations as well.

The POS terminals located at brick and mortar locations can capture transaction data in a number of ways, including by the use of payment cards with magnetic stripes, smart chips, RF transponders (RFID chips) or the like. The POS terminals can also read transaction information from non-traditional "cards", such as when reading information from checks or other negotiable instruments, such as by reading MICR lines, by the use of OCR scanners, by manually keying in data, or the like. Further, various communication channels can be used to transmit data from the payment vehicle to the POS terminal, such as by Bluetooth, cellular, RF, and the like. These configurations permit payments to be made using a variety of payment vehicles, including by credit cards, debit cards, checks or other negotiable instruments, ACH transaction, prepaid cards or accounts, stored value cards or accounts, and the like. In each of these, the appropriate information will be captured from the transaction at the POS terminal so that reports may be produced as described herein.

Hence, when receiving the transaction data, the POS terminals capture data pertinent to conducting a transaction, such as the amount of the transaction, the payment instrument or vehicle, the time of the transaction, and the like. The POS terminals also provide information on the location of the POS device (or location of the merchant—by physical address, web site or the like) as described hereinafter.

As illustrated, some or all of the POS terminals 120 may be located at (e.g., inside, on the property of, in close proximity to, etc.) a merchant outlet 115. The merchant outlet 115 may be the only one, or one of many, locations of a particular merchant 110. For example, each merchant outlet 115 may be a physical store location, a franchise location, a branch office, virtual presence, etc. of a merchant 110. Of course, where the merchant 110 has only a single presence, the merchant outlet 115 and the respective merchant 110 may be one and the same.

Embodiments of the POS terminals 120 are configured to be associated with certain types of information and to collect certain types of information. For example, each POS terminal 120 may collect and/or be associated with terminal information and transaction information, as described more fully below. The transaction and terminal information may be sent to the POS platforms 125 for various types of processing. For example, some or all of the information may be sent to the payment network 130 for authorization by one or more payment entities 135 (e.g., issuing banks, payment card companies, etc.), and/or the information may be sent to the service provider 105.

Functions of the service provider 105 may be carried out by one or more subsystems. In various embodiments, components of the subsystems are implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, data from all the POS terminals 120 is received and aggregated by an aggregation subsystem 140. The aggregation subsystem 140 generates and stores aggregated POS datasets in a data storage subsystem 145. Embodiments of the data storage subsystem 145 may include any useful type of data storage. For example, the data storage subsystem 145 may include servers, hard disks, etc. Further, the aggregated data may be stored using any useful types of security, data structure, etc. In one embodiment, the aggregated data is stored as an associative database to facilitate various types of data processing functions (e.g., mining, filtering, sorting, etc.).

In some embodiments, as described more fully below, the aggregated data may be processed by a processing subsystem 150. Embodiments of the processing subsystem 150 are configured to generate various types of market trend and/or other data for use by a reporting subsystem 160. Embodiments of the reporting system 160 use the data generated by the processing subsystem 150 to generate one or more types of market reports. In some embodiments, additional information is used to generate reports, including data received from one or more analysts 165 and/or other data sources.

The service provider 105 may further include an interface subsystem 170 to facilitate interaction with and/or delivery of reporting data generated by the reporting system. In some embodiments, one or more report user devices 175 interface with the service provider via the interface subsystem 170. For example, the report user devices 175 may request certain reports, receive report data for viewing, etc.

Figure 2:
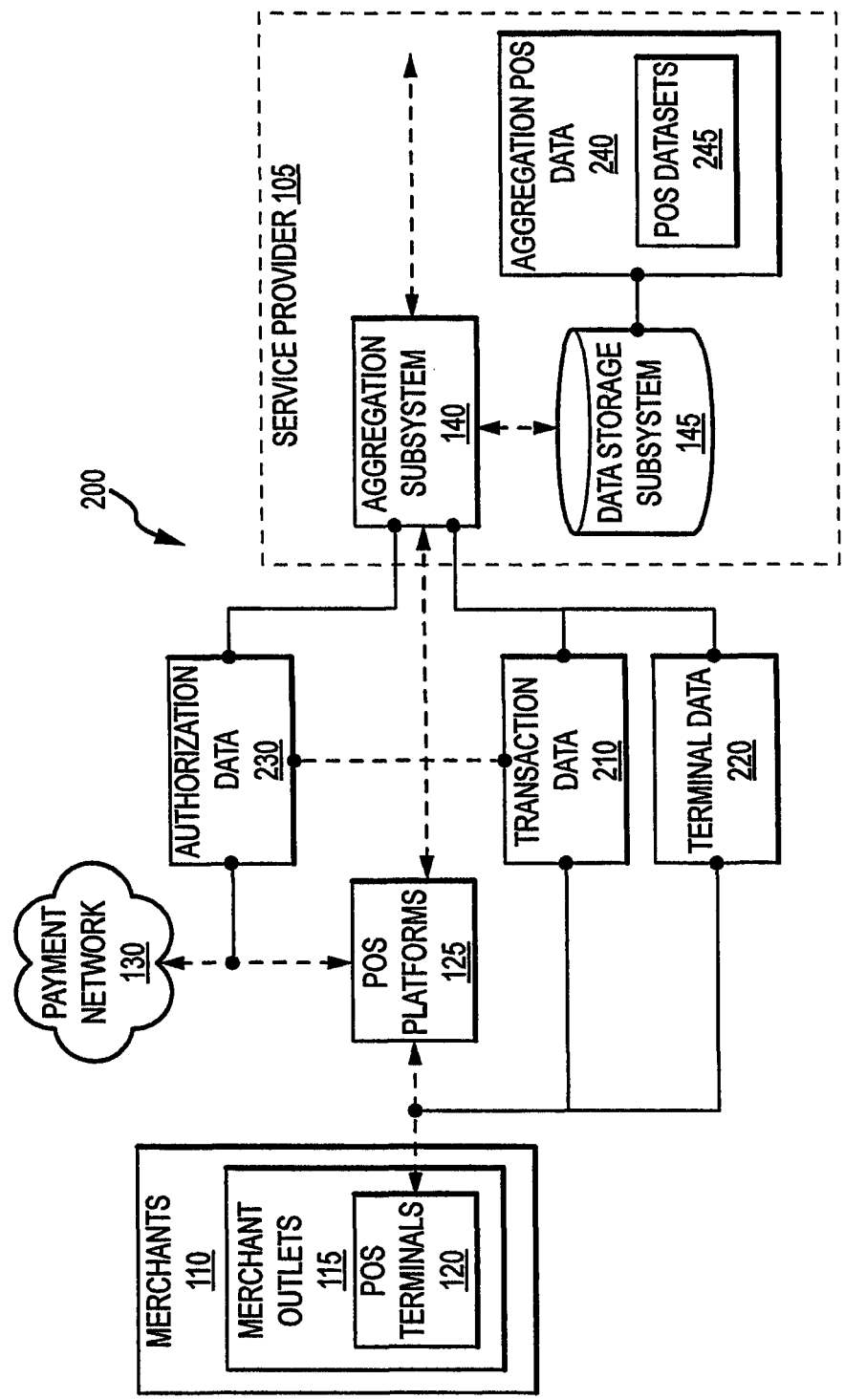
FIG. 2 shows a data flow diagram in the context of a first portion of a market network, according to various embodiments.
Figure 3:
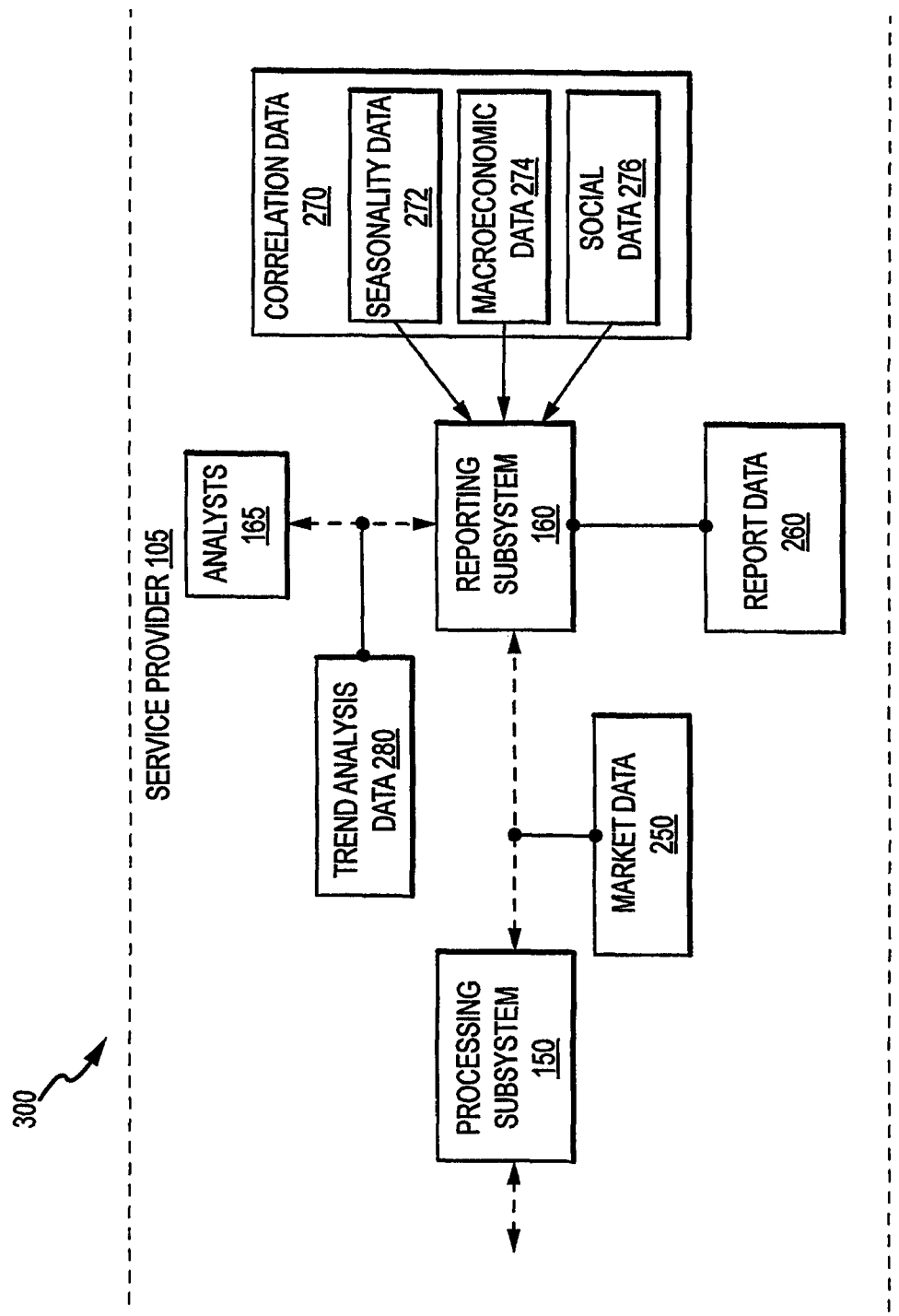
FIG. 3 shows a data flow diagram in the context of a second portion of a market network, according to various embodiments.
Figure 4:
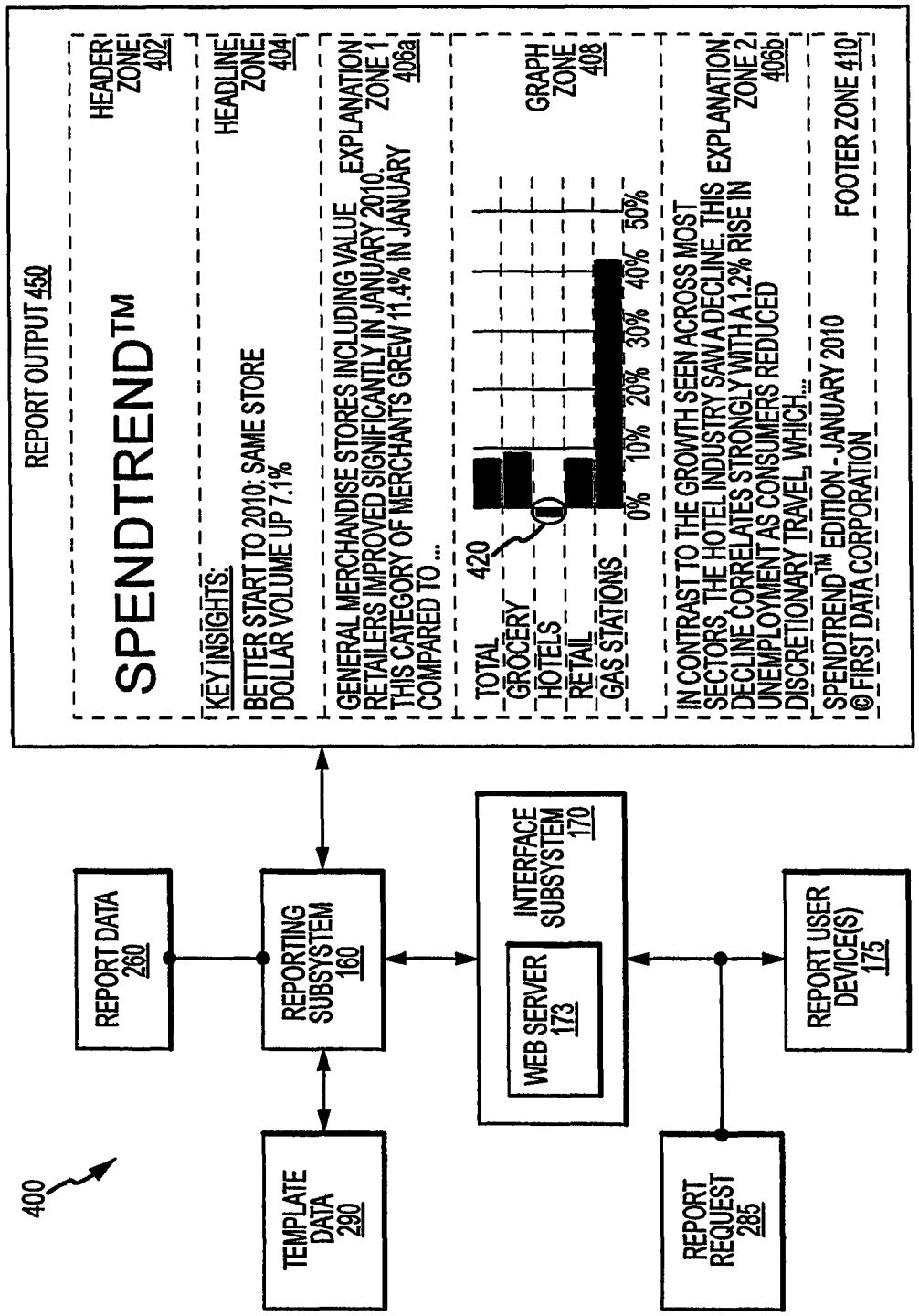
FIG. 4 shows a data flow diagram in the context of a third portion of a market network, according to various embodiments.

The functionality of various components of the market network 100, including the various subsystems of the service provider 105, will be described more fully below. For example, FIGS. 2-4 illustrate some embodiments of data flow through market networks, like the market network 100 of FIG. 1, each focusing on a portion of the data flow for the sake of clarity. Turning first to FIG. 2, a data flow diagram 200 is shown in the context of a first portion of a market network, according to various embodiments.

Embodiments of the data flow diagram 200 focus on generation and aggregation of POS data. As in a portion of the market network 100 of FIG. 1, a service provider 105 is in communication with a number of POS terminals 120 that are in further communication with a payment network 130. Embodiments of the POS terminals 120 are disposed at (e.g., located in or near) merchants 110 or merchant outlets 115. Transactions are effectuated via the POS terminals 120. Data from the transactions may be aggregated by an aggregation subsystem 140 of the service provider 105, which may be stored in a data storage subsystem 145.

Embodiments of the POS terminals 120 are configured to be associated with certain types of information and to collect certain types of information. While each POS terminal 120 may collect and/or be associated with many different types of information, some typical types of information can be classified into two general categories: transaction data 210 and terminal data 220. The terminal data 220 may include information relating to (e.g., identifiers corresponding to) the merchant 110 and/or particular merchant outlet 115 where the POS terminal 120 is located, network information (e.g., Internet protocol (IP) address, security protocols, etc.), configuration information (e.g., types of payment instruments accepted, software version, etc.), and/or any other information relating to the POS terminal 120 and not specifically to any transaction effectuated via the POS terminal 120.

It is worth noting that the terminal data 220 may indicate various characteristics of the POS terminals 120 in various ways. For example, various types of merchant classifiers may be used. In one embodiment, a merchant classifier code (MCC) defined by a government standard is used to identify each merchant. In other embodiments, a proprietary code may be used. Further, in some embodiments, each merchant is identified by a single classifier, even where the merchant operates in multiple markets. For example, a megastore may sell groceries, general merchandise, gasoline, insurance services, etc., but the merchant may be classified only using a "grocery" classification. In an alternate embodiment, the megastore may be classified using multiple classifiers. In still another embodiment, the megastore may be classified by both a single classifier (e.g., a default classifier, or a classifier chosen to comply with a particular standard) and by one or more other classifiers (e.g., according to proprietary classification systems).

The transaction data 210, on the contrary, may include any type of information relating to one or more transactions effectuated via the POS terminal 120. For example, the transaction data 210 may include timestamp information (e.g., a date and time, or time range, of one or more transactions), transaction value, fee and/or discount information, product category and/or description information, demographic information (e.g., relating to the payor), etc.

The transaction data 210 that is collected by POS terminal 120 may depend on the particular payment instrument used to effectuate a payment. For example, when paying by credit or debit card, the track two data is typically read using a magnetic stripe reader. Also, the amount of the purchase is entered, typically electronically from a cash register. For Internet transactions, the amount may be generated from the merchant's web site or a payment processing company. For negotiable instruments, the MICR line is typically read using the POS terminal 120. Other information, such as the amount of the check, may also be entered, either by manually keying in the information, electronically by the cash register, from a web site or the like. For closed-loop prepared cards, such as traditional magnetic strip gift cards, the account number is typically read from the magnetic stripe and the amount of the transaction is received by manual key in, from a cash register, from a web site or the like. Transactions from mobile devices or from the Internet typically include data similar to traditional payment forms, as such transactions usually stem from electronic wallets that typically include information similar to their physical counterparts. However, these transactions also include data indicating that the transaction originated from a mobile device or the internet and can be used in generating market reports.

Not all the transaction data received at the POS terminal 120 may be needed in order to generate the market reports. As such, a parsing processes may be used to extract only the relevant data needed to produce the reports. This parsing can occur at various locations, including but not limited to the POS platforms 125, the service provider 105, aggregation subsystems, or the like.

The transaction data 210 and terminal data 220 may be sent to the POS platforms 125 for various types of processing. In certain embodiments, some or all of the transaction data 210 may be sent from the POS platforms 125 to the payment network 130 for authorization. For example, transactions may be authorized, denied, canceled, etc. In some embodiments, the authorization process generates authorization data 230 that may or may not be included in the transaction data 210. In some embodiments, the transaction data 210, terminal data 220, and/or authorization data 230 are sent from the POS platforms 125 to the service provider 105. In various embodiments, information may be communicated to the service provider 105 periodically (e.g., every night), as a result of a trigger event (e.g., after a particular magnitude change in an economic indicator or social event), on demand (e.g., on request by the service provider 105), etc.

In some embodiments, the various types of data are sent to the aggregation subsystem 140 using standard formats and/or protocols. In other embodiments, the aggregation subsystem 140 is configured to process (e.g., parse) the data into a usable and/or desired format. The data may then be stored in the data storage subsystem 145 as aggregated POS data 240. In some embodiments, the aggregated POS data 240 is a collection of POS datasets 245. It is worth noting that the aggregated POS data 240 may be arranged in any useful way, for example, as an associative database, as a flat file, as sets of POS datasets 245, in encrypted or unencrypted form, in compressed or uncompressed form, etc.

Embodiments may then use the aggregated POS data 240 to generate market data. FIG. 3 shows a data flow diagram 300 in the context of a second portion of a market network, according to various embodiments. In some embodiments, the context of FIG. 3 includes various subsystems of the service provider 105. For example, as illustrated in the data flow diagram 200 of FIG. 2, aggregated POS data 240 may be generated by the aggregation subsystem 140 and stored in the data storage subsystem 145. This aggregated POS data 240 may then be used by other subsystems of the service provider 105 for further processing.

In some embodiments, the processing subsystem 150 uses the aggregated POS data 240 (e.g., either directly from the data storage subsystem 145 or via the aggregation subsystem 140) to generate market data 250. For example, the aggregated POS data 240 may include merchant type flags, merchant identifiers, merchant outlet identifiers, transaction amounts, numbers of transactions, payment types used, transaction types (e.g., sale, cash advance, return, etc.), transaction authorizations (e.g., authorize, decline, etc.), timestamps, etc. As used herein, the market data 250 may include any types of data useful in generating market analyses and/or reports that can be extracted and/or derived from the aggregated POS data 240.

In some cases, a type of mapping may be used in order to be useful for a given market, such as trends by industry, geography, card type and the like. For instance, data from the POS terminal may reveal the identity of a given merchant. This merchant may then be classified into a specific industry, such as fast food, so that a trend report may be produced by industry. A similar approach can be used when determining trends by geography, such as by knowing the zip code of the merchant or other geographic identifier originally gleaned from the POS terminal. For card types, the transaction data can be evaluate to determine what payment instrument was used in the transaction. As described above, not all data collected at the POS terminals need be used to generate the reports. This may be done for both POS terminals located in physical stores as well as virtual POS terminals used with e-commerce and mobile transactions.

Given these and/or other types of aggregated POS data 240, the market data 250 may include extracted or classified data, such as data extracted for a particular time period, data extracted for all records having the same store identifier, data classified by merchant type, data classified by location (e.g., merchant region, geographic region, etc.), data classified by dollar volume, data classified by average ticket price, etc. The market data 250 may additionally or alternately include trend data, such as data trends over a particular time period or compared to a baseline. The trends may look at time periods, payment types, merchants, merchant categories, geography, transaction volumes, ticket values, or any other useful (e.g., and derivable) characteristics of the aggregated POS data 240.

In some embodiments, the market data 250 is used by a reporting subsystem 160 of the service provider 105. Embodiments of the reporting subsystem 160 use the market data 250 to generate report data 260. The report data 260 may typically include data desired for generation of a market report, which may, for example, include data to support graphical representations of trends (e.g., for generation of bar graphs, pie charts, line graphs, spreadsheets, etc.), indications of events (e.g., for highlighting data, circling data, flagging data, etc.), etc.

While certain embodiments of the reporting subsystem 160 generate reporting data 260 only according to market data 250, other embodiments may use additional data. In some embodiments, the reporting subsystem 160 is configured to interface with one or more analysts 165 (e.g., human or machine). The analysts 165 may generate trend analysis data 280. For example, the trend analysis data 280 may include explanations, headlines, annotations, etc., for example, for adding value to an end user of the report data 260.

In some embodiments, the reporting subsystem 160 is in communication with one or more sources of correlation data 270. The correlation data 270 may include any type of data that could be useful in identifying correlations with and/or explanations of the market data 250. For example, embodiments of the correlation data 270 include seasonality data 272, macroeconomic data 274, and/or social data 276.

Embodiments of the seasonality data 272 may include information relating to time of year, number of workdays, number of weekends in a month, season, holidays, etc. For example, January revenue may correlate at least in part to the number of weekends in January each year. Embodiments of macroeconomic data 274 may include information relating to gross domestic product, personal bankruptcy, unemployment, total consumer debt, etc. For example, an increase in unemployment in a geographic region may correlate to an increase in fast food sales for that region. It is worth noting that the term "macroeconomic" is used herein only to distinguish from economic transaction data for a particular POS terminal 120. It will be appreciated that certain data, which may technically be classified as "microeconomic" in nature may be included in the macroeconomic data 274, such as economic trends relating to a particular subset of consumers, to particular externalities or market failures, to a particular merchant outlet or branch office, etc. Embodiments of social data 276 may include information relating to particular social trends, fads, military incursions, regulatory issues, political issues, etc. For example, a beef scare relating to a grocery store in a particular week may correlate to a drop in revenue for that grocery merchant for that week.

It will be appreciated that many other types of correlation data 270 are possible and may be received and/or derived from many types of sources. The correlation data 270 may also be collected periodically, based on historical data that was gathered or generated previously, etc. It will be further appreciated that the correlation data may be used by the analysts 165 in generating trend analysis data 280. For example, an analyst 165 may identify a correlation between the market data 250 and certain correlation data 270. The analyst 165 may then write up an explanation of the correlation, identify the correlation, do more research, etc. Other types and uses of correlation data 270, trend analysis data 280, and/or other data is described more fully below.

The report data 260 generated by the reporting subsystem 160 may be used in a number of different ways. Some of these ways are described with reference to FIG. 4. FIG. 4 shows a data flow diagram 400 in the context of a third portion of a market network, according to various embodiments. In some embodiments, the reporting subsystem 160 generates the report data 260 according to embodiments described with reference to FIG. 3. The report data 260 may then be used to generate one or more types of reports.

In some embodiments, the reporting subsystem 160 is in communication with an interface subsystem 170. Embodiments of the interface subsystem 170 are configured to provide an interface between the reporting subsystem 160 (and/or other subsystems of the service provider 105) and one or more consumers of the report data 260. For example, one or more end consumers may interact with the interface subsystem 170 via one or more report user devices 175. In various embodiments, the report user devices 175 may include any type of device capable of providing the desired report data 260 to the end consumer. For example, the report user devices 175 may include desktop and laptop computers, smart phones, personal digital assistants, e-readers, etc.

In some embodiments, the report user devices 175 interact with the interface subsystem 170 over a network (e.g., the Internet). These interactions may be facilitated in certain embodiments by a web server 173 in the interface subsystem 170. Some embodiments of the interface subsystem 170 may further include interface elements for various functions, such as authorization (e.g., login elements, encryption elements, etc.), graphical user interface handling, query handling, etc.

In other embodiments, the processing subsystem 150 uses the aggregated POS data 240 (e.g., either directly from the data storage subsystem 145 or via the aggregation subsystem 140) to generate indexed or normalized values to permit comparisons between defined timeframes, such as for every month. Once indexed, various comparisons may be made, such as to see whether sales are increasing or decreasing from month to month, or even to project future sales. Hence, processing subsystem 150 may be used to produce indexed sales values 252 to permit such comparison or projections. The indexed sales values 252 may be for an entire market or for a given industry using industry subset data 253. For example, the indexed sales values 252 may relate to all retail sales for the United States, or all retail sales within a given state or region. The industry subset may filter the aggregated POS data into specific market or industry segments, such as by electronics, petroleum, restaurant, and the like. This may be done using merchant classification codes or other industry classifications. Typically, the POS data 240 will be in terms of sales volume (in dollars). However, other numbers could be used, such as total number of transactions, average ticket and the like.

The indexed sales values 252 may be determined by taking the total sales volume (in terms of dollars) of the aggregated POS data 240 for a given timeframe and applying various factors in an attempt to filter out fluctuations between timeframes that may prevent fair comparisons between timeframes. For example, the POS data 240 may be corrected for possible monthly fluctuations, such as due to seasonality. Other possible fluctuation factors include holidays or other specific events that would impact spending behavior and general industry growth. The POS data 240 may also be normalized based on an expected percentage of the POS data 240 relative to the entire market. For example, the aggregated POS data 240 may comprise only about 40% of all transactions in the electronics industry across the United States. As such, the value of total sales associated with the POS data 240 may be divided by 0.4. Other convenience factors could also be applied, such as to provide an indexed values that are within reasonable ranges. Merely by way of example, the convenience factor could reduce the indexed value to a number between 1 and 100. In this way, the indexed sales value could be ranked by month depending on where it falls within the scale of 1 to 100.

Various reports may be produced using the indexed sales values 252 using reporting subsystem 160. For example, report data 260 could include a projected sales volume for a future timeframe as illustrated by block 254. This could be in terms of dollar values or an indexed value as described above. Further, this report could be shown along with any of the other reports described herein or adjusted by on any of the other correlation data described herein. Also reports could show the trend of monthly indexed sales values to see if monthly sales are increasing or decreasing.

Embodiments of the interface subsystem 170 are used to facilitate provision of a report output 450 (e.g., a graphical report product) to one or more report user devices 175. In certain embodiments, the report user devices 175 can provide report requests 285 to the reporting subsystem 160 via the interface subsystem 170. For example, the report requests 285 may include one or more queries and/or other information for generating a report from the report data 260. Alternately, the report requests 285 may be issued after a report output 450 has already been generated, for example, to filter, refine, update, reformat, or otherwise affect the report output 450. In certain embodiments, report outputs 400 are generated without allowing for any report requests 285 before or after the report generation. Further, in some embodiments, report outputs 400 are generated according to automatically generated report requests 285. For example, a subscriber of a reporting service may have certain preferences (e.g., selected preferences, preferences based on the subscriber's portfolio, etc.), which may be used to decide what information is presented in a report output 450 and/or in what form.

In some embodiments, the report output 450 is also affected by template data 290. Depending on the type of output, the template data 290 may include any useful formatting or presentation information. For example, the template data 290 may include a style sheet, font information, margin information, graphics, etc. In certain embodiments, the template data 290 defines certain zones on all or part of the report output 450. Each zone may be dependent on other zones or independent, it may be automatically filled with report data or left open for manual input, or used in any other useful way.

In the illustrated embodiment of FIG. 4, the report output 450 includes 6 zones: a header zone 402, a headline zone 404, a first explanation zone 406a, a graph zone 408, a second explanation zone 406b, and a footer zone 410. These zones are intended only for illustration and should not be construed as limiting in any way. The header zone 402 and the footer zone 410 may include header and footer information, respectively. For example, the report output 450 may include a page header with logos, etc., copyright notices, edition information, etc. The headline zone 404 is illustrated to include a headline for the page. For example, the headline may point out a key insight illustrated by the other report data 260 shown on the page. The first explanation zone 406a is illustrated to include a general explanation to support the headline shown in the headline zone 404. For example, the first explanation zone 406a may include additional data and details relating to the key insight, trends, etc., and may provide an introduction to other information on the page. The graph zone 408 may include a graphical representation of a certain portion of the market data 250 (e.g., data relating to the key insight). The second explanation zone 406b is illustrated to explain and further support data from the graph zone 408, the first explanation zone 406a, etc.

In the example illustrated, market data 250 from January 2010 illustrates that same store dollar volumes are up 7.1-percent, as noted in the headline zone 404. The first explanation zone 406a, second explanation zone 406b, and graph zone 408 support this headline. For example, the bar graph in the graph zone 408 shows dollar volume growth for January 2010. As shown, grocery and retail are up around ten-percent, hotels are down around two-percent, and gas stations are up over forty-percent.

It is worth noting that the data in various embodiments may be focused on same store performance. As used herein, "same store" data generally refers to data aggregated from either an identical set of POS terminals 120 or from a statistically insignificant change in a sample set. For example, as discussed above, the market data 250 is derived using actual data from actual transactions effectuated via actual POS terminals 120. As such, real-world changes in the number of POS terminals 120 may have a noticeable effect on generated data if not properly accounted for.

Suppose, for example, that thirty new merchant outlets 115 open for a particular merchant 110 over a single year, and each merchant outlet 115 has an average of four POS terminals 120. The aggregated POS data 240 may show a large increase in dollar volume over that time period. For certain market reports, that information may be useful. For example, certain investors may be interested in the overall growth of that particular merchant's 110 dollar volume over the timeframe. For other market reports, however, it may be desirable to have an "apples-to-apples" comparison from one timeframe to another. For example, the overall growth may provide little or no information about representative growth of particular stores, of particular markets, etc.

As such, it may be desirable to generate reports based on a "same store" analysis. For example, it may be desirable to generate market data for substantially the same store sample set over two different timeframes. Notably, this and/or other functionality may include removal of irrelevant and/or unreliable data (e.g., or identification of relevant and/or reliable data. As such, certain embodiments generate a reliable portion of the market data 250 for use in generating the report data 260.

In one embodiment, when the aggregated POS data 240 shows insufficient data over the timeframe of interest (e.g., a particular POS terminal 120 has only been collecting transaction data 210 for a portion of the timeframe), the data may be removed from the analytical dataset. In another embodiment, statistical analyses may be performed to determine whether to use certain data. For example, market data 250 may be generated with and without certain data, and the differences may be analyzed to determine whether they are significant. Where the differences are significant, the data may be discarded and/or further analysis may be performed to determine why the difference is significant (e.g., and whether that significant difference would be worth reporting as part of the report data 260).

Notably, the report output 450 may further include various types of indications. In one embodiment, when data is discarded, it may still be included in the report data 260 and indicated as such. For example, a line of a spreadsheet may be struck through, or an asterisk may be included, to indicate that insufficient data was available. In other embodiments, indications are used to highlight or otherwise indicate trend events.

As used herein, trend events generally include any data point, data range, trend result, etc. that is identified as being potentially of interest. For example, as discussed above, various types of trend analysis data 280 and/or correlation data 270 may be used to identify correlations and other trend events. Trend events may be indicated in any useful way. For example, as illustrated in FIG. 4, a trend event indicator 420 is shown on the graph in the graph zone 408. The trend event indicator 420 is illustrated as a circle around the portion of the graph showing negative growth for the hotel industry. Of course, any type of indicator may be used, for example, including a color, shading, typeface, font, flags, highlighting, text, icons, etc.

While not indicated, other reporting and display techniques may be used to enhance the look, feel, usefulness, etc. of the report output 450. In one embodiment, the report output 450 is configured to be displayed through a web browser or similar interface using a report user device 175. A user may interact with the report output 450 using menus, buttons, links, and/or other navigation elements. The navigation may allow the user, for example, to jump between sections of the report output 450, to show or hide elements (e.g., the second explanation zone 406b), to dynamically process (e.g., filter, sort, etc.) charted data, to reformat the page layout, etc.

Figure 5:
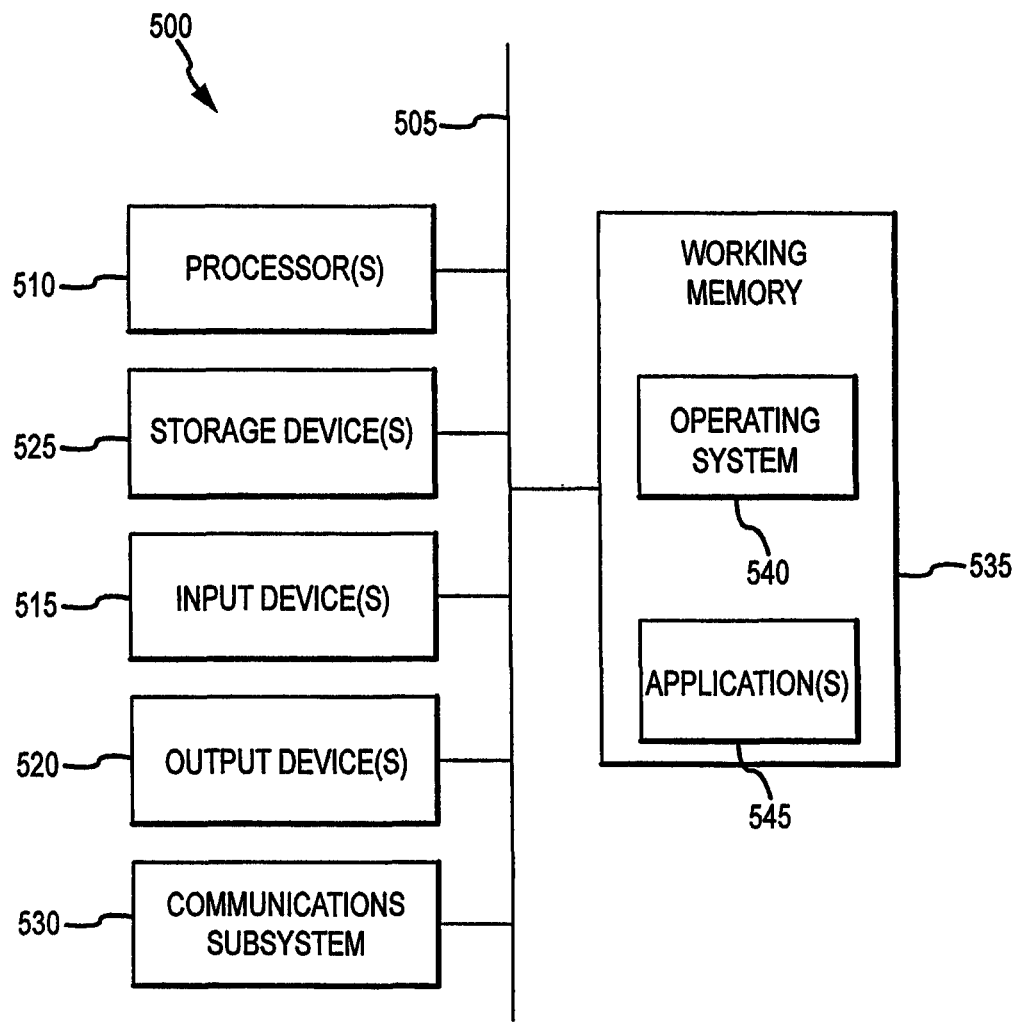
FIG. 5 shows an illustrative computational system for performing functionality to facilitate implementation of embodiments described herein.

As discussed above, the various subsystems of the service provider 105 may be implemented in hardware and/or software. In some embodiments, one or more computational systems are used, having instructions stored in memory that can be executed to cause processors and/or other components to perform certain methods (e.g., by implementing functionality of one or more of the subsystems). FIG. 5 shows an illustrative computational system 500 for performing functionality to facilitate implementation of embodiments described herein. For example, components of the computational system 500 may be used to implement functionality of one or more subsystems of the service provider 105. It should be noted that FIG. 4 is meant only to provide a generalized illustration of various components, any or all of which may be utilized as appropriate. FIG. 5, therefore, broadly illustrates how individual system elements may be implemented in a relatively separated or relatively more integrated manner.

The computational system 500 is shown to include hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include without limitation a modem, a network card (wireless or wired), an infrared communication device, a wireless communication device and/or chipset (such as a Bluetooth device, an 802.11 device, a Wi-Fi device, a WiMax device, cellular communication facilities, etc.), and/or the like. The communications subsystem 530 may permit data to be exchanged with a network (such as the network described below, to name one example), and/or any other devices described herein. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs the computational system 500 to perform methods of the invention. According to a set of embodiments, some or all of the procedures of such methods are performed by the computational system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 500. The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

It will be appreciated that the systems described with reference to FIGS. 1-5, including the computational system 500 of FIG. 5, may be used to implement a number of methods. Some of these methods are discussed with reference to FIGS. 6-9. For the sake of clarity, embodiments of the methods may be discussed with reference to the illustrative system components of FIGS. 1-5. It will be appreciated that these descriptions should not be construed as limiting the scope of the methods or of the components described with reference to the methods.

Figure 6:
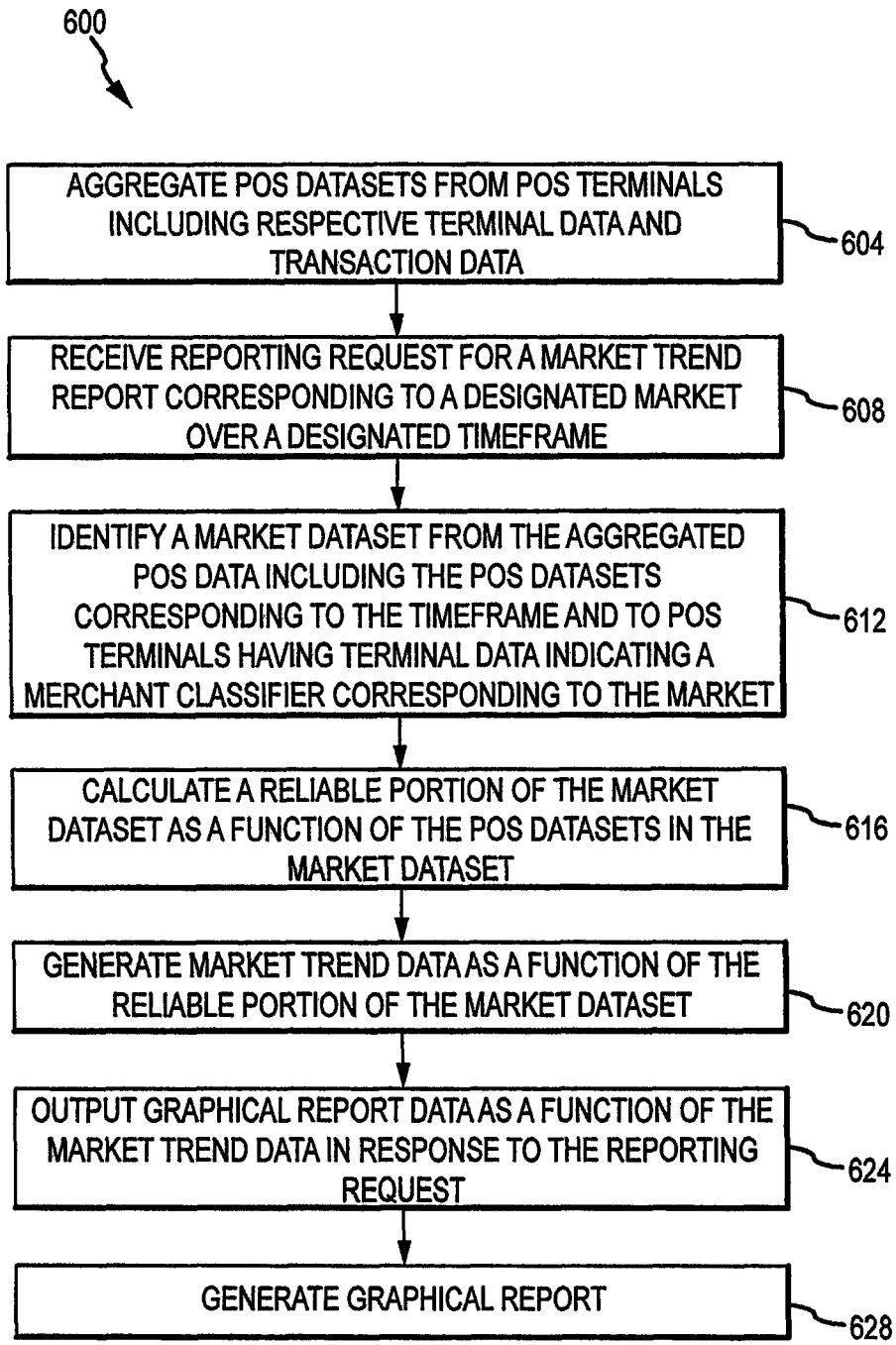
FIG. 6 shows a flow diagram illustrating a method for generating a graphical report, according to various embodiments.

FIG. 6 shows a flow diagram illustrating a method 600 for generating a graphical report, according to various embodiments. The method 600 begins at block 604 by aggregating POS datasets from POS terminals. For example, the aggregation subsystem 140 of the service provider 105 may be used to generate aggregated POS data 240 from a number of POS terminals 120. The aggregated POS data 240 may include transaction data 210, terminal data 220, and/or authorization data 230.

In some embodiments, at block 608, a request is received for a market trend report. The requested market trend report may correspond to a designated timeframe, a designated market, and/or any other designations. For example, the requested report may designate the hotels market over the past twelve months. Alternately, the requested report may designate all markets for the northwest region of the United States over the past sixty days. In various embodiments, the request may originate from a user using a report user device 175 via an interface subsystem 170, via a computer-generated request for updating a website or generating a periodic mailing, etc.

At block 612, a market dataset may be identified or generated from the aggregated POS data 240, for example, according to the request received in block 608. In some embodiments, market data 250 is generated from the aggregated POS data 240 including the POS datasets 245 corresponding to the designated timeframe(s) and to POS terminals 120 having terminal data 220 indicating a merchant classifier corresponding to the designated market(s).

As discussed above, it may be desirable to use only a reliable portion of the market dataset identified or generated in block 612. For example, POS datasets 245 from POS terminals 120 having transaction data 210 for only a portion of the timeframe may be ignored or treated differently (e.g., displayed with special indications and not used in calculating certain trends). At block 616, a reliable portion of the market dataset may be calculated as a function of the POS datasets in the market dataset. For example, only same store data, only data having a statistically insignificant variability from a baseline, etc. may be included in the reliable portion.

At block 620, market trend data may be generated as a function of the reliable portion of the market dataset. In some embodiments, additional data is generated and/or collected, such as correlation data 270, trend analysis data 280, template data 290, etc. Graphical report data may then be generated and output at block 624 as a function of the market trend data (e.g., in response to the reporting request received in block 608). In some embodiments, the graphical report data is used to generate a graphical report at block 628.

It will be appreciated that various modifications may be made to the method 600 without departing from the scope of embodiments. Also, various embodiments of sub-processes may be used to implement certain process blocks of the method 600. Embodiments of some of these sub-processes are described with reference to FIGS. 7-9.

Figure 7A:
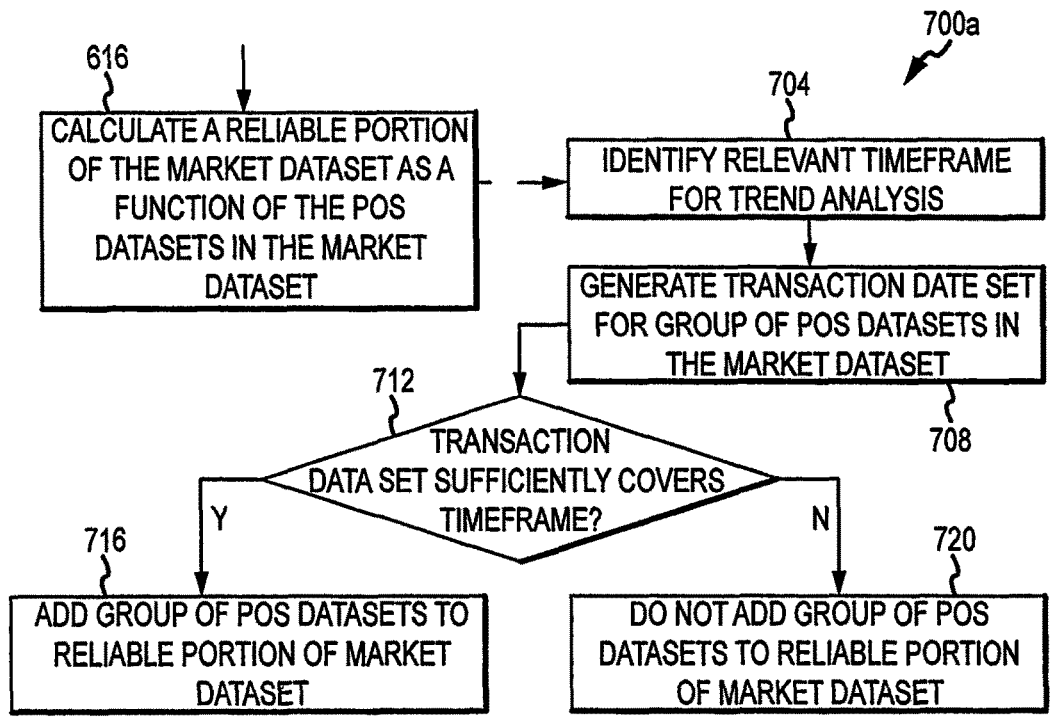
FIGS. 7A and 7B show flow diagrams of two illustrative methods for calculating a reliable portion of the market dataset, according to various embodiments.
Figure 7B:
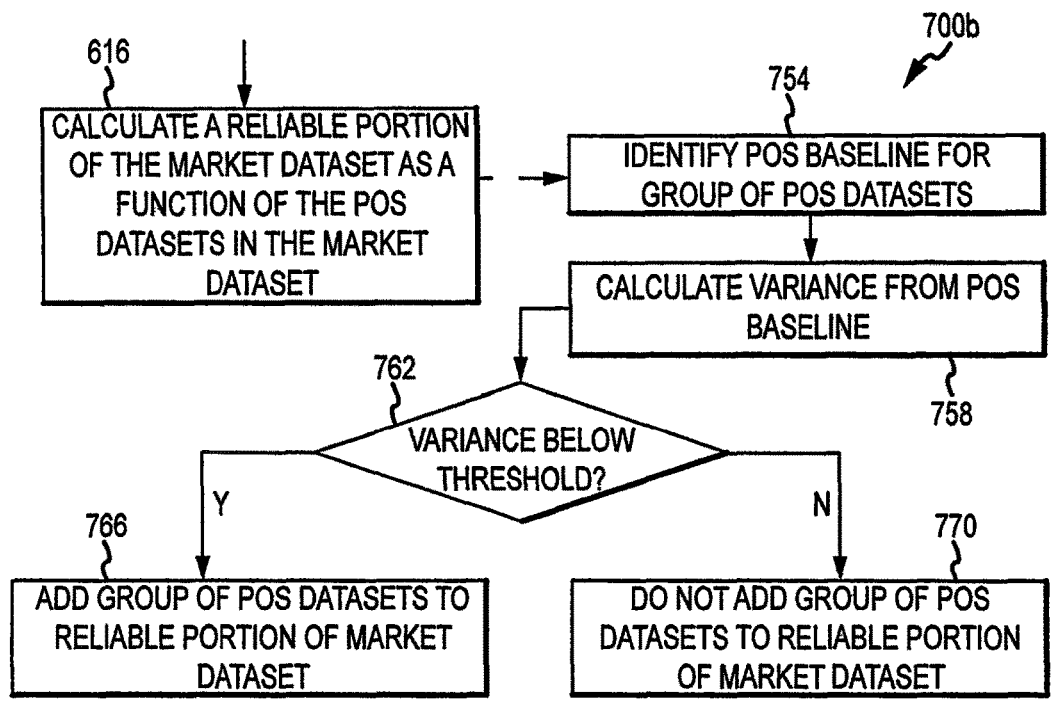

FIGS. 7A and 7B show flow diagrams of two illustrative methods 700 for calculating a reliable portion of the market dataset, according to various embodiments. Embodiments of the method 700*a* of FIG. 7A begin, as one embodiment of block 616 of the method 600 of FIG. 6, at block 704 by identifying a relevant timeframe for analysis. At block 708, the market data 250 (e.g., or POS datasets 245 that are used as part of the market data 250) are evaluated to determine a transaction date set. The transaction date set indicates the set of transaction dates (e.g., a date range, transactions per date, etc.) covered by the transactions included in the market data 250.

At block 712, a determination may be made as to whether the transaction date set sufficiently covers the timeframe of interest. In one embodiment, the transaction date set is evaluated only to see if data is available from the beginning and the end of the time frame. In other embodiments, techniques are used to determine if enough transaction data 210 is available for all or part of the timeframe. For example, it may be desirable to only treat the data as reliable when a certain average transaction density is seen across the entire timeframe.

If it is determined at block 712 that the transaction date set sufficiently covers the timeframe of interest, the corresponding POS datasets 245 (e.g., or data derived from the respective POS datasets 245) may be added to (e.g., or may not be removed from) the reliable portion of the market data 250 at block 716. If it is determined at block 712 that the transaction date set does not sufficiently cover the timeframe of interest, the corresponding POS datasets 245 (e.g., or data derived from the respective POS datasets 245) may not be added to (e.g., or may be removed from) the reliable portion of the market data 250 at block 720.

Embodiments of the method 700*b* of FIG. 7B begin, as another embodiment of block 616 of the method 600 of FIG. 6, at block 754 by identifying a POS baseline for a group of POS datasets 245. For example, if certain POS terminals 120 were used in certain merchant outlets 115 in January 2009, data from those POS terminals 120 may be used as the baseline for a same store report for January 2010. At block 758, a statistical variation (e.g., an amount of variation) may be calculated between the POS baseline and the market data 250. For example, it may be determined that a certain amount of change is allowed from the baseline without considering the new data unreliable.

At block 762, a determination may be made as to whether the amount of variation is below a certain allowable threshold. If it is determined at block 762 that the amount of variation is below the threshold, the corresponding POS datasets 245 (e.g., or data derived from the respective POS datasets 245) may be added to (e.g., or may not be removed from) the reliable portion of the market data 250 at block 766. If it is determined at block 762 that the amount of variation is below the threshold, the corresponding POS datasets 245 (e.g., or data derived from the respective POS datasets 245) may not be added to (e.g., or may be removed from) the reliable portion of the market data 250 at block 770.

Figure 8:
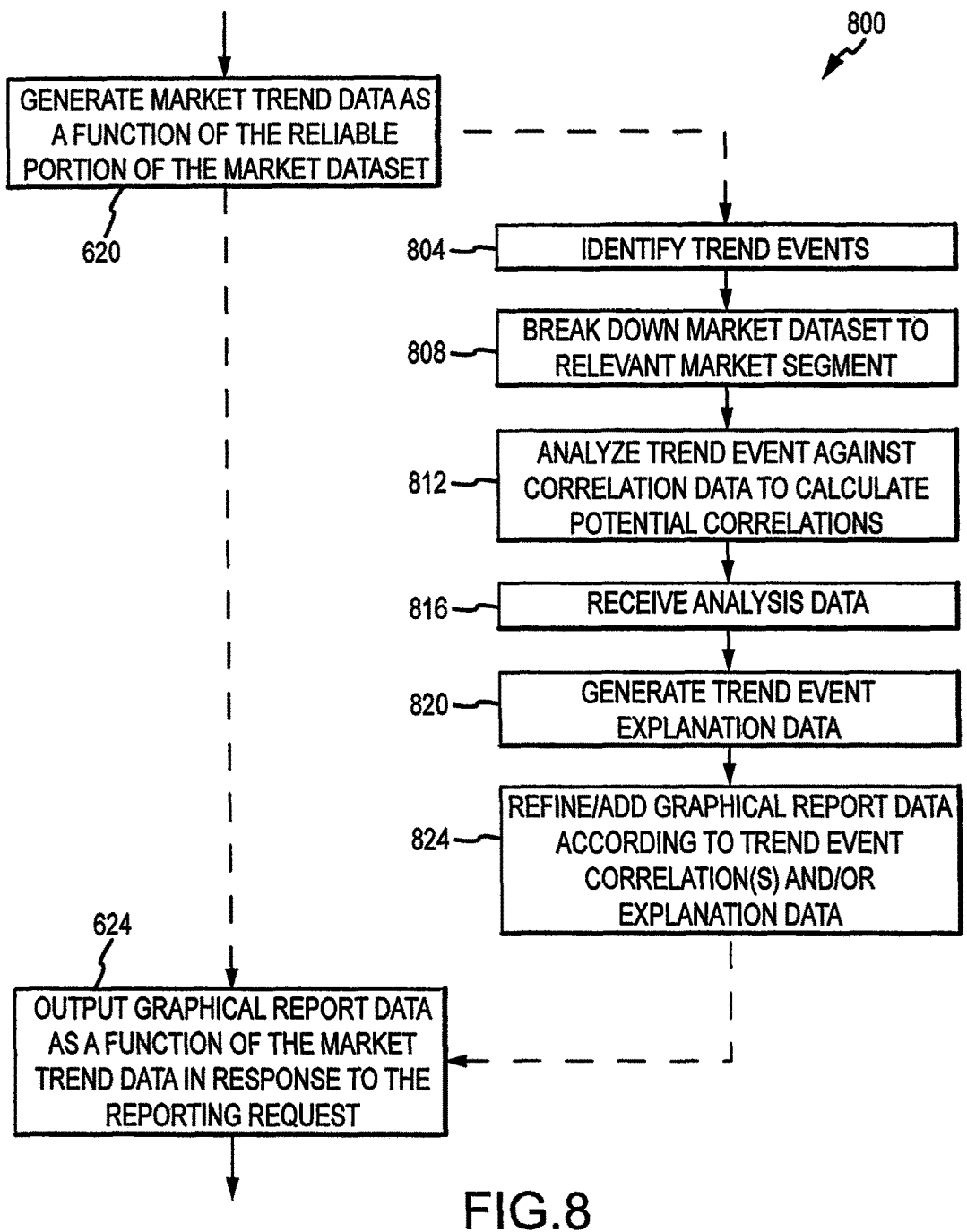
FIG. 8 shows a flow diagram of an illustrative method for generating market trend data, according to various embodiments.

Once the reliable portion of the market data 250 has been generated (e.g., by one of the methods 700 of FIG. 7A or 7B, or by some other method), it may be desirable to generate market trend data accordingly. FIG. 8 shows a flow diagram of an illustrative method 800 for generating market trend data (e.g., report data 260), according to various embodiments. Embodiments of the method 800 begin at block 804, as one embodiment of block 620 of the method 600 of FIG. 6, by identifying one or more trend events, as described above.

At block 808, the one or more trend events may be analyzed according to relevant market data 250 (or relevant data from the reliable portion of the market data 250). In one embodiment, the market data 250 is broken down by market segment for a relevant timeframe. For example, the reliable portion of the market data 250 may be filtered such that only merchants in the gasoline classification are analyzed. In certain embodiments, breaking down the market data 250 may include identifying relevant trend events from block 804 and their corresponding market data 250 from block 808.

The trend events identified in block 804 may then be analyzed against correlation data 270 (e.g., and/or any other useful types of data) in block 812 to calculate (e.g., and/or otherwise identify) potential correlations. For example, a statistically significant correlation may be found between a rise in same store average ticket value for merchants in a region and a rise in median home prices for the same region. In some embodiments, other data, like trend analysis data 280, may be received at block 816. The correlation data 270, trend analysis data 280, identified trend events, identified correlations, etc. may be used in block 820 to generate trend explanations. For example, the trend explanations may include auto-generated text, text supplied by analysts 165, etc.

It is worth noting that trend explanations may include a market driver analysis. For example, after identifying a trend event in block 804, a human or machine-implemented analyst may determine whether the trend event is legitimate (e.g., not simply evidence of an anomaly, mismatch, mathematical error, data error, etc.). The breakdown of the data in block 808 may include breaking down the data by market and then by merchant to determine what contributory effect each merchant may have on a trend or a particular trend event. The contributory effect of the particular merchant may be used to help explain trends, trend events, etc.

For example, suppose fast food sales show a small decline in March. A market driver analysis shows that a fast food chain called Burger Hut had a statistically large contributory impact on the trend event. Correlation data 270 indicates that Burger Hut was involved in a meat scare during a week in March, and aggregated POS data 240 supports a precipitous drop in sales for that week across Burger Hut merchant outlets 115. The data may justify a trend explanation stating that the small decline for the industry should be ignored, as the major contributing factor was a single meat scare for a single merchant, which has since been resolved.

Some or all of the data used in and generated by block 820 may then be used to affect graphical report data 260 in block 824. For example, the graphical report data 260 may be updated, refined, supplemented, etc. according to the trend event correlations, trend explanations, etc. The graphical report data 260 may then be output, for example, according to block 624 of the method 600 of FIG. 6.

Figure 9:
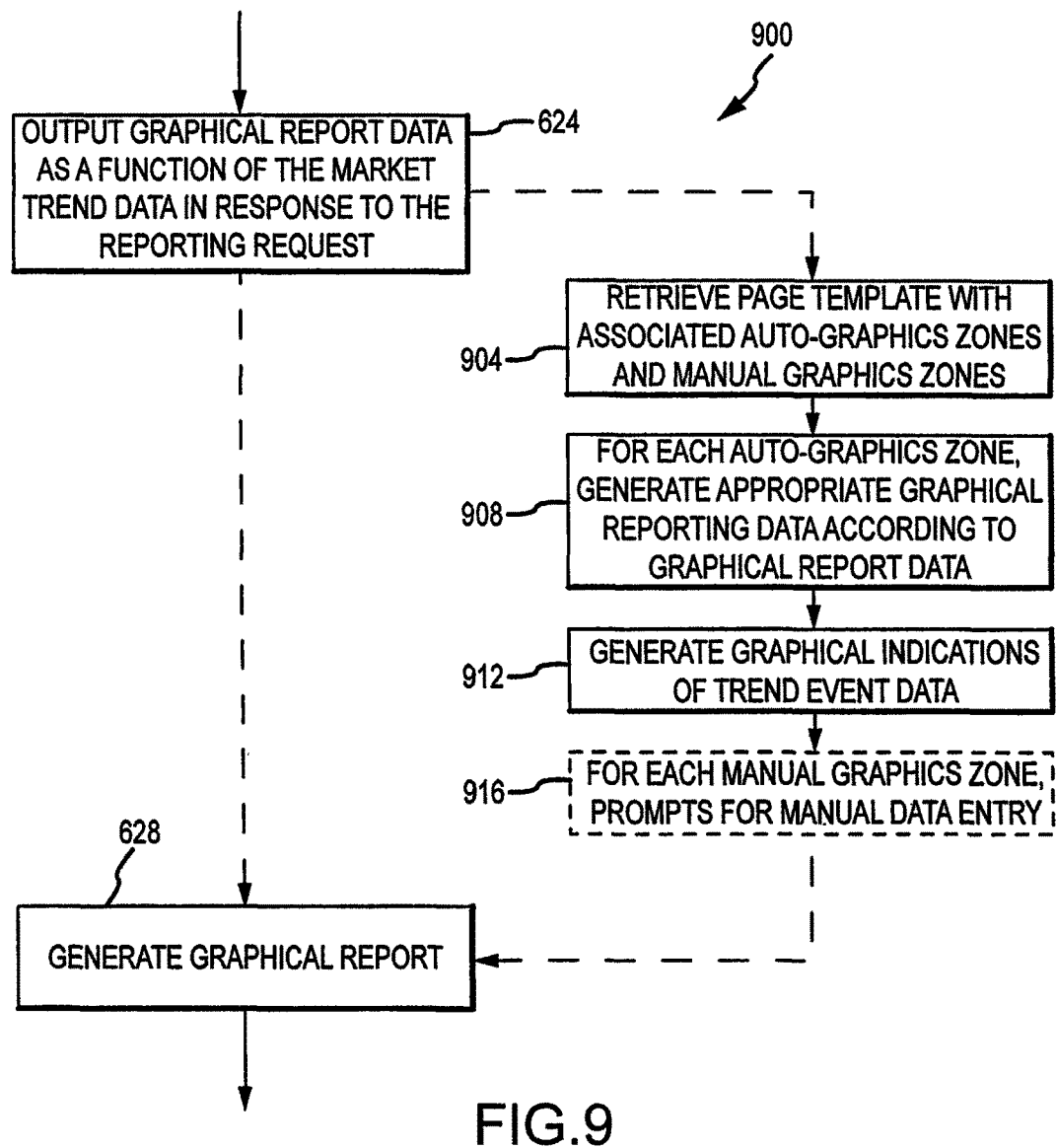
FIG. 9 shows a flow diagram of an illustrative method for outputting graphical report data, according to various embodiments.

In various embodiments, the graphical report data 260 is output according to the method 900 shown in FIG. 9. Embodiments of the method 900 begin at block 904, as one embodiment of block 624 of the method 600 of FIG. 6, by retrieving template data 290, as described above. In some embodiments, the template data 290 includes various types of zones. For example, auto-graphics zones may be used to automatically place (e.g., format, position, generate, etc.) content (e.g., text, graphics, embedded objects, etc.). Manual graphics zones may be used for manual placement of content. For example, manual placement zones may include prompts for manual input, spaces left for entry of text by analysts 165, etc. Of course, other types of zones and elements of a template are possible. For example, some templates may allow content to be manually added to auto-graphics zones, etc.

At block 908, appropriate graphical reporting data may be generated for each auto-graphics zone according to graphical report data. Graphical indications of trend event data (e.g., highlighting, icons, coloration, circles, etc.) may then be generated and/or placed at block 912. In some embodiments, at block 916, the method 900 may prompt a reporter (e.g., an analyst, etc.) for manual data entry into some or all of the manual graphics zones, where appropriate. As discussed above, in some embodiments, the graphical report data 260 may then be used to generate a graphical report, for example, according to block 628 of the method 600 of FIG. 6. For example, the report may be generated as a webpage, as a PDF document for communication over newswires, as an email, as a paper mailing, etc.

It will be appreciated that many different types of market data 250, report data 260, report outputs 400, etc. can be generated using embodiments, such as those described above. For added clarity, FIGS. 10A-10D illustrate an example of an illustrative data flow according to one embodiment. Beginning with FIG. 10A, an illustrative portion of transaction data 210 is shown.

The transaction data 210 is illustrated as a portion of a spreadsheet 1000 that includes some of the data for four merchant outlets 115 (e.g., which may correspond to four or more POS terminals 120). In particular, the data shows a Dallas-based outlet of a gas station retailer, a Boston-based outlet of a gas station retailer, a Denver-based outlet of a general merchandise retailer, and an Atlanta-based outlet of a general merchandise retailer. For each merchant outlet 115, a list of transactions and their respective dollar values are shown over a two-day timeframe.

The gas station retailer data flow is shown to proceed via arrow 1005a, and the general merchandise retailer data flow is shown to proceed via arrow 1005b. For example, at the end of each day, the indicated transactions and their respective transaction data 210 may be cleared through the POS platforms 125, payment networks 130, etc. A periodic batch process may cause the transaction data 210 to be sent to the aggregation subsystem 140 of the service provider 105 (e.g., overnight each night).

Figure 10A:
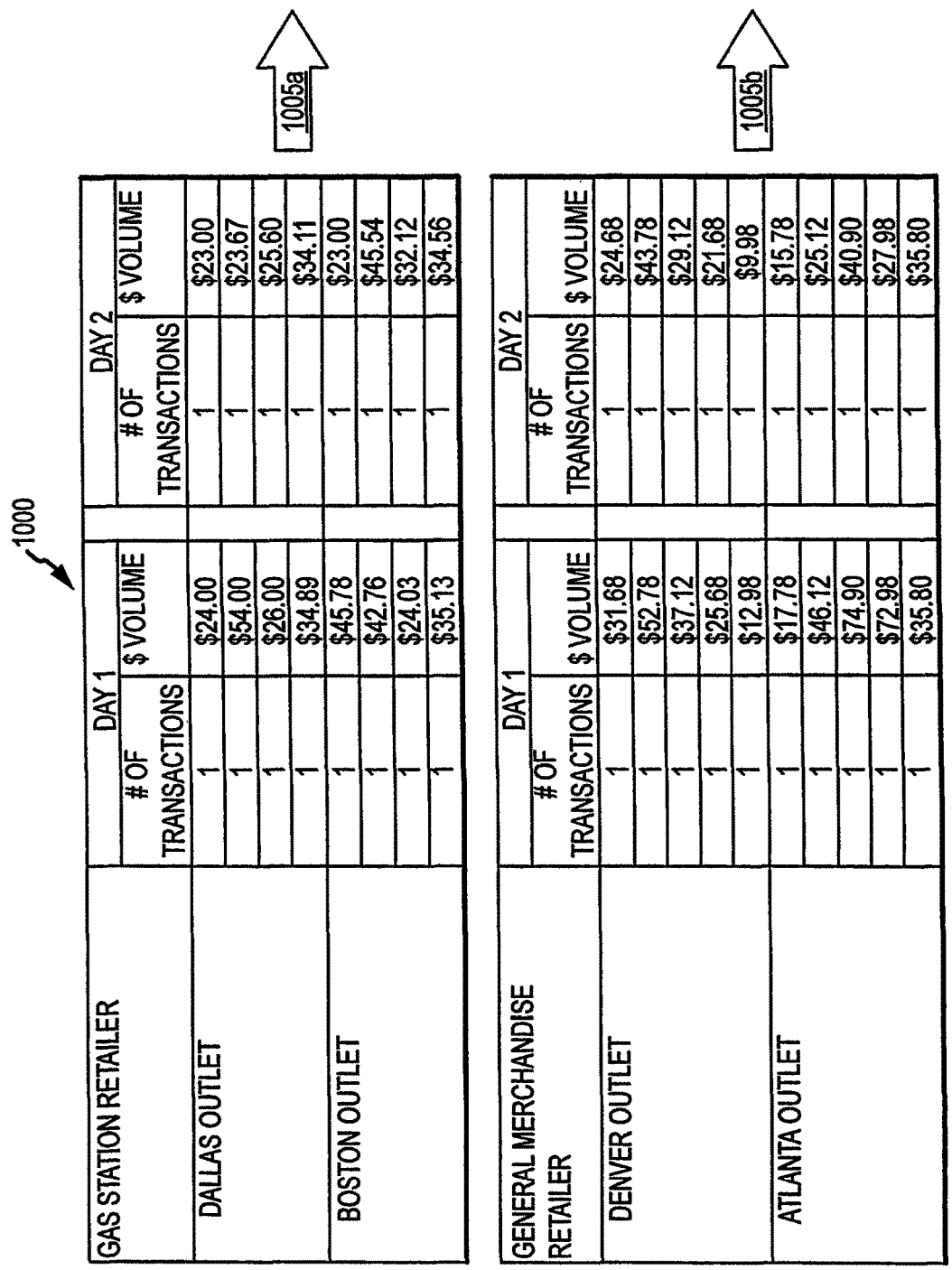

Turning to FIG. 10B, a spreadsheet 1010 is shown illustrating aggregated POS data 240 corresponding to the transaction data 210 in FIG. 10A, according to one embodiment. As described above, aggregation of the data by the aggregation subsystem 140 may include collecting the data and/or performing additional related processing. As illustrated, the transaction data 210 may be summed nightly (e.g., then monthly, by timeframe, etc., if desired). For example, the Dallas-based gas station retailer's POS terminal(s) 120 cleared four transactions totaling $138.89 on the first day of the timeframe.

Figure 10C:
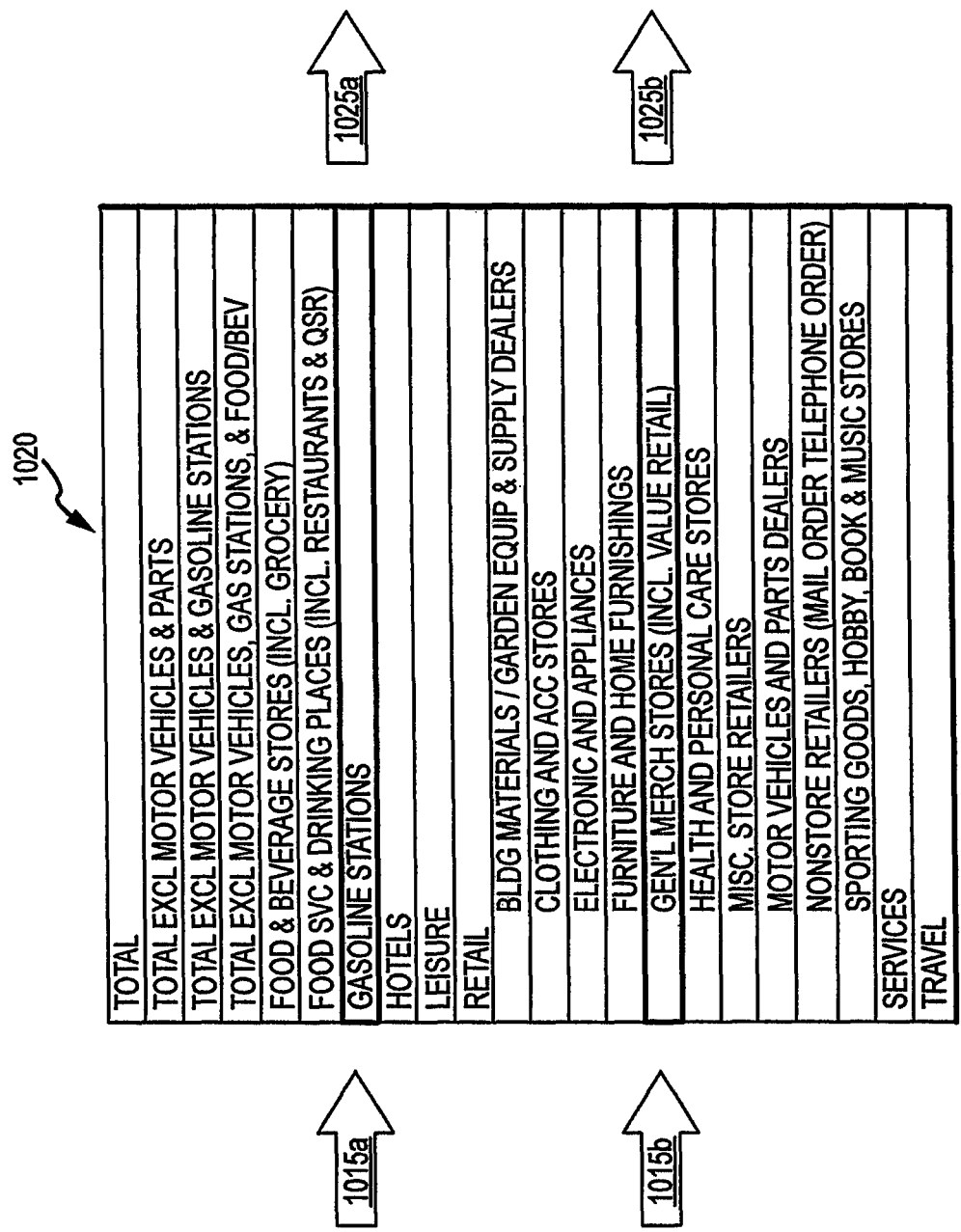

The aggregated gas station retailer data flow is shown to proceed via arrow 1015a, and the aggregated general merchandise retailer data flow is shown to proceed via arrow 1015b. The aggregated data may then be used (e.g., by the processing subsystem 150) to generate market data 250. For example, FIG. 10C shows a portion of market data 250 extracted from the aggregated data of FIG. 10B, according to one embodiment.

For example, the processing subsystem 150 may compile and analyze same store sales data, as described above, to generate relevant market data 250. The market data 250 may then include data for supporting summaries, trend generation and analysis, etc. for all the POS data (e.g., transaction data 210 and terminal data 220) by a variety of metrics, including, for example, by industry, region, state, card type, merchant, etc. The market data 250 may further indicate growth rates from a current timeframe (e.g., month) compared to a corresponding timeframe (e.g., the same month in a prior year) for average ticket, sales, transactions, etc. for each of the metrics.

Figure 10D:
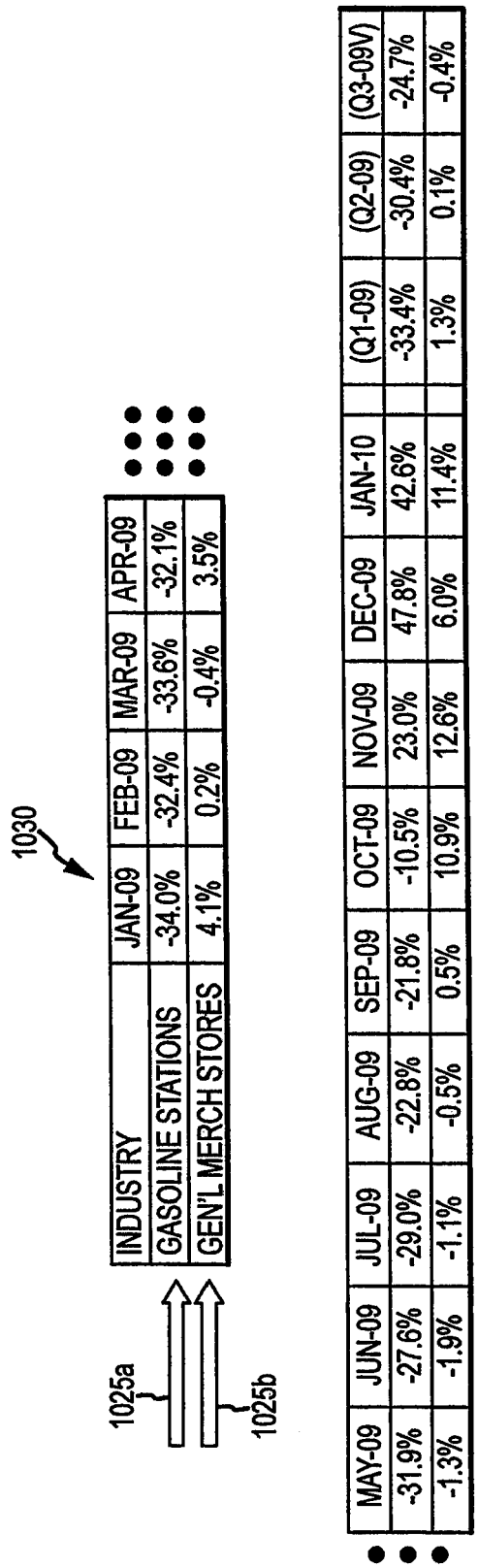

The entries for the gas station and general merchandise retailers are highlighted, and their data flows are shown to proceed according to arrows 1025. As described above, the market data 250 may be used to generate various types of report data 260. FIG. 10D shows a portion of report data 260 generated according to the market data 250 of FIG. 10C, according to one embodiment.

As illustrated, one row of the market data corresponds to the gasoline station industry, and another row corresponds to the general merchandise stores industry. Notably, the data was generated using data from only a few sample stores in the industries, and only from their actual POS terminal 120 outputs. According to the illustrative embodiment, the sales data for each of those industries, according to their respective POS terminal 120 sample sets and respective aggregated POS data 240, is compared between each month and the corresponding month from the prior year (e.g., the "Jan-09" column indicates growth data comparing January 2009 to January 2008). A 13-month trending for sales is shown, with growth rates calculated as the difference between a current month value and a same month prior year value, divided by the difference between the same month prior year value. Examples of growth rates are below. Data may also be shown by quarter (as shown), with transactions and average ticket by region, state, industry, card type, etc., and/or in any other useful way.

The various market trend reports may be provided in a variety of ways. For example, the systems herein may be employed to physically print the reports and mail them to customers. Alternatively, the reports may be electronic in form and electronically transmitted to a client, such as by email. Another option is to provide a customer with the ability to log on to a website and then allow the customer to view the reports online. In some cases, options may be provided to permit the customer to tailor the market trend reports by varying certain criteria. Some examples of how this may be accomplished are set forth in the following description and figures.

The various market trend reports that are electronically accessible via the Internet or similar portal may be produced using any of the systems or subsystems described herein. Further, the data used in generating such reports may be produced using any of the techniques described herein.

Merely by way of example, the growth reports may be generated in terms of same store growth over a specified time period as previously described.

Figure 11:
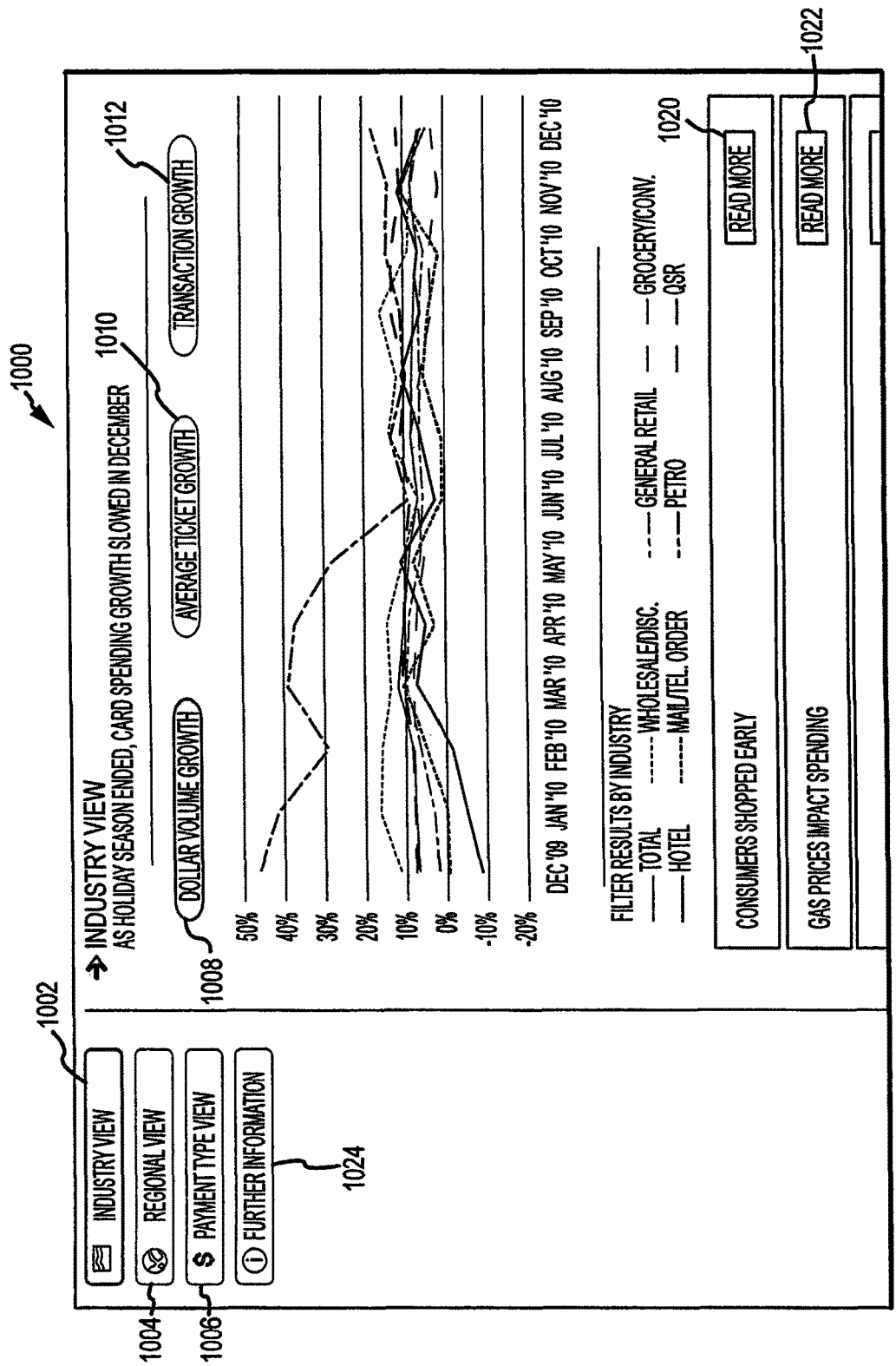
FIG. 11 illustrates a display screen showing the dollar volume growth of certain industries according to the invention.

Although not shown, when accessing the market trend reports through a web portal, the customer will typically be presented with a login screen where the customer must provide appropriate credentials in order to log in to the system and generate the reports. Once the customer has received access, a wide variety of reports may be generated. By way of example, FIG. 11 illustrates a display screen 1000 where market trend reports can be generated by industry, geography and payment type. Further, the market trend reports may illustrate dollar volume growth, average ticket growth or transaction growth. As previously described, these are typically cast in terms of same store growth as compared to a previous point in time, such as the previous year. To generate these reports, display screen 1000 includes a variety of buttons or icons that may be selected with a pointing device, such as mouse, to produce the report. For example, display screen 1000 includes an industry view button 1002, a regional view button 1004, and a payment type view button 1006. Also, a dollar volume growth button 1008 is provided along with an average ticket growth button 1010 and transaction growth button 1012. In FIG. 11, industry view button 1002 has been selected along with the dollar volume growth button 1008. Accordingly, a line graph is produced showing the dollar volume growth for certain months as a percentage relative to the same month of the previous year.

Figure 12:
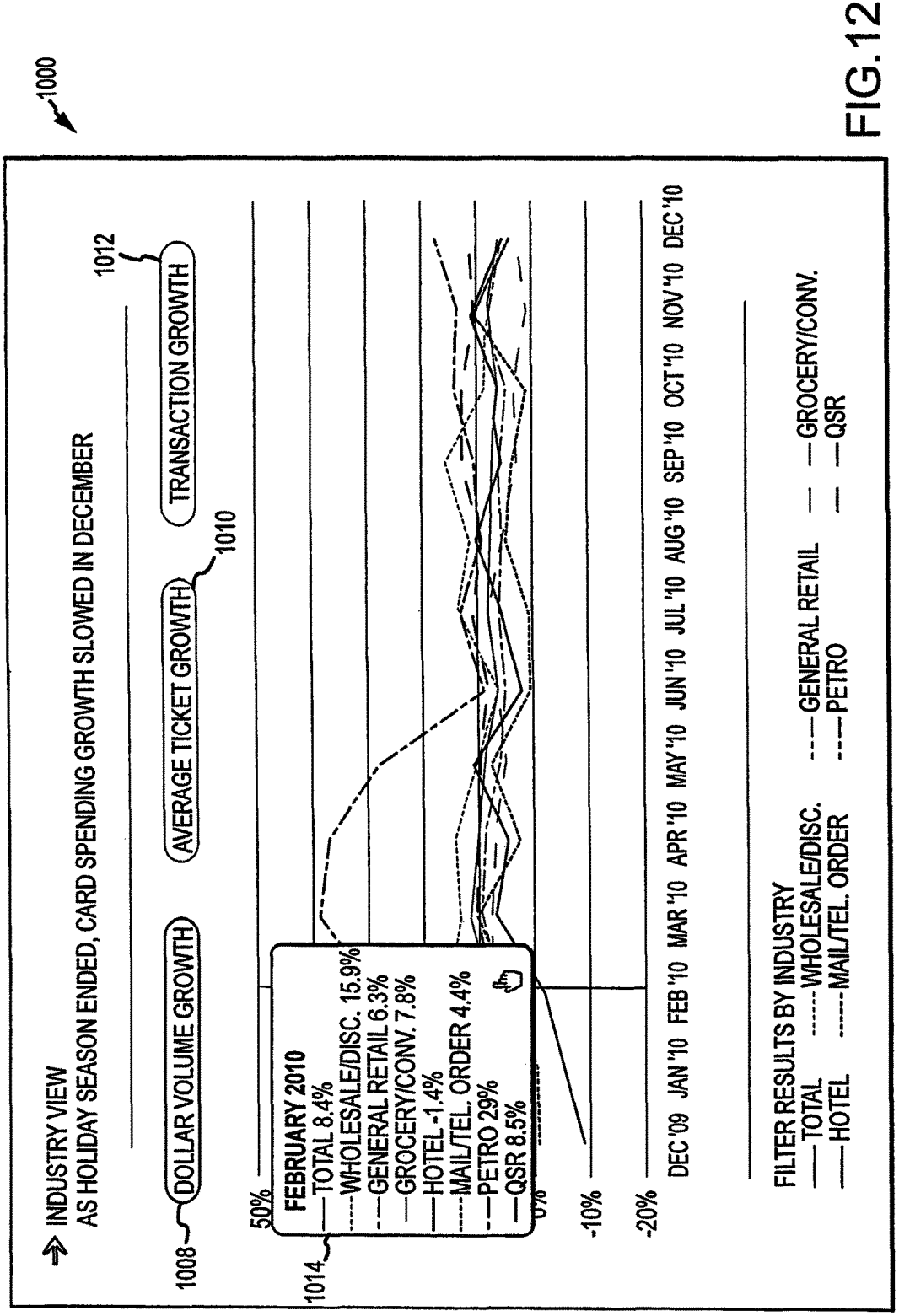
FIG. 12 illustrates the display screen of FIG. 11 with a superimposed snapshot of numeric growth percentages.
Figure 13:
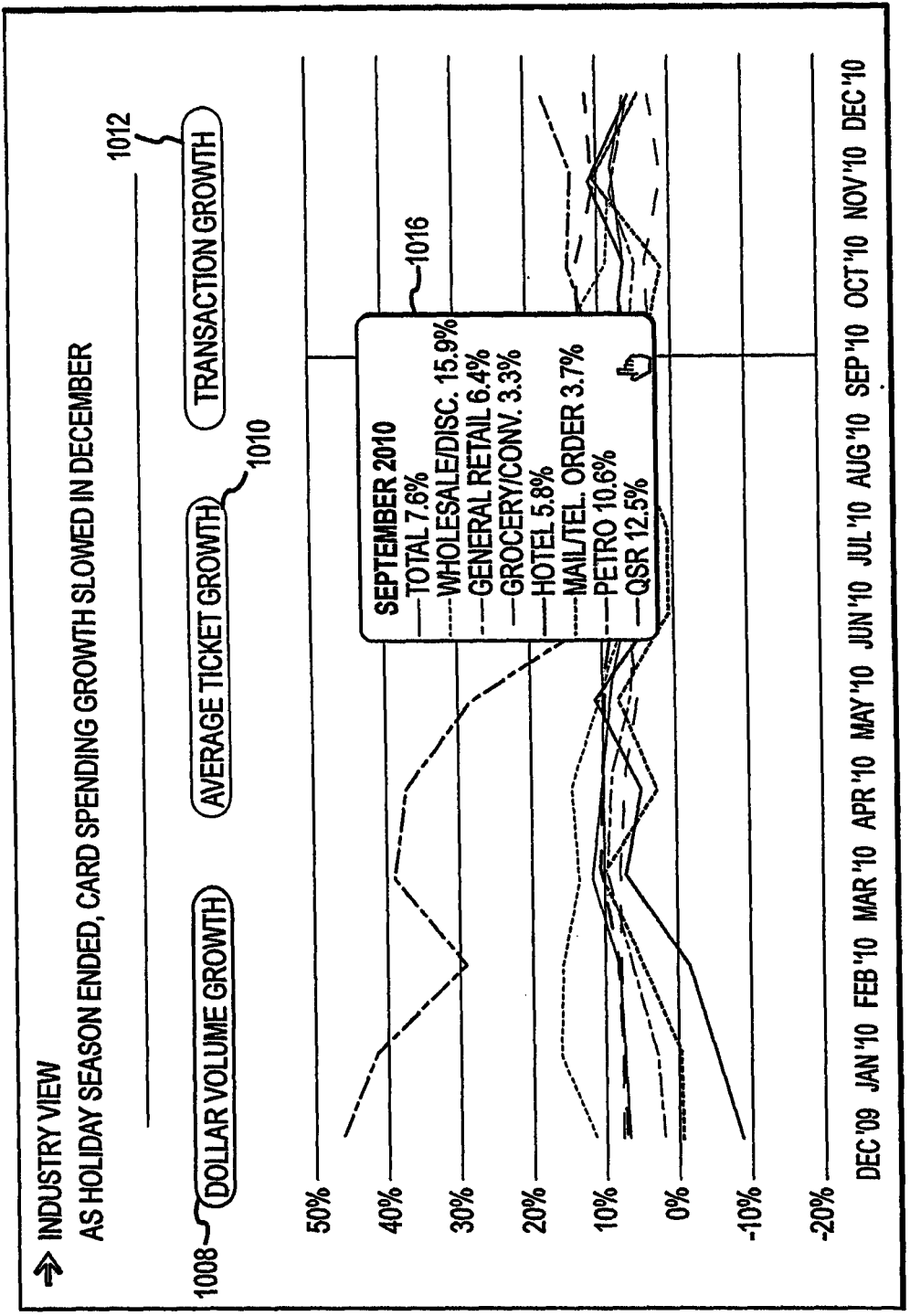
FIG. 13 illustrates the display screen of FIG. 11 showing another snapshot of certain growth percentages at another point in time.
Figure 14:
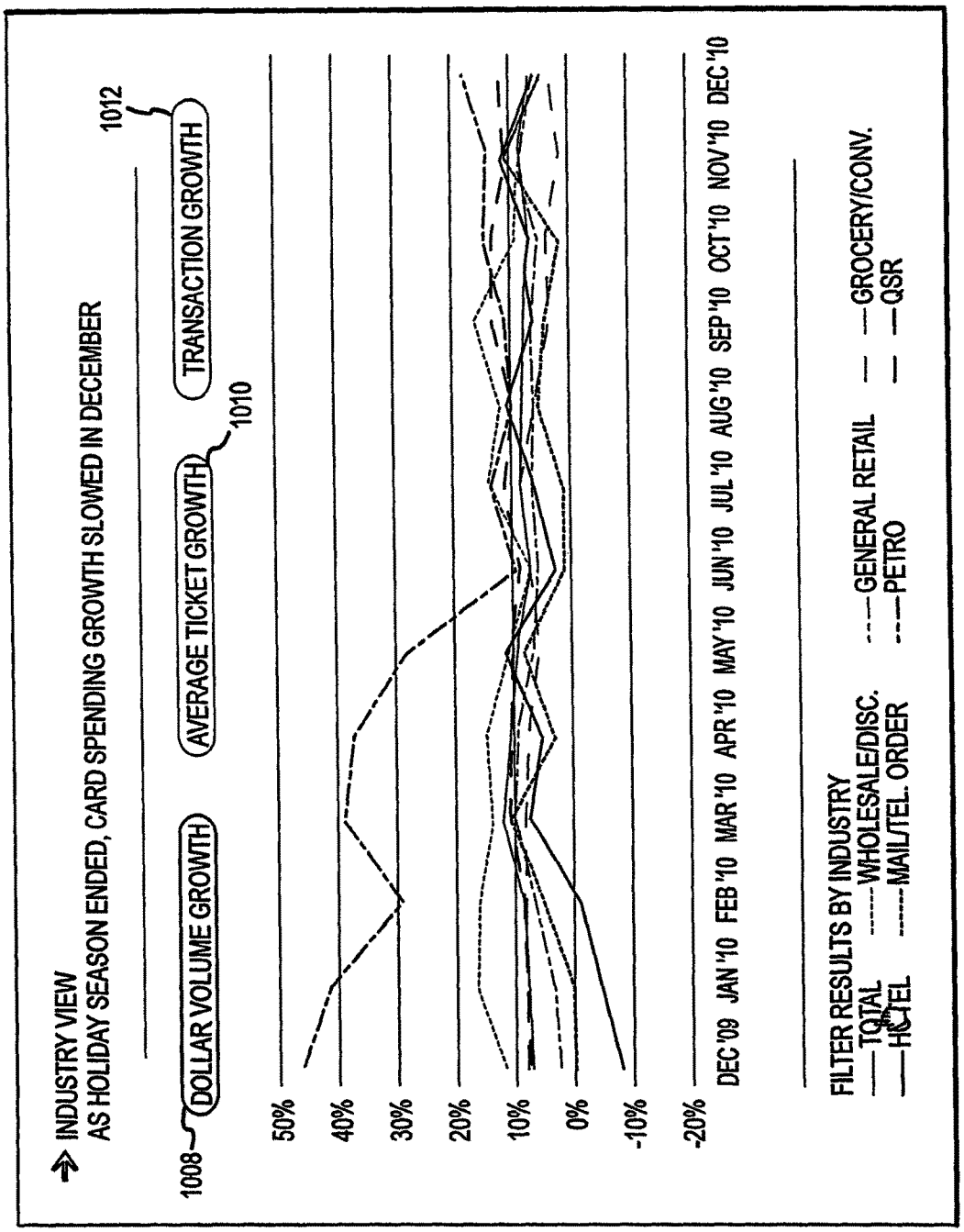
FIG. 14 illustrates the display screen of FIG. 11 with a "total" category being filtered from the display screen.

As illustrated in FIG. 12, a pointing device may be moved over the line graph to a particular month in order to superimpose a display 1014 which shows a snapshot of the percentages by industry for a given month. For example, as shown in FIG. 12, when the pointing device is moved over February 2010, display 1014 illustrates the percentage growth for a total of all industries as well as the specific industries of wholesale/discount, general retail, grocery/convenience, hotel, mail/telephone order, petroleum, and QSR. The dollar volume growth percentages are for same store comparisons with February 2009. As shown in FIG. 13, the pointing device may be moved to another month, such as September 2010, to produce another display 1016 showing dollar volume growth by industry for September 2010. The bottom of display screen 1000 also includes a listing of the various industries and allows these industries to be filtered from the report by moving the pointing device over one of the industries and selecting that industry to remove it from the report. For example, FIG. 14 illustrates the resulting display when the total percentage has been filtered from the report. This process could be repeated for any of the industries so that as many or as few industries as is desired may be depicted on display screen 1000.

Figure 15:
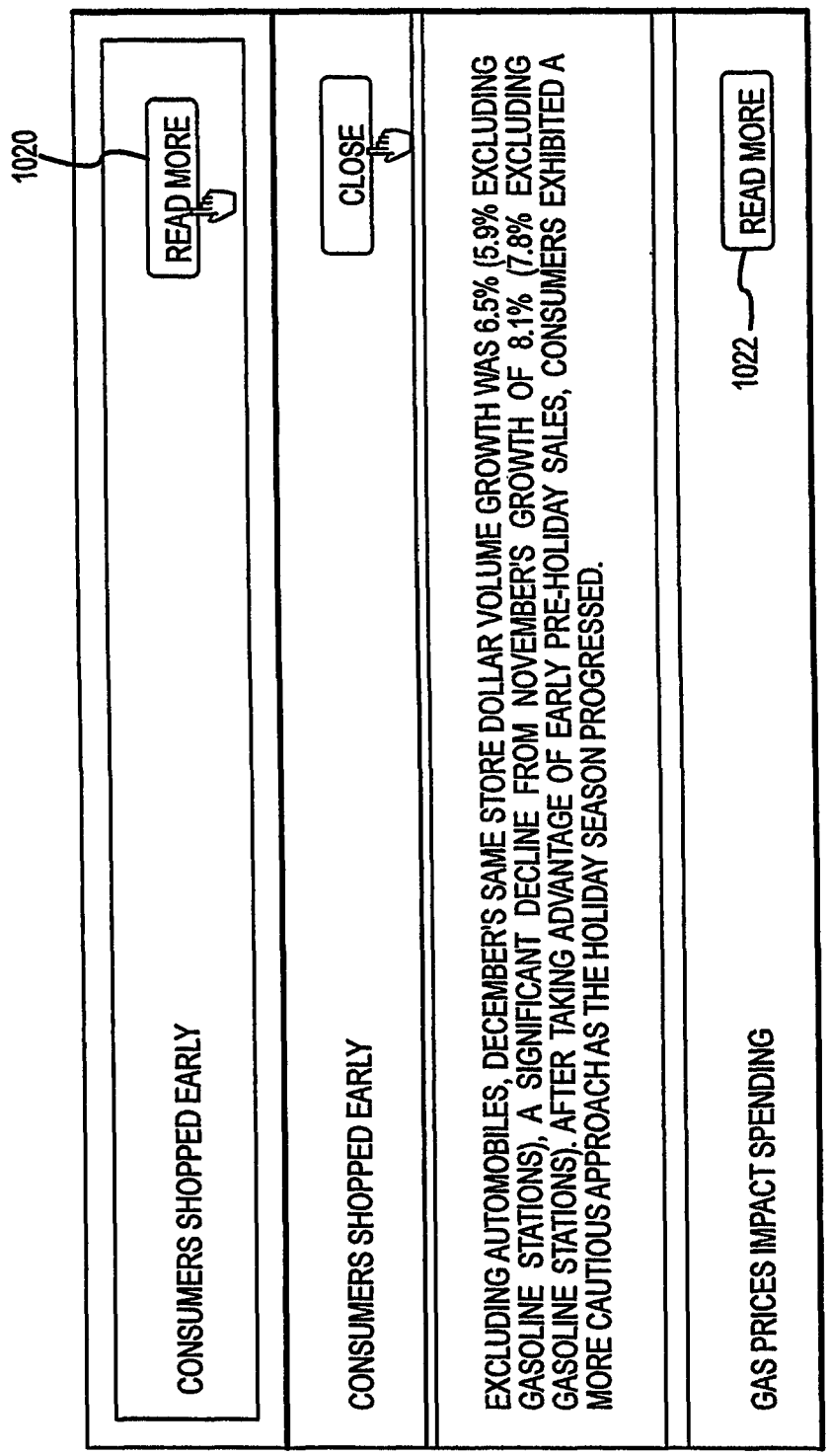
FIG. 15 illustrates the display screen of FIG. 11 when a "read more" icon is selected to provide additional information as to why customers shopped early.

Display screen 1000 of FIG. 11 also includes explanation buttons 1020 and 1022. These may be selected to produce additional information explaining the displayed data. For example, in FIG. 15 button 1020 has been selected to produce an explanation as to why customers may have shopped early. As shown, the December same store dollar volume growth was less than November's growth. This reveals that customers may have taken advantage of early pre-holiday sales then taken a more cautious approach as the holiday season progressed. Display screen 1000 may also include a further information button 1024 which may be selected by a pointing device in order to produce further information explaining each of the reports.

Figure 16:
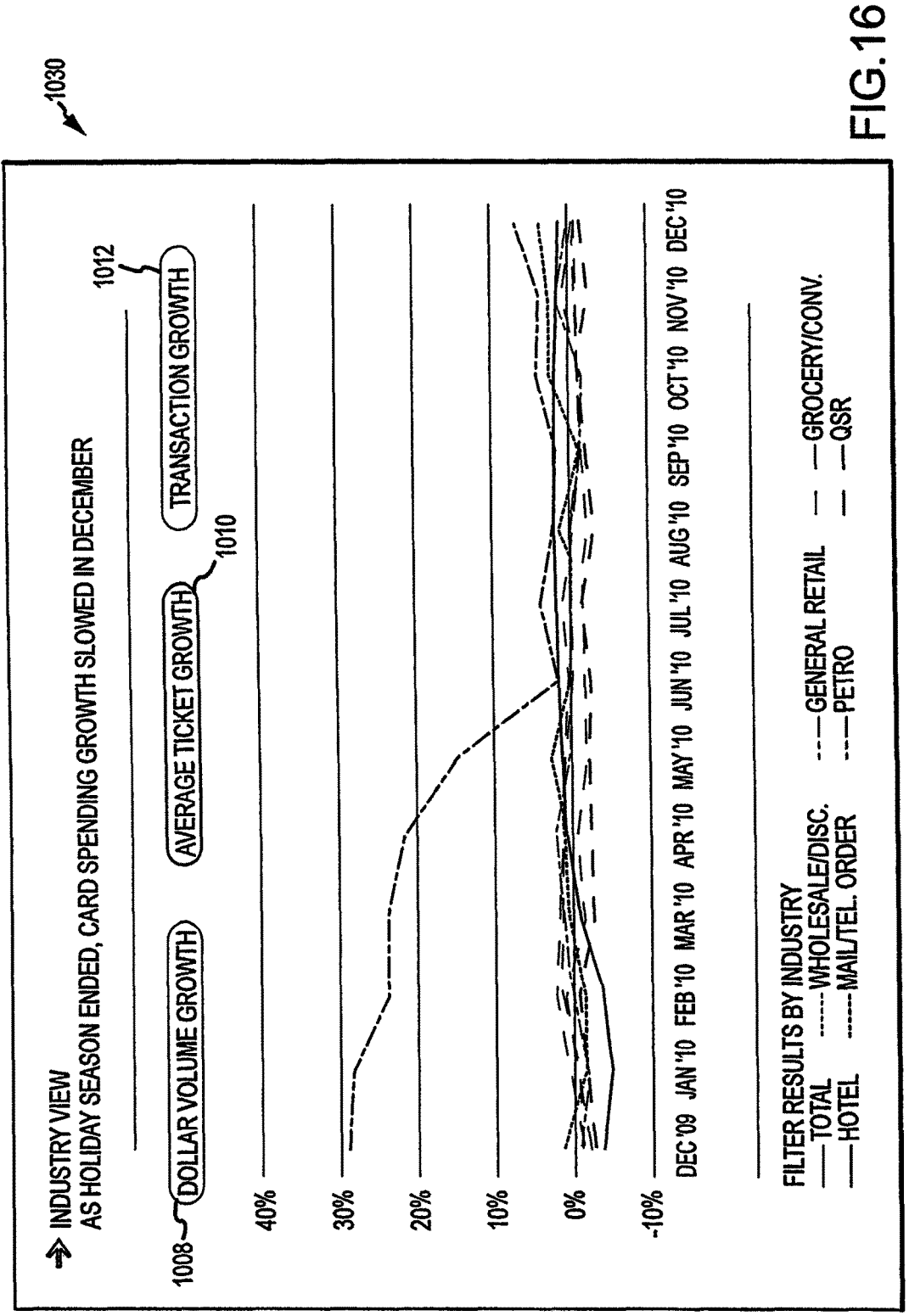
FIG. 16 illustrates a display screen of average ticket growth by industry according to the invention.
Figure 17:
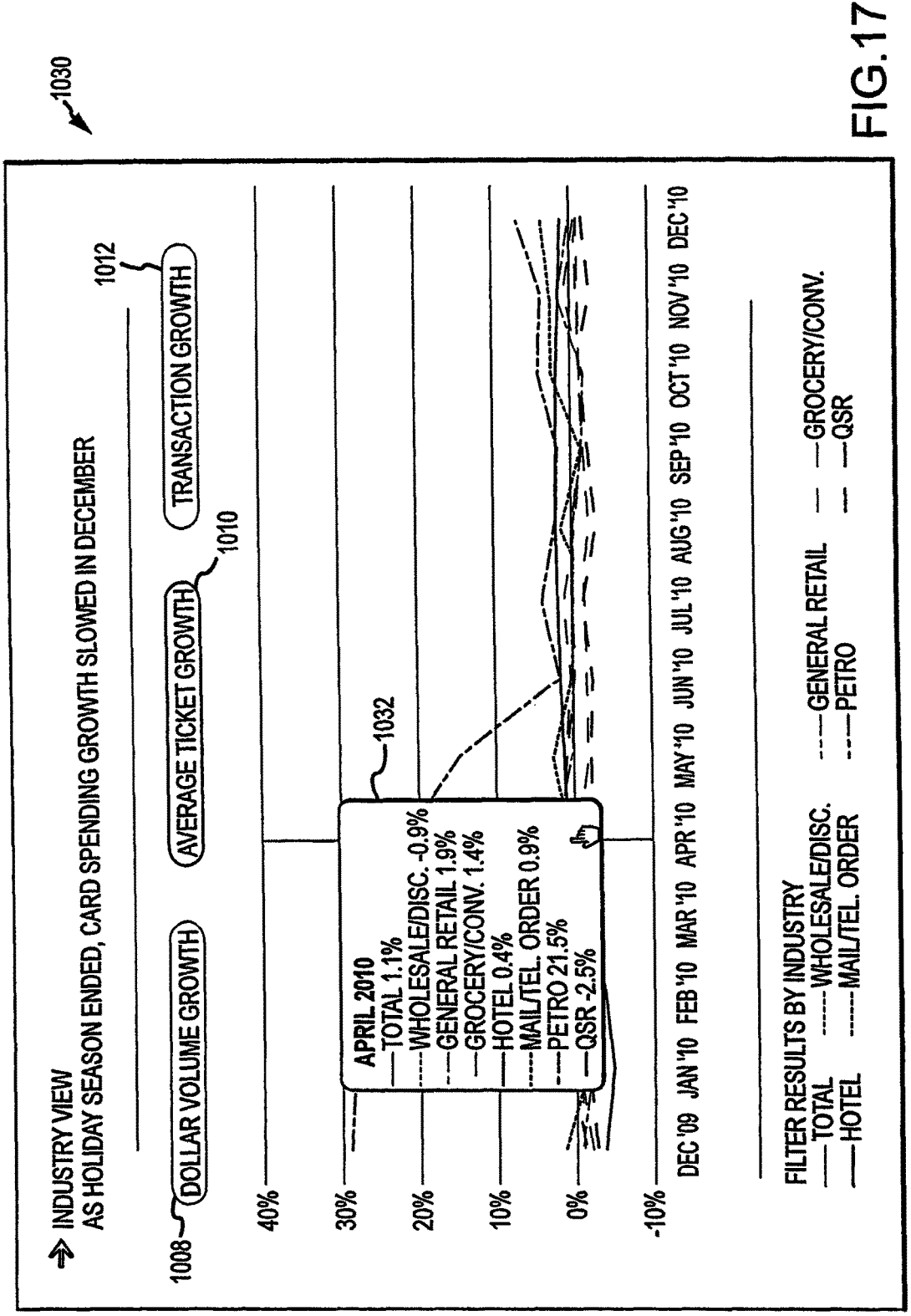
FIG. 17 illustrates the display screen of FIG. 16 with a superimposed snapshot of certain numeric growth percentages.

FIG. 16 illustrates a display screen 1030 that is produced when the average ticket growth button 1010 is selected. Various lines are displayed showing same store average ticket growth by industry. By a moving a pointing device over the line graph, a display 1032 may be produced to display the average ticket growth for a given month corresponding to the location of the pointing device. Display 1032 is superimposed over the line graph to provide a numeric display of the growth percentages for that given month.

Figure 18:
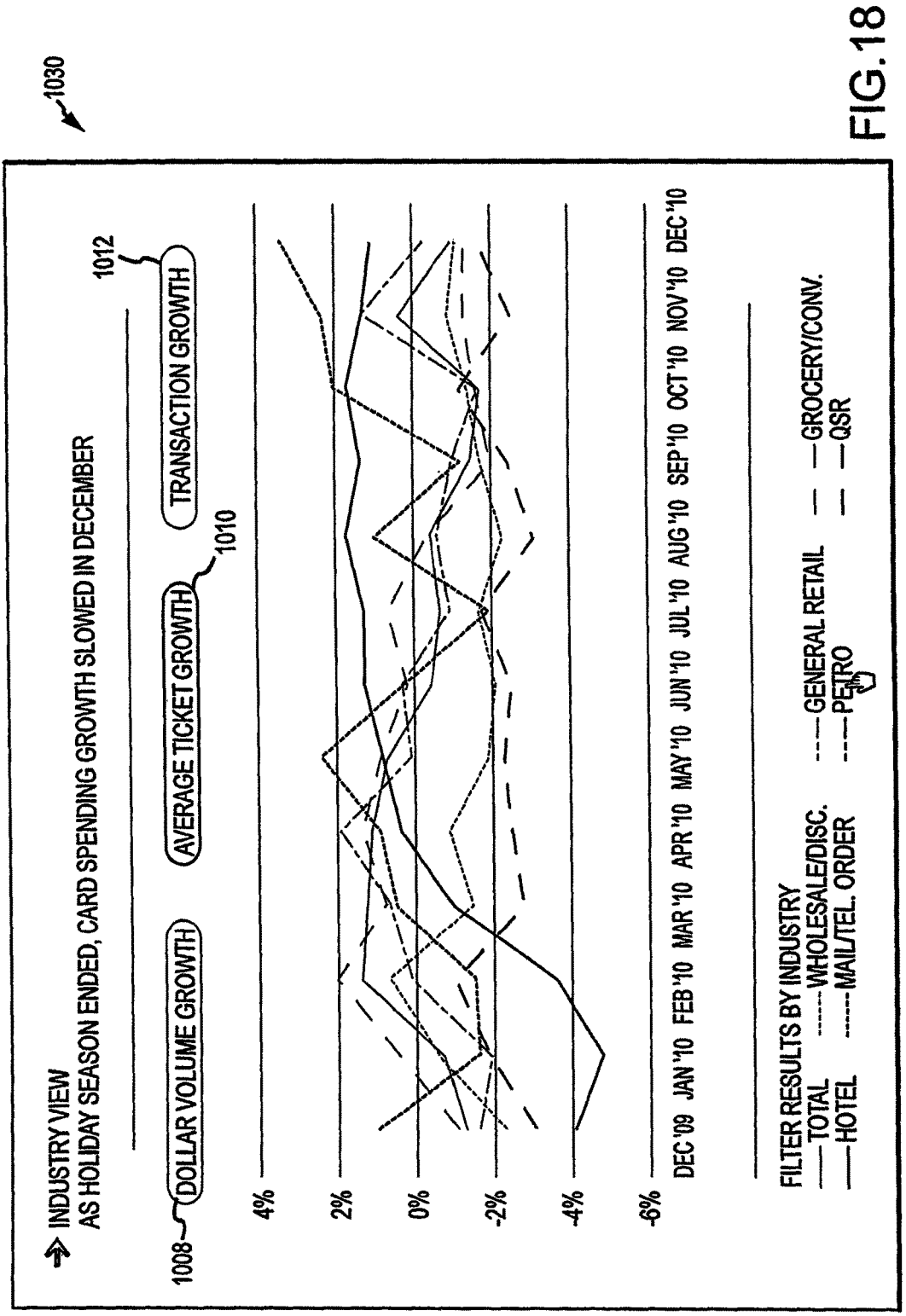
FIG. 18 illustrates the display screen of FIG. 16 when one of the industries is filtered.
Figure 19:
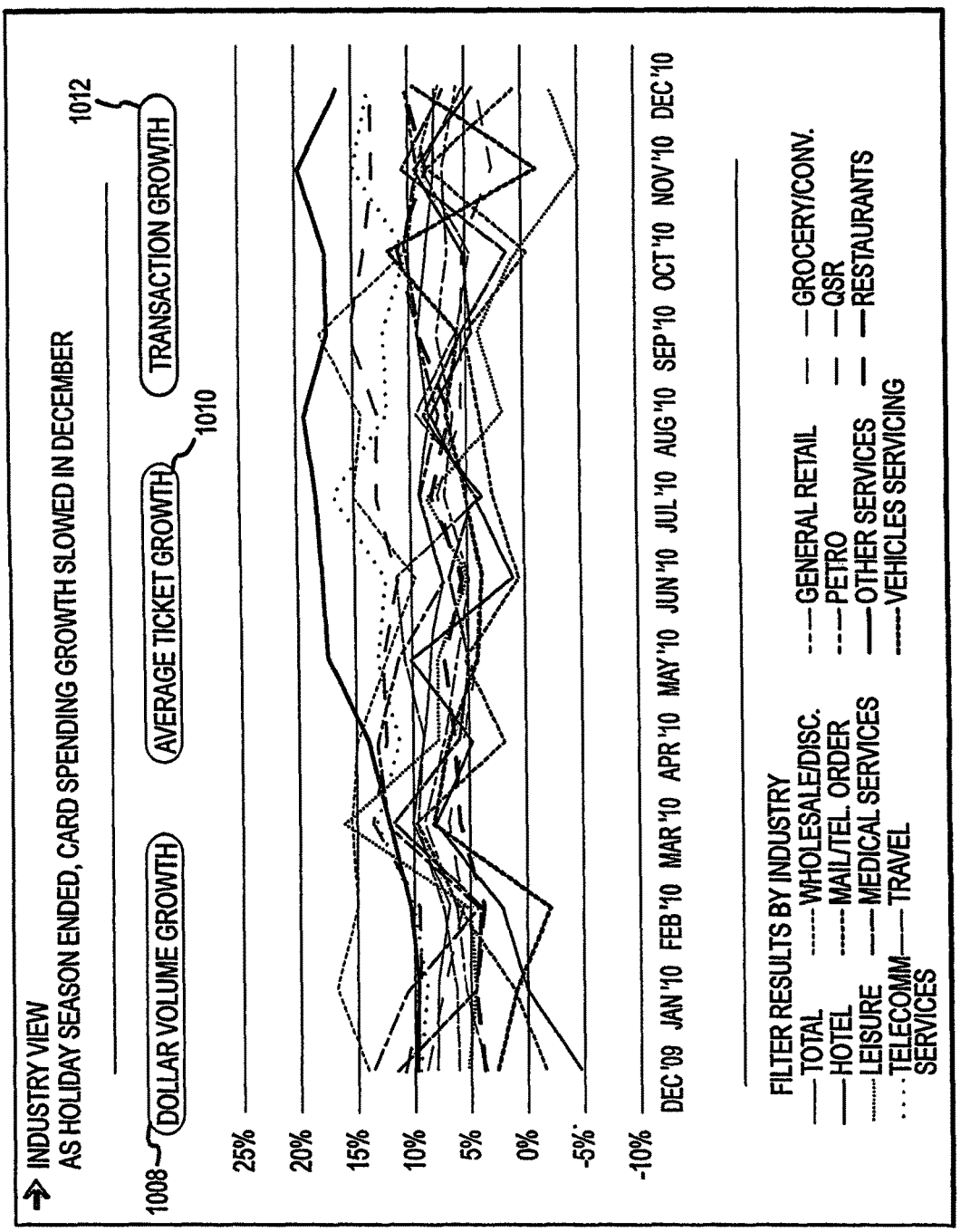
FIG. 19 is a display screen illustrating transaction growth by industry.
Figure 20:
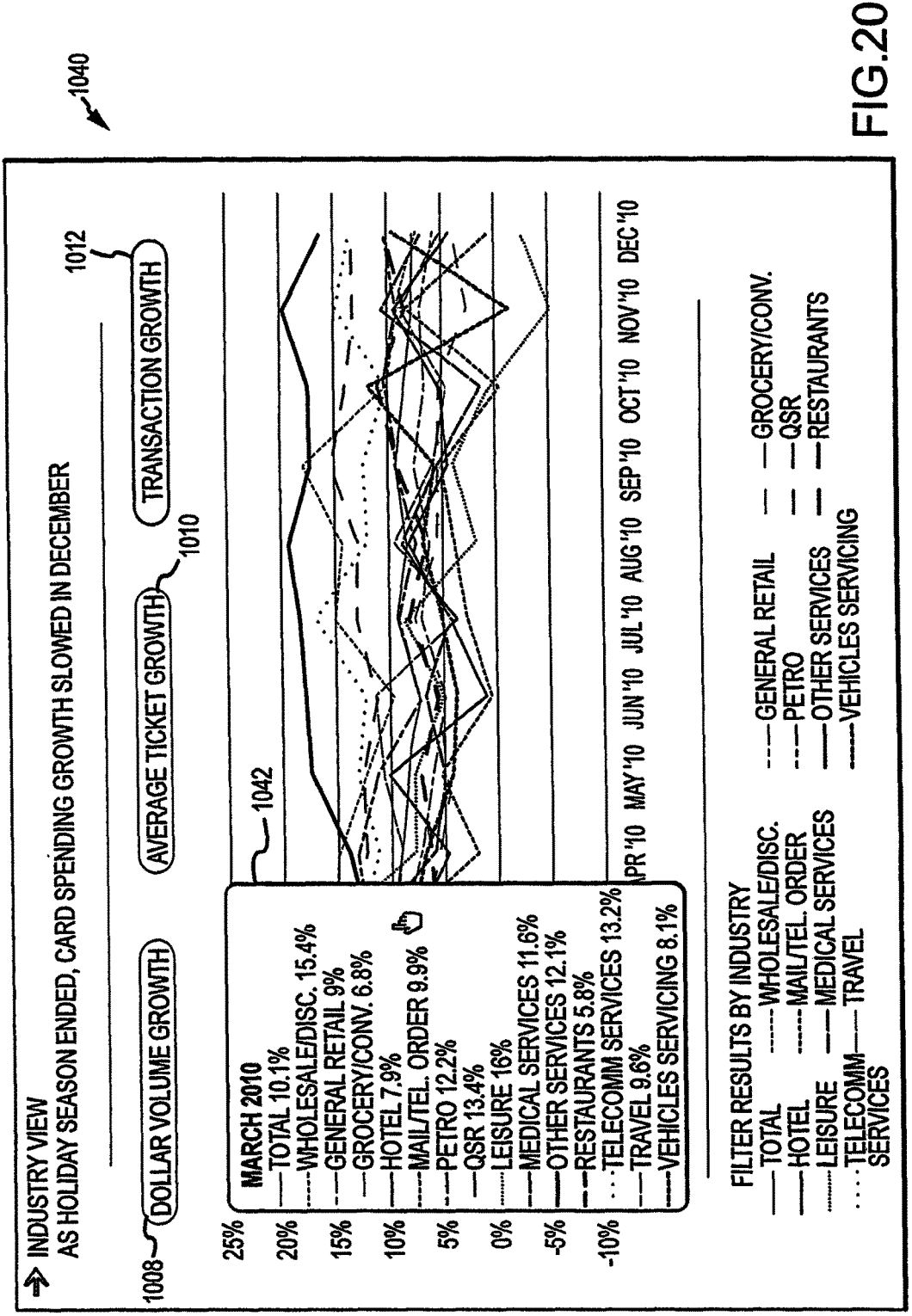
FIG. 20 illustrates the display screen if FIG. 19 with a superimposed snapshot of certain numeric percentages.
Figure 21:
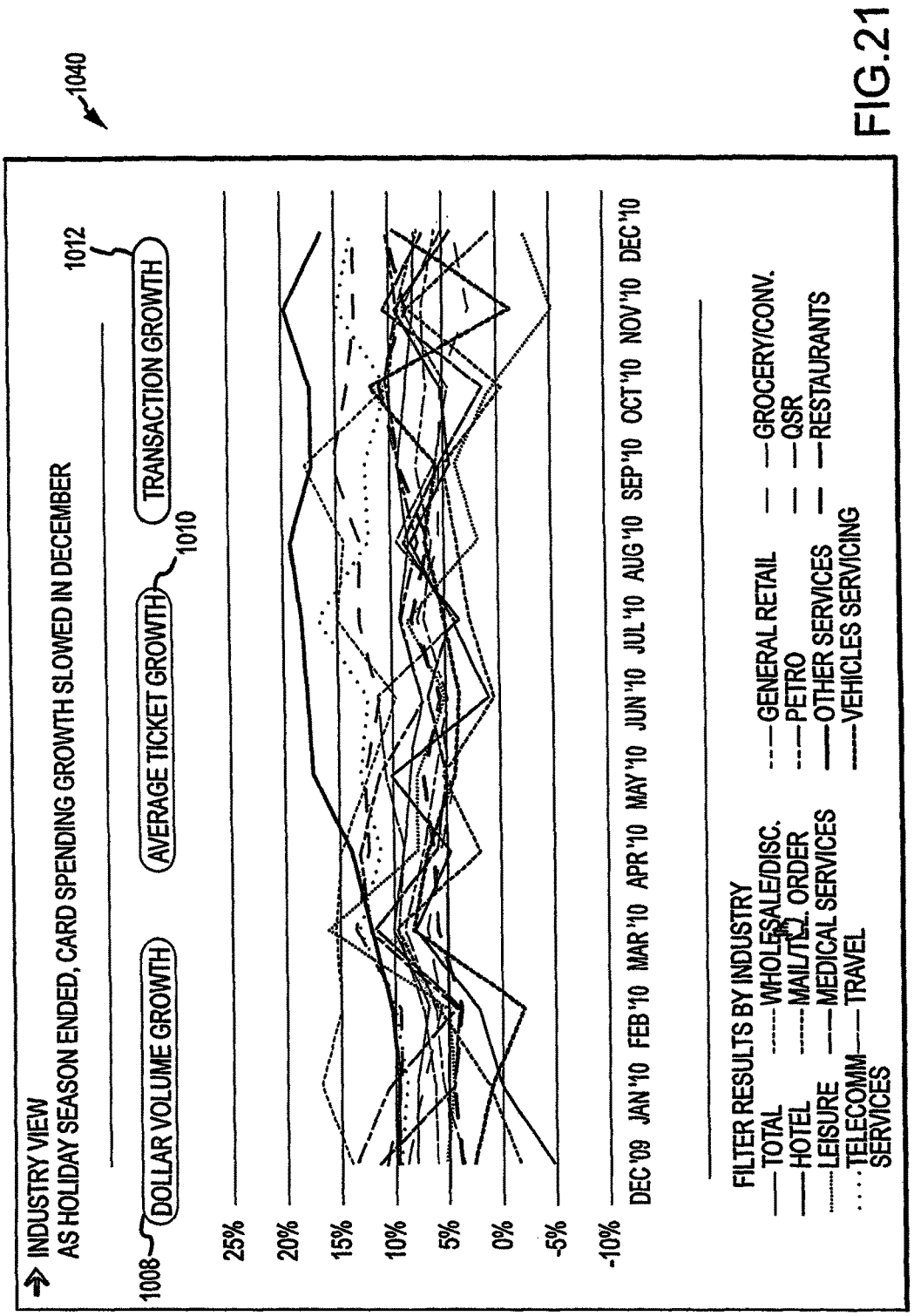
FIG. 21 illustrates the display screen of FIG. 19 with one of the industries filtered from the report.

FIG. 18 illustrates the ability to filter by industry. In FIG. 18, the petroleum industry is deselected and the graph is resealed to more clearly display the average ticket growth of the other industries. As many or as few of the industry icons may be selected or deselected in order to display the desired industries on the graph. FIG. 19 illustrates a display screen 1040 that is produced when the transaction growth button 1012 is selected. In this case, a line graph is produced showing the same store transaction growth by industry. This is based on the number of transactions that occurred within the same store as compared to a previous point of time. FIG. 20 illustrates a display 1042 that is produced when a pointing device is moved over the line graph to numerically display the transaction growth for a given month. As illustrated in FIG. 21, the report may be filtered by industry by selecting or deselecting one of the industry icons at the bottom of display screen 1040. As shown in FIG. 21, the wholesale/discounter industry has been removed from the market trend report.

Figure 22:
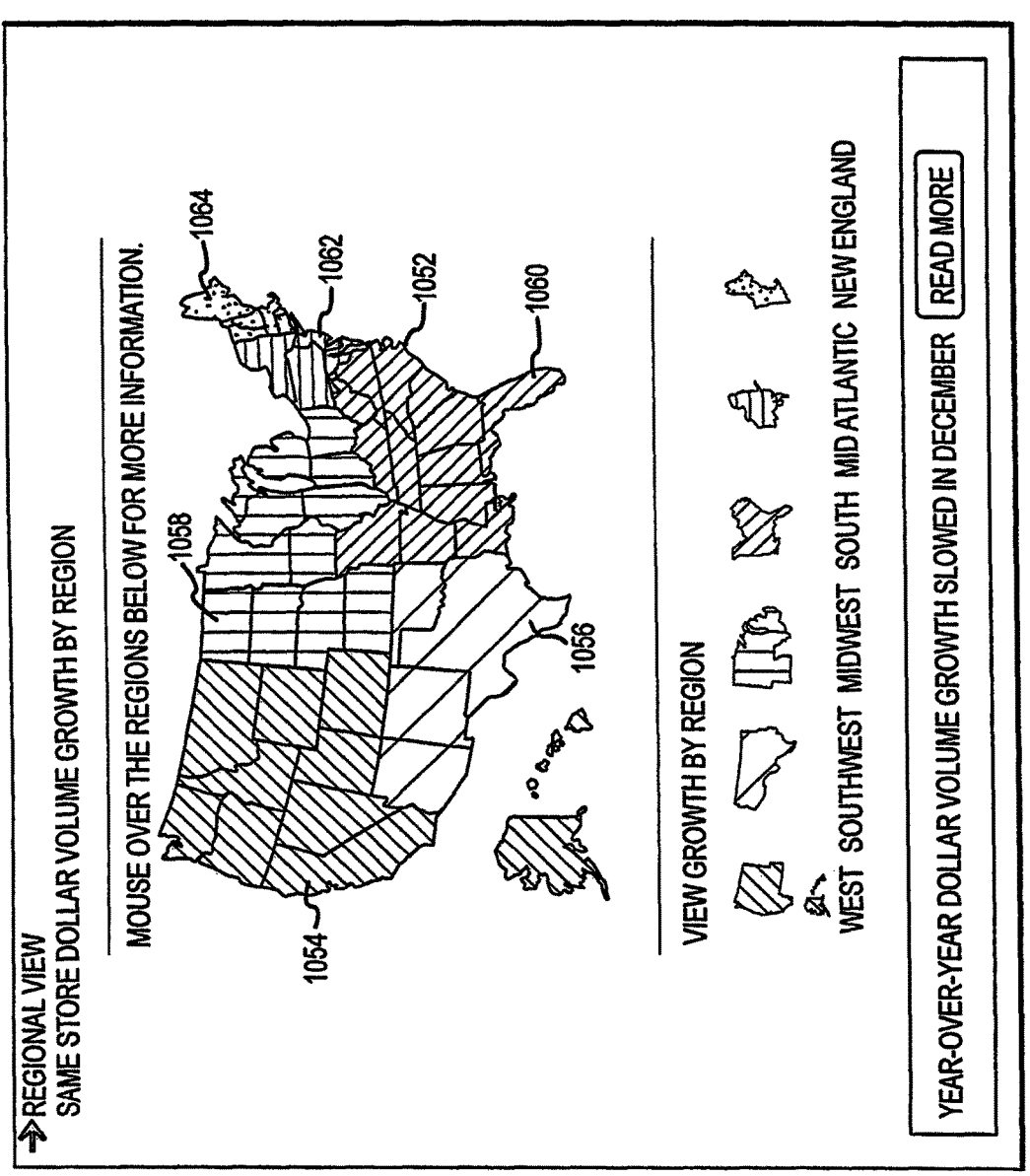
FIG. 22 is a display screen illustrating same store volume growth by region.
Figure 23:
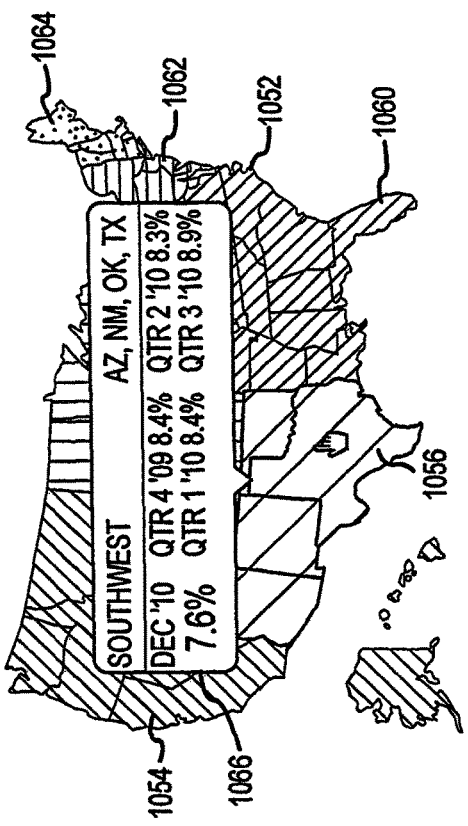
FIG. 23 illustrates the display screen of FIG. 22 when a pointer device is moved over one of the regions to show the volume grown percentages.
Figure 24:
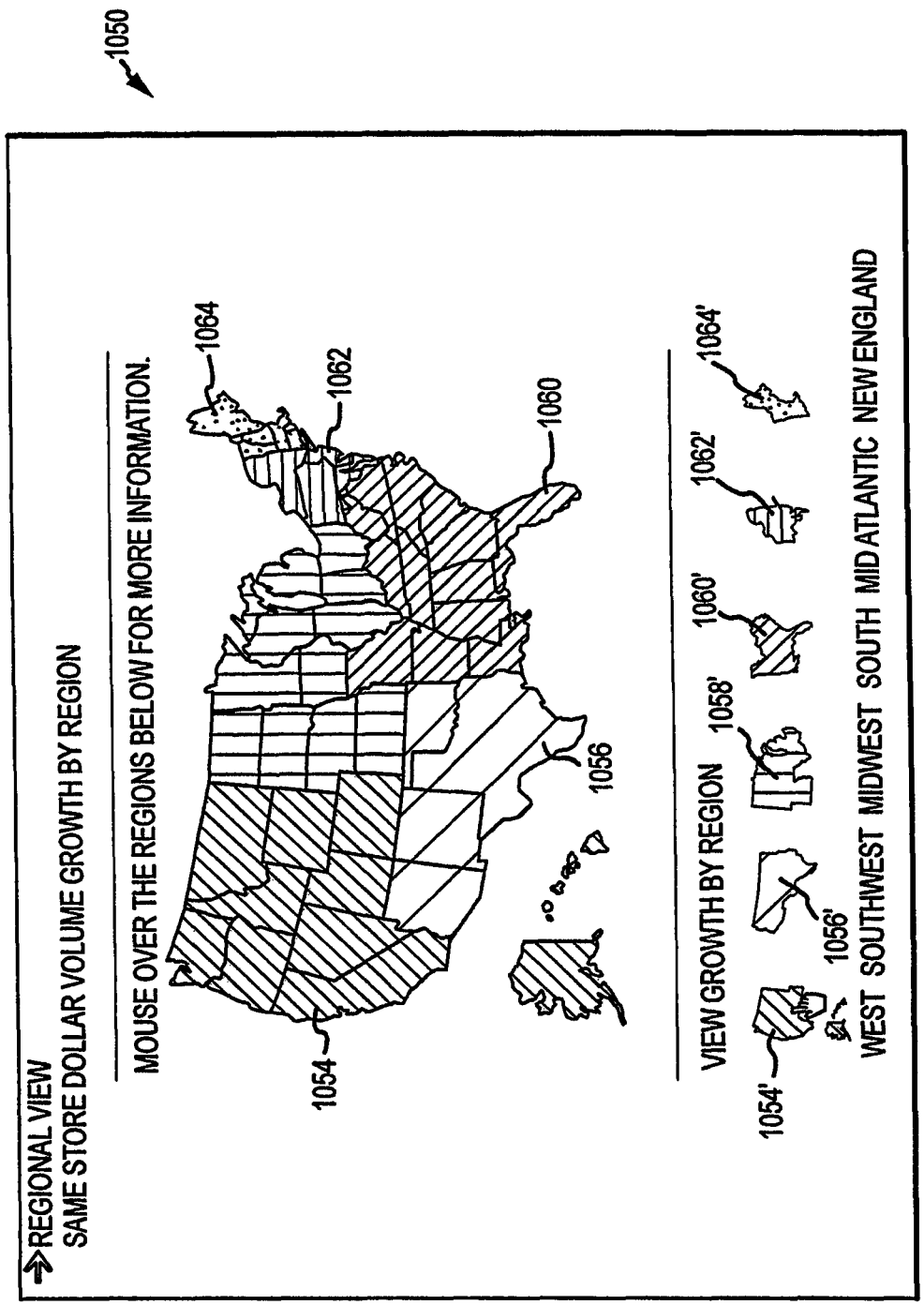
FIG. 24 illustrates the display screen of FIG. 22 when a pointer is moved over an icon representing growth by region.

FIG. 22 illustrates a display screen 1050 that is produced when regional view button 1004 of display screen 1000 (see FIG. 11) is selected. Display screen 1050 illustrates a map 1052 of the United States. This is segmented into a West region 1054, a Southwest region 1056, a Midwest region 1058, a South region 1060, a mid-Atlantic region 1062 and a New England region 1064. However, it will be appreciated that other regions could be defined. As illustrated in FIG. 23, the pointing device may be moved over one of the regions in order to produce a display 1066 which shows the same store dollar volume growth for that particular region. In the example of FIG. 23, the pointing device is moved over Southwest region 1056 and display 1066 illustrates same store dollar volume growth for the Southwest for December 2010 as well as for the fourth quarter of 2009, quarter one of 2010, quarter two of 2010 and quarter three of 2010. In a similar manner, displays could also be presented showing average ticket growth or transaction growth. As illustrated in FIG. 24, the bottom of display screen 1054 includes various buttons that correspond to the various regions 1054-1064 and for convenience of illustration use these same reference numerals filed by a "'". In FIG. 24, the West region button 1054' button is selected to produce a display screen 1070 as illustrated in FIG. 25.

Figure 25:
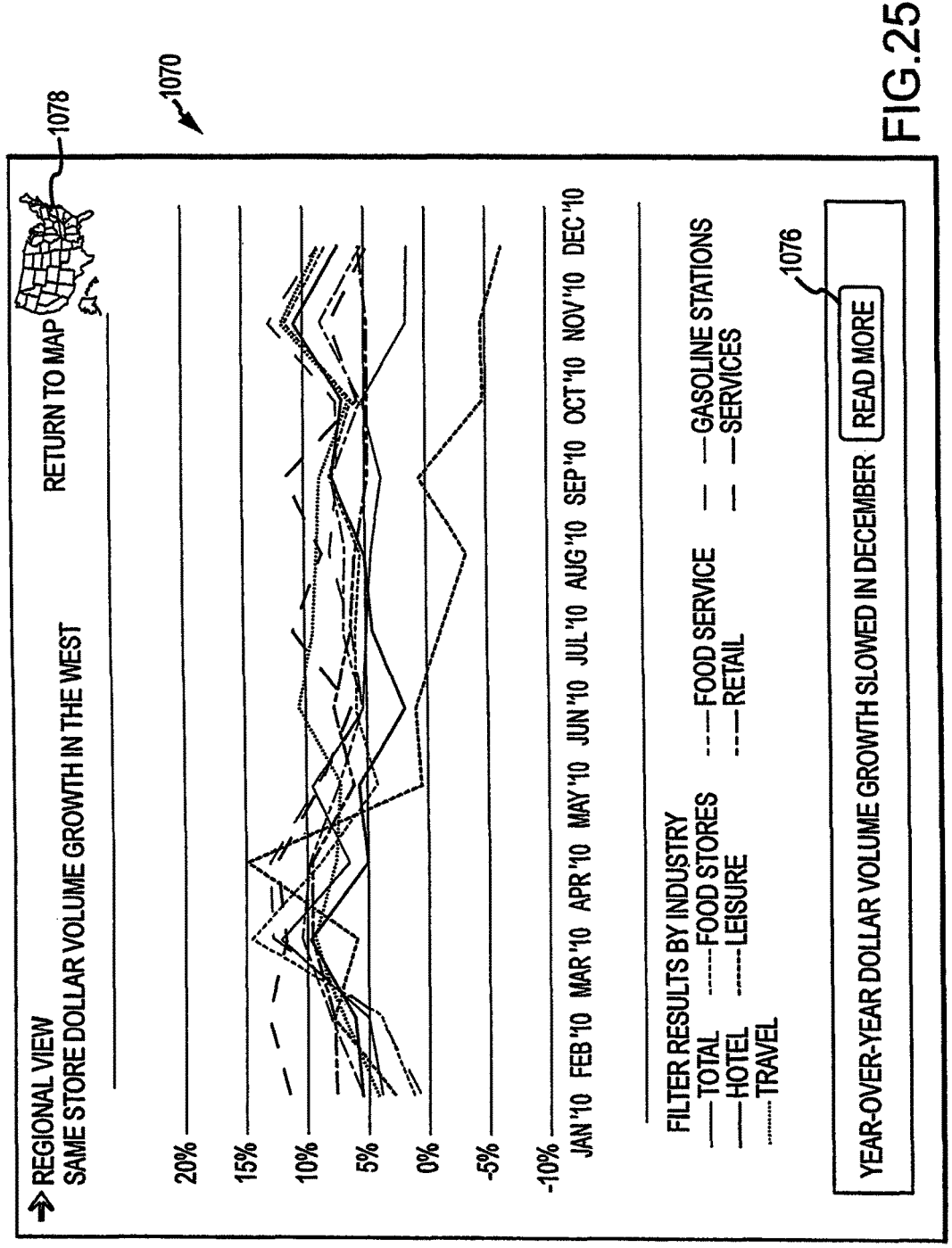
FIG. 25 illustrates the display screen that is produced when the regional icon of FIG. 24 is selected.
Figure 26:
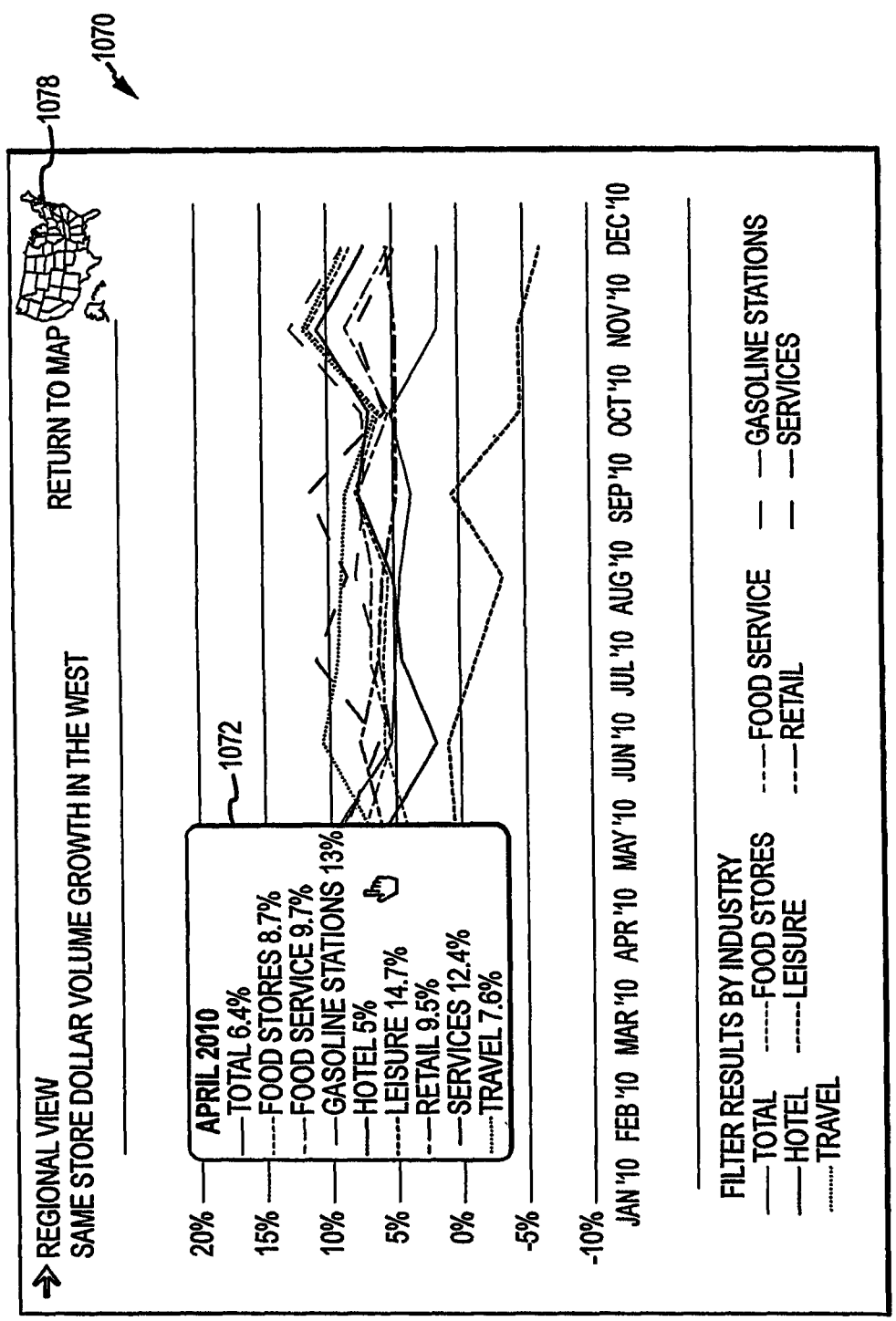
FIG. 26 illustrates the display screen of FIG. 25 and further showing a snapshot of certain percentages superimposed over the line graph.
Figure 27:
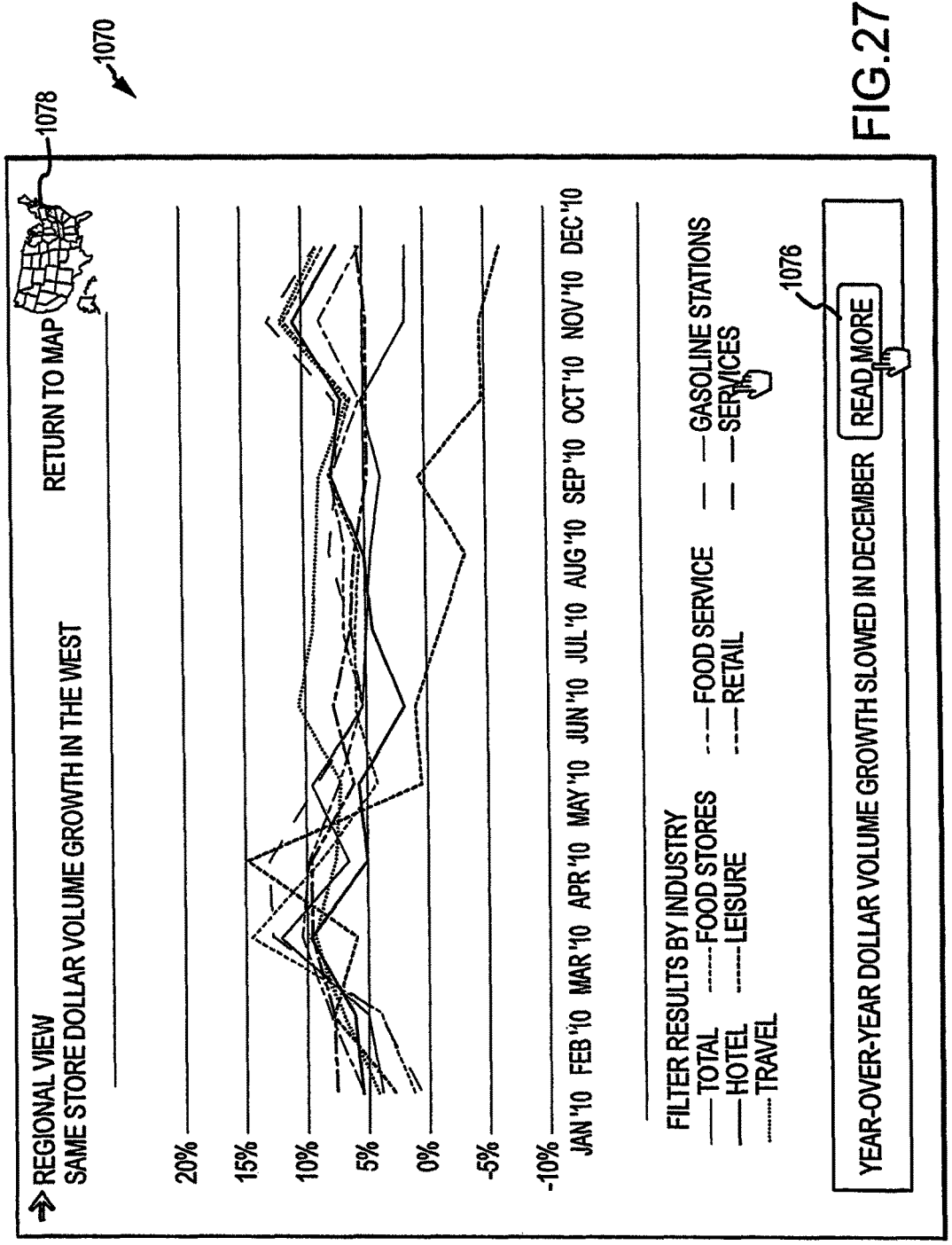
FIG. 27 illustrates the display screen of FIG. 25 when an industry has been filtered from the report.
Figure 28:
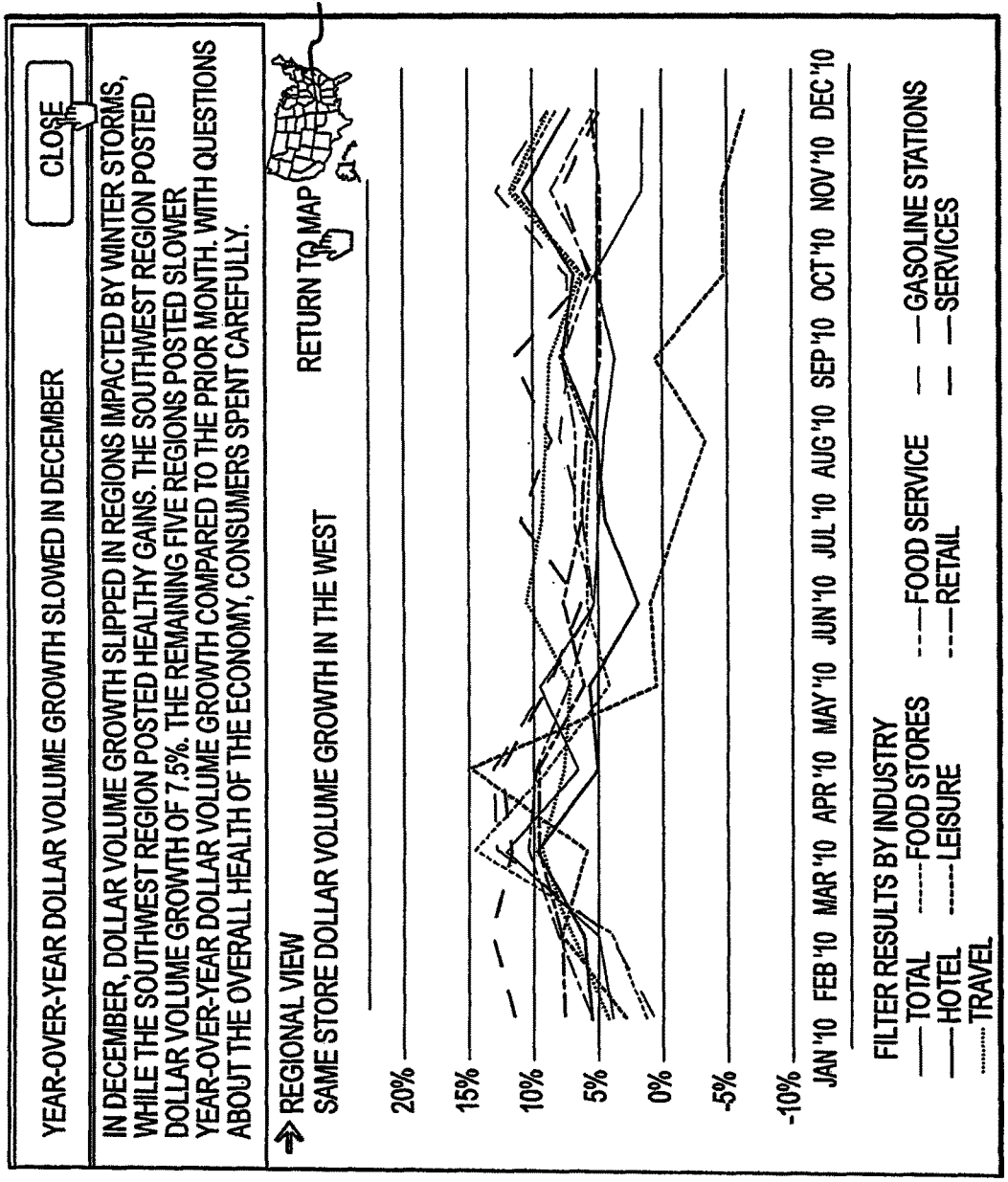
FIG. 28 illustrates the display screen of FIG. 27 when the "read more" icon is selected to show more information as to why volume growth slowed in December.

Display screen 1070 of FIG. 25 illustrates the same store dollar volume growth for the West region by industry. The various industries are listed at the bottom of display screen 1070 similar to other embodiments described herein. For example, as illustrated in FIG. 26, the pointing device may be moved over the line graph to produce a display 1072 which shows a snapshot in time (corresponding to April 2010) of the same store dollar volume growth. The growth percentages are shown numerically for each of the industries as well as for a total of all of the industries combined. Similar to other embodiments, each of the industries may be filtered by moving the pointing device to one of the industry icons and selecting it or deselecting it. In FIG. 27, the services industry icon button has been selected to filter out the services industry from the line graph. Further, one or more "read more" icons may be selected to present additional information that explains the data. For example, FIG. 27 includes a read more button 1076 that may be selected to produce additional information as shown in FIG. 28. More specifically, an explanation is given as to why year-over-year dollar volume growth slowed in December. In this case, dollar volume growth slipped in regions impacted by winter storms while the Southwest region increased. Finally, a return to map button 1078 may be selected to return the user to display screen 1050 of FIG. 22.

Figure 29:
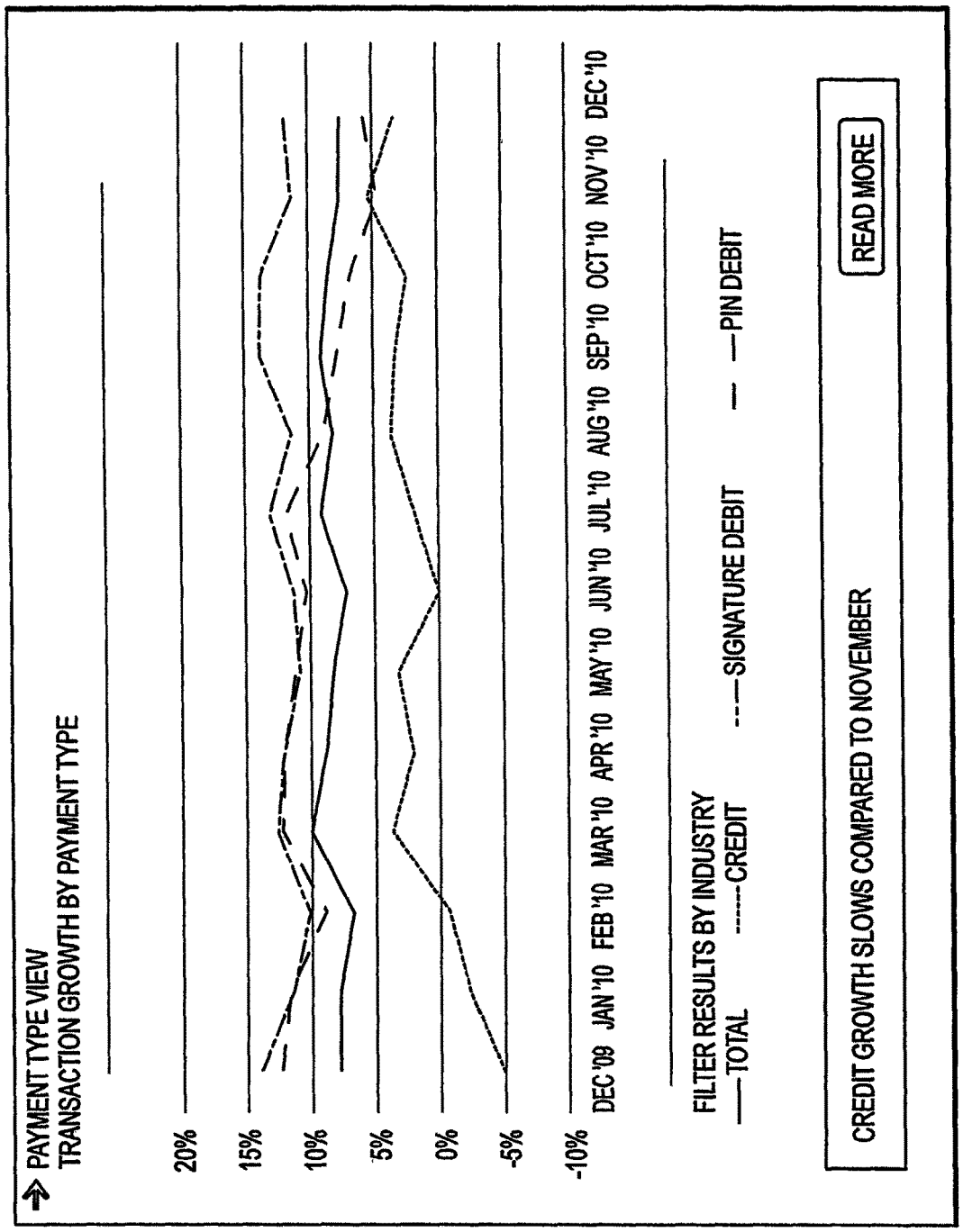
FIG. 29 illustrates a display screen showing transaction growth by payment type.
Figure 30:
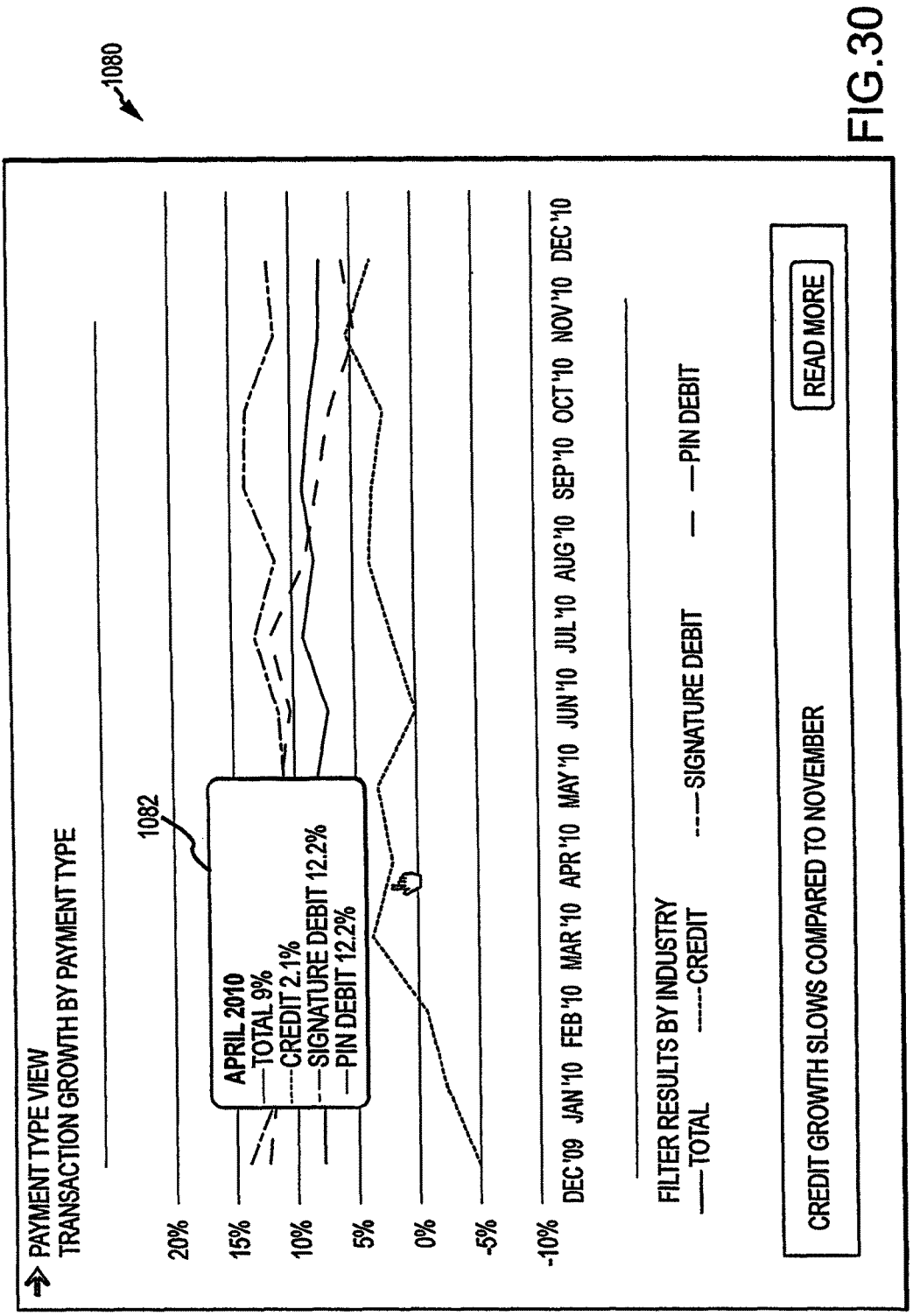
FIG. 30 illustrates the display screen of FIG. 29 with a snapshot of certain percentages superimposed over the line graph.

FIG. 29 illustrates a display screen 1080 that is produced when payment type view button 1006 of FIG. 11 is selected. Display screen 1080 illustrates the transaction growth by payment type. Further, the transaction growth is filtered by industry, e.g., payment instrument type. Although shown as transaction growth, it will be appreciated that similar display screens could be produced for dollar volume growth and average ticket growth by payment type. Similar to other embodiments, the pointing device may be moved over the line graph to produce a display 1082 which numerically displays the transaction growth for a given point in time. In FIG. 30, the transaction growth is shown for each of the payment types for April 2010. As the pointing device is moved over the line graph, numeric displays will be shown for the other months. Further, similar to other reports, the growth is shown as compared to same store as compared to a previous point in time.

Figure 31:
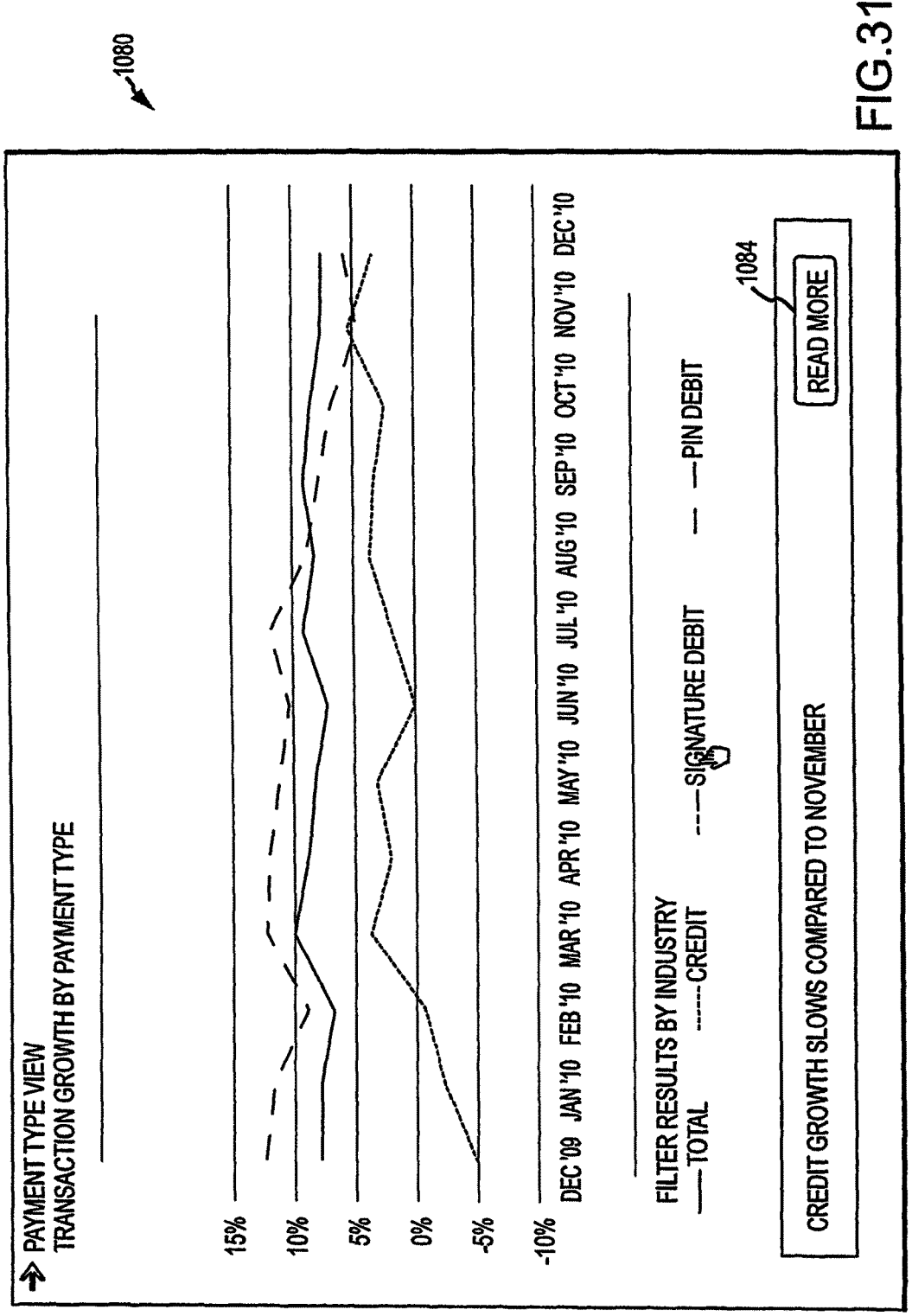
FIG. 31 illustrates the display screen of FIG. 29 when one of the payment types is filtered from the report.

As illustrated in FIG. 31, the display may be filtered by industry by using the pointing device to select or deselect one of the payment types. In FIG. 31, the signature debit payment type is selected to remove that data from the display screen. Also similar to other embodiments a "read more" button 1084 may be provided to give additional explanations regarding an explanation of the display data.

Figure 32:
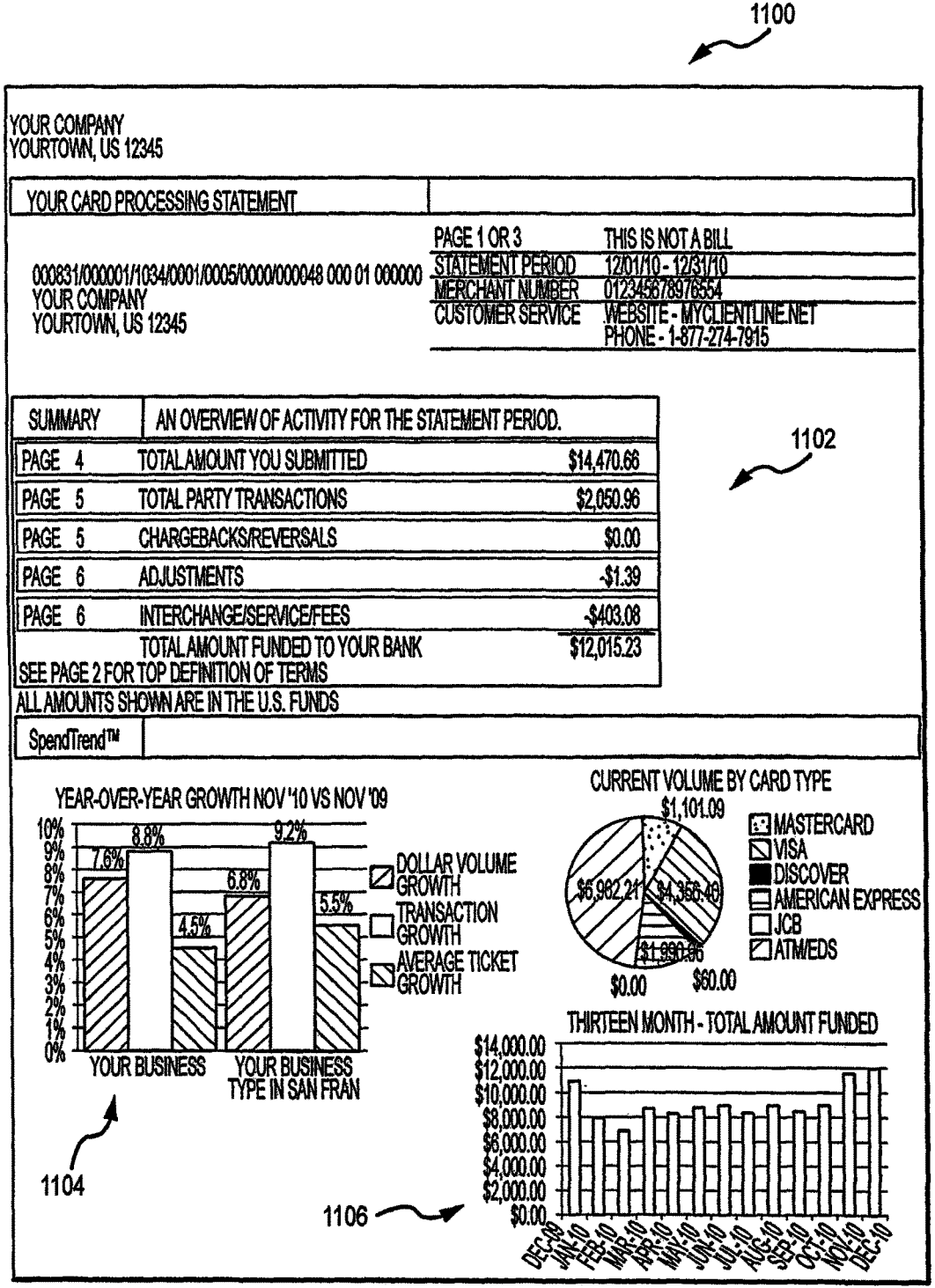
FIG. 32 illustrates a card processing statement that may be transmitted to a customer showing monthly activity as well as same store growth for the customer's business and how the customer performed relative to similarly situated merchants.

FIG. 32 illustrates a statement 1100 that may be produced by any of the systems or subsystems described herein. Statement 1100 is a type of statement that may be received by a merchant who accepts various types of payment instruments, such as credit cards, debit cards, prepaid cards, negotiable instruments or the like. In this example, the merchant is an Internet merchant who is receiving a card processing statement. Statement 1100 includes a summary region 1102 which shows the activity for the given month. The summary further shows various deductions for services provided in connection with processing cards presented to the merchant when making purchases. Statement 1100 further includes a market trend report 1104 that shows same store growth for the merchant's business compared to a previous point in time. In this example, the growth of the merchant's business is compared using data from November 2009 and November 2010. As shown, the merchant's business has grown 7.6 percent by dollar volume, 8.8 percent by transaction and 4.5 percent by average ticket. To the right of this graph is another graph showing the year-over-year growth of a group of merchants that are similarly situated to the merchant who is receiving the statement. For example, if the merchant is located in San Francisco, report 1104 may show how other merchants in the San Francisco area performed in a comparison between November 2009 and November 2010. Optionally, statement 1100 may include a report 1106 showing the total amount funded to the merchant's account over time.

FIGS. 11-31 illustrate various market trend reports that may be produced from point of sale terminal data. Similar reports could also be produced for the specific category of closed loop prepaid cards. Such cards are commonly referred to as gift cards and are typically usable only with merchants associated with the gift card. For example, a Wal-Mart gift card can generally only be redeemed at Wal-Mart locations or when purchasing goods from the Wal-Mart Internet site. Typical transactions that occur with such closed loop prepaid cards include activations where money is funded to an account associated with the gift card, redemptions where purchases are made using funds associated with the card, and reloads where funds are reloaded into an account of an existing prepaid card. Using POS terminal data captured when performing transactions with such closed loop prepaid cards, any of the reports described herein may be produced. Some specific examples of reports that may be produced are illustrated in FIGS. 33-36. These may be produced by any of the systems or subsystems described herein and provided to the merchant. Also similar to other embodiments, these reports or custom reports may be produced through a web portal by having the merchant login to a website and generating the reports.

Figure 33:
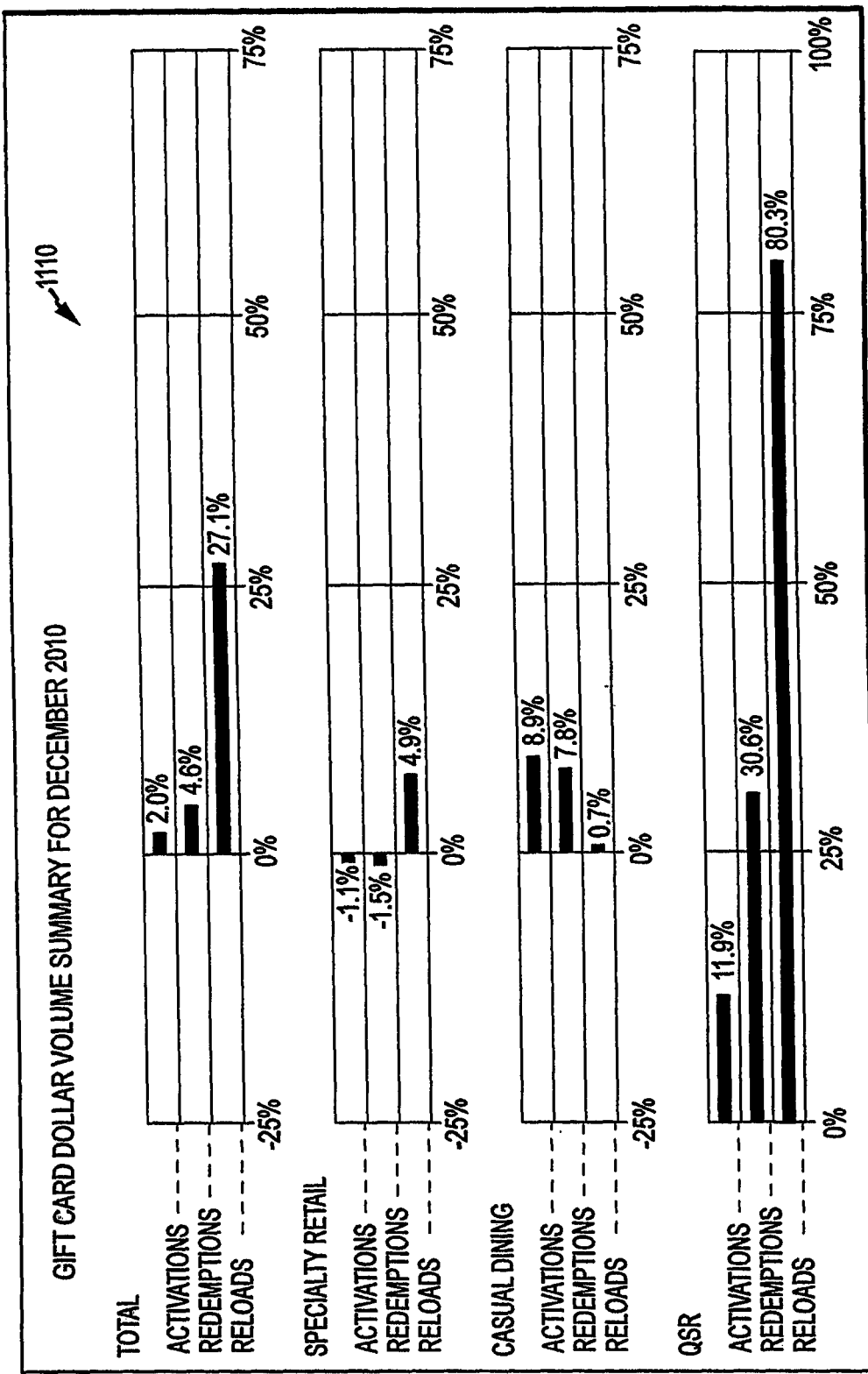
FIG. 33 illustrates a report showing dollar volume growth for closed loop prepaid payment instruments.

In FIG. 33, a market trend report 1110 is shown and illustrates a summary for December 2010 of gift card dollar volume. This is further broken down by transaction type (activations, redemptions and reloads) as well as by industry (specialty retail, casual dining and QSR). These are year-over-year growth numbers where December 2010 data is compared with December 2009 data. As shown, in December 2010, year-over-year dollar volume growth of activations was 2 percent while redemptions increase 4.6 percent and reloads increased 27.1 percent. Similar to other embodiments, explanations may be provided. Further, as illustrated in FIGS. 34-36, this data may be further expanded over a timeline to produce line graphs showing activations, redemptions and reloads by industry over a certain time frame. For example, FIG. 34 illustrates a market report 1120 showing activations by industry. The activations are shown in terms of dollar volume growth in gift card activations, transaction growth in gift card activations and average ticket growth in gift card activations. Numeric tables may also be provided showing the growth by a given quarter or by a specific month. These may be similar to the displays of other embodiments described herein where a pointing device is moved over the line graphs. Further, filtering by industry may also occur similar to other embodiments described herein. Finally, as illustrated in FIG. 34, various explanations may be provided, particularly as to how macro-economic data may be used to help explain some of the results.

FIG. 35 illustrates a market report 1130 showing gift card redemptions by industry. This may be by dollar volume growth, transaction growth and average ticket growth. Further, snapshots may be provided showing numeric values of the growth rates for specific times. Similar to the activations market report, these reports may be shown in a format similar to those previously described in connection with other embodiments. Further, filtering of any of the industries may be performed similar to other embodiments.

FIG. 36 illustrates a market trend report 1140 showing reloads by industry. Line graphs are also shown for dollar volume growth, transaction growth and average ticket growth. Further, tables are provided showing snapshots for growth percentages at specific times. Similar to the reports of FIGS. 34 and 35, these reports may be shown on a website where the snapshots may be superimposed on the line graphs and various filtering by industry may occur. Further, the explanations provided may be produced by selecting "read more" buttons to produce such displays.

Although not shown in the reports of FIGS. 11-36, it will be appreciated that the payment types could be expanded to include payment types such as those originating from mobile transactions or ecommerce transactions. These could be displayed by industry or geographic region. Further, various filtering of the payment transaction types could occur similar to other embodiments.

The POS transaction data may also be used to produce indexed values so that month to month (or other defined timeframes) data can be accurately compared or used to predict or project future sales. This type of indexing is important because it reflects whether sales are increasing or decreasing, taking out other factors that may skew the comparison, such as seasonality, holidays or other specific events that would impact spending behavior, general industry growth, and the like. Once indexed, the values may be used to predict future sales. For example, a trend in the index of previous months may be used to predict what will happen in future months, optionally reintroducing the filtered factors, such as seasonality. For example, a positively trending index in September and October could be used to predict stronger holiday sales.

The indexed sales values may be for any given timeframe, such as for a month, a quarter, a year, and the like. The indexed values are obtained from the aggregated POS transaction data and may be reported in terms of dollars, such as by total dollar volume for a given region and/or industry. However, other indexed values could also be generated, such as indexed values for the average ticket price for a given region and/or industry, the number of transactions for a given region and/or industry, and the like. Also, the comparisons between indexed values need not necessarily be based on the immediately preceding timeframe. For example, September POS transaction data could be compared with November sales. Also, it may not be necessary to use an entire month's POS data to generate an indexed sales value. For instance, three weeks worth of data could be used to generate the indexed sales value for the month. This could be done by calculating an average sales volume per day, then multiplying that value by the number of days in the month of interest. In a similar manner, the aggregated POS data need not include all POS transactions for a given region. For example, if only 50 percent of a region's POS data were captured, the indexed sales value could be doubled to account for the missing POS transactions.

Figure 37:
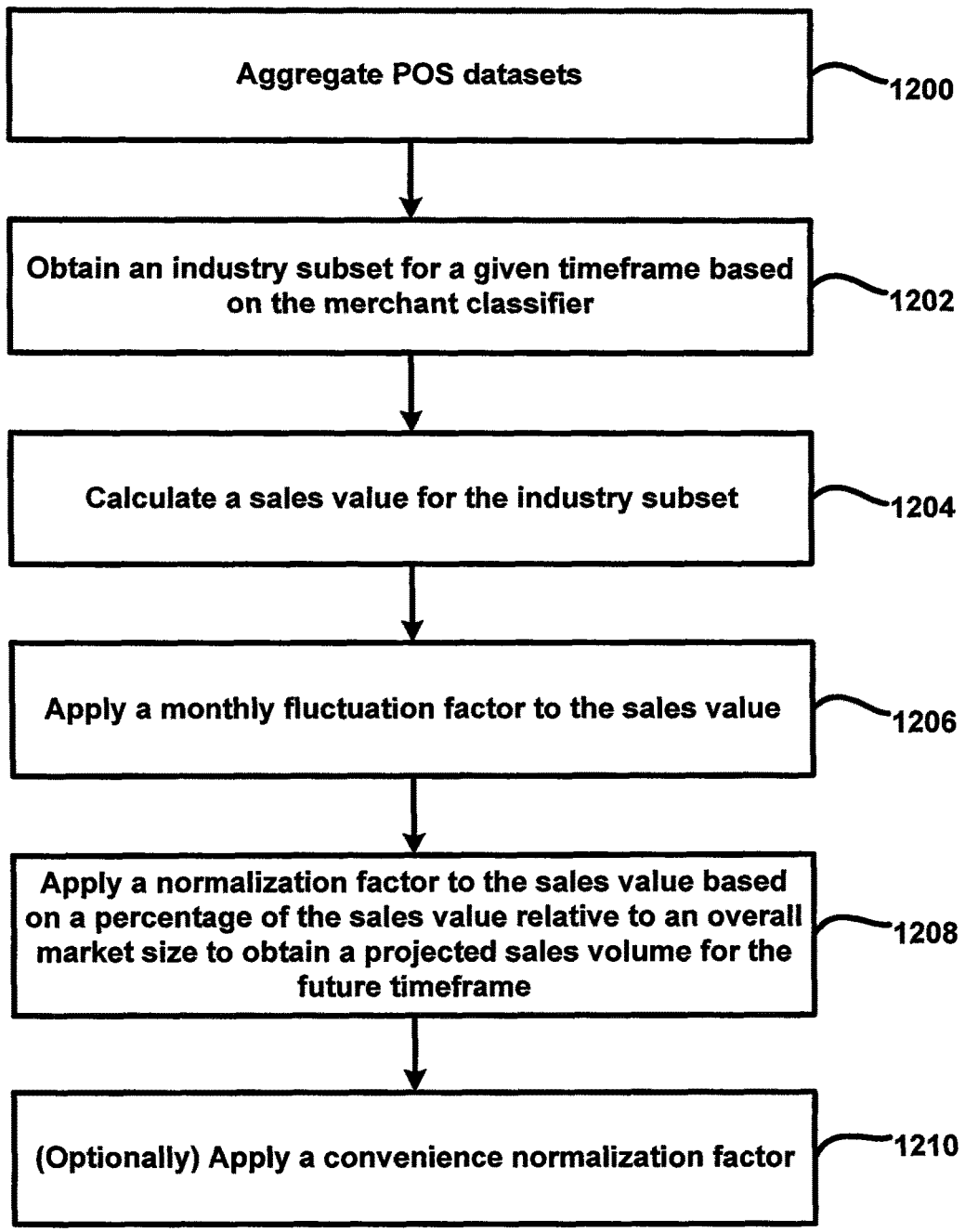
FIG. 37 is a flow chart illustrating one method for normalizing monthly sales data.

Referring now to FIG. 37, one exemplary method for obtaining an indexed sales value using POS transaction data will be described. As shown in step 1200, POS datasets are aggregated. This may be done using any of the techniques described herein. Also, the POS datasets may include any of the transaction or merchant information described herein. For example, the POS datasets could include information such as, merchant identifiers, merchant classification codes, time of the transactions, transaction amounts, and the like.

In step 1202, an industry subset is obtained for a given timeframe based on the merchant classifier. For example, the indexed sales value may wish to be generated in terms of sales in a given industry, such as electronics, restaurant, entertainment, petroleum, or any of the other classifiers described herein. To obtain the industry subset, the total sales volume for all of the POS transaction data could be filtered based on the merchant classifier so that all that remains are transactions relating to a given industry, such as electronics.

A sales value is obtained for the industry subset as shown in step 1204. The sales value may take a variety of formats, such as total dollar volume sales, number of transactions, average ticket, and the like. For example, the sales value could be the total sales in terms of dollars for electronics in a given month.

The POS transaction data may also need to be adjusted based on seasonality or other factors. This is to account for fluctuations in sales that may be related to a given month or season. For example, retail sales are generally higher in December than in October. However, after removing the influence of holiday sales, the October sales could actually be stronger. One way to predict future sales for a given timeframe may be to use transaction data from the previous year so that no seasonality issues are a factor. However, this previous data may be somewhat stale—being a year old. While data closer in time to the desired future timeframe can be used, the prediction may not be accurate unless seasonality and other factors are accounted for. As such, in step 1206 a correction for certain monthly fluctuations is made. Such fluctuations could be, for example, seasonality, holidays or other specific events that would impact spending behavior and general industry growth, and the like. The correction is made by dividing the previous sales value by a monthly correction factor. Although a variety of monthly factors could be used, one type of monthly correction factor is calculated by using a time series of historical daily data to project the expected monthly fluctuation factor. This historical daily data may be obtained from the POS transaction data, such as total daily sales, average ticket price, and the like as described herein, and may be for a given industry segment, classification, or the like as described herein. Additionally, seasonal events (such as holidays and other events) may be taken into account for a given month. All fluctuation factors may be balanced against a norm of 1, so a fluctuation factor less than 1 suggests a month will have less spend than the average month while a fluctuation factor greater than 1 suggests a month will have more spend than the average month. The time series of historical daily data may be analyzed in a variety of ways, such as by using a simple line graph over multiple days with a best line fit (also referred to as least squares). Other models that may be used include those such as ARIMA (autoregressive integrated moving average), a seasonal ARIMA, and the like.

In step 1208, a normalization factor may be applied to the sales value based on a percentage of the sales value relative to an overall market size to obtain a projected sales volume for the future timeframe. For example, the aggregated POS transaction data may constitute only a percentage of all POS transaction for a given market and/or geographical region. As such, the sales value could be increased to accommodate for this fact. For instance, if the aggregated POS transaction data accounted for only half of the sales within a given region, then the sales value could be doubled.

Optionally, another type of normalization factor may be applied to scale the sales value as shown in step 1210. This could be simply to index the predicted value to a certain scale, such as from 1 to 100. This is merely a convenience factor to permit reporting in an easy to understand value.

As one specific, non-limiting example, the aggregated POS data may be filtered based on the electronic industry for February 2011. The aggregated POS data may be obtained from POS terminals that account for about 20.95 percent of all POS transactions in the electronics industry in the United States. The value of these transactions could be, for example, $1,640,677,066. The February 2011 spend is expected to be 94.2 percent of an "average month". In other words, the monthly factor is 0.942. Thus, the electronic retail sales index for February 2011 could be calculated by the following formula: $1,640,677,006÷0.942÷0.2095=250,000,000. A convenience factor may be applied for simplicity so that the index is in a smaller range. Once scaled, the electronics retail index for February 2011 would be 66.51.

One advantage of such an index is that so sales comparison may be made month to month. In other words, February 2011 may have an index of 66.51 while January 2011 has an index of 62.3. This means that in the electronics industry, sales were stronger in February 2011 that in January 2011, eliminating factors such as seasonality, holidays or other specific events that would impact spending behavior and general industry growth, and the like.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for normalizing point of sale (POS) sales data, the method comprising:
    aggregating, by a computer system, point of sale (POS) datasets from a plurality of POS terminals, each POS terminal being configured to collect transaction data as a function of transactions effectuated via the POS terminal, wherein the POS datasets for each transaction comprise a transaction amount, a merchant classifier, and a transaction time, and wherein the POS datasets comprise a percentage of transactions effectuated within an overall market;
    obtaining, by the computer system, an industry subset of the aggregated POS datasets for a given timeframe based on the merchant classifier, wherein the industry subset comprises transactions for a given industry;
    calculating a reliable portion of the industry subset, the reliable portion comprising only data having a statistically insignificant variability from a baseline;
    calculating, by the computer system, a sales value for the reliable portion of the industry subset;
    applying, by the computer system, a time-based fluctuation factor to the sales value to account for sales fluctuations that are related at least in part to seasonality;
    applying a normalization factor to the sales value based on a percentage of the sales value in terms of dollars relative to a size of the overall market to obtain an indexed sales value for the given timeframe;
    generating an interactive formatted graphical report showing one or more of a trend of the indexed sales value or a projected sales volume based on the indexed sales value, wherein the interactive formatted graphical report is automatically formatted using auto-graphics zones, and wherein the interactive formatted graphical report comprises a plurality of selectable views with each of the plurality of selectable views displaying a different subset of data when selected; and
    transmitting the interactive formatted graphical report over a wireless communication channel to a user device;
    wherein the interactive formatted graphical report causes the interactive formatted graphical report to display on the user device such that each of the plurality of selectable views is selectable by the user device to show each of the different subsets of data;
    wherein the time-based fluctuation factor is calculated by using a time series of historical daily data from the POS datasets, and wherein the time-based fluctuation factor is further calculated by selecting a previous time frame, calculating daily sales for the reliable portion of the industry subset for at least some days in the time frame, and performing a statistical analysis of the daily sales for those days to obtain the time-based fluctuation factor.

2. A method as in claim 1, further comprising comparing the indexed sales value for the given timeframe to indexed sales values of other timeframes.

3. A method as in claim 1, further comprising using the indexed sales value to predict sales during a future timeframe.

4. A method as in claim 1, wherein the indexed sales value is in dollars and is calculated by dividing the sales value by the time-based fluctuation factor.

5. A method as in claim 1, further comprising applying a scaling factor to the indexed sales value.

6. A method as in claim 1, wherein the given timeframe comprises a calendar month, and wherein the fluctuation factor is a monthly fluctuation factor, and wherein the fluctuation factor is balanced against a norm of 1 such that a fluctuation factor less than 1 suggests a month will have less spend than an average month and a fluctuation factor greater than 1 suggests a month will have more spend than the average month.

7. A method as in claim 1, wherein the statistical analysis performed when calculating the time-based fluctuation factor comprises one of: a least squares analysis, an autoregressive integrated moving average, and a seasonal autoregressive integrated moving average.

8. A system for projecting future sales data, the system comprising:
    an aggregation subsystem, communicatively coupled with a point of sale (POS) network comprising a plurality of POS terminals, and configured to aggregate POS datasets from the plurality of POS terminals, each POS terminal being configured to collect transaction data as a function of transactions effectuated via the POS terminal, wherein the POS datasets for each transaction comprise a transaction amount, a merchant classifier, and a transaction time, and wherein the POS datasets comprise a percentage of transactions effectuated within an overall market;

a data storage subsystem, communicatively coupled with the aggregation subsystem, and configured to store the aggregated POS data from the plurality of POS terminals;

a processing subsystem, communicatively coupled with the data storage subsystem, and configured to project sales data by:

obtaining an industry subset of the aggregated POS datasets for a given timeframe based on the merchant classifier, wherein the industry subset comprises transactions for a given industry;

calculating a reliable portion of the industry subset, the reliable portion comprising only data having a statistically insignificant variability from a baseline;

calculating a sales value for the reliable portion of the industry subset;

applying a time-based fluctuation factor to the sales value to account for sales fluctuations that are related at least in part to seasonality, wherein the time-based fluctuation factor is calculated by using a time series of historical daily data from the POS datasets, and wherein the time-based fluctuation factor is further calculated by selecting a previous time frame, calculating daily sales for the reliable portion of the industry subset for at least some days in the time frame, and performing a statistical analysis of the daily sales for those days to obtain the time-based fluctuation factor;

applying a normalization factor to the sales value based on a percentage of the sales value in terms of dollars relative to a size of the overall market to obtain an indexed sales value for the given timeframe;

generating an interactive formatted graphical report showing one or more of a trend of the indexed sales value or a projected sales volume based on the indexed sales value, wherein the interactive formatted graphical report is automatically formatted using auto-graphics zones, and wherein the interactive formatted graphical report comprises a plurality of selectable views with each of the plurality of selectable views displaying a different subset of data when selected; and transmitting the interactive formatted graphical report over a wireless communication channel to a user device;

wherein the interactive formatted graphical report causes the interactive formatted graphical report to display on the user device such that each of the plurality of selectable views is selectable by the user device to show each of the different subsets of data.

9. A system as in claim 8, wherein the processing subsystem is further configured to compare the indexed sales value for the given timeframe to indexed sales values of other timeframes.

10. A system as in claim 8, wherein the processing subsystem is further configured to use the indexed sales value to predict sales during a future timeframe.

11. A system as in claim 8, wherein the processing subsystem is further configured to calculate the indexed sales value in dollars.

12. A system as in claim 8, wherein the processing subsystem is further configured to apply a scaling factor to the indexed sales value.

13. A system as in claim 8, wherein the given timeframe comprises a calendar month, and wherein the fluctuation factor is a monthly fluctuation factor.

14. A system as in claim 8, wherein the time-based fluctuation factor is calculated by using a time series of historical daily data from the POS datasets.

15. A system for projecting sales data, the system comprising:

a data storage subsystem configured to store aggregated point of sale (POS) data from a plurality of POS terminals that are communicatively coupled with a POS network comprising a plurality of POS terminals, wherein the POS data comprises, for each transaction occurring at one of the POS terminals, a transaction amount, a merchant classifier, and a transaction time, and wherein the POS datasets comprise a percentage of transactions effectuated within an overall market;

a processing subsystem, communicatively coupled with the data storage subsystem, and configured to project sales data by:

obtaining an industry subset of the aggregated POS data for a given timeframe based on the merchant classifier, wherein the industry subset comprises transactions for a given industry;

calculating a reliable portion of the industry subset, the reliable portion comprising only data having a statistically insignificant variability from a baseline;

calculating a sales value for the reliable portion of the industry subset;

applying a time-based fluctuation factor to the sales value to account for fluctuations between the given timeframe and other timeframes, wherein the fluctuation factor is balanced against a norm of 1 such that a fluctuation factor less than 1 suggests a month will have less spend than an average month and a fluctuation factor great than 1 suggests a month will have more spend than the average month;

applying a normalization factor to the sales value based on a percentage of the sales value in terms of dollars relative to a size of the overall market to obtain an indexed sales value for the given timeframe;

using the indexed sales value to predict a projected sales value for a future timeframe;

generating an interactive formatted graphical report showing the projected sales value, wherein the interactive formatted graphical report is automatically formatted using auto-graphics zones, and wherein the interactive formatted graphical report comprises a plurality of selectable views with each of the plurality of selectable views displaying a different subset of data when selected; and transmitting the interactive formatted graphical report over a wireless communication channel to a user device;

wherein the interactive formatted graphical report causes the interactive formatted graphical report to display on the user device such that each of the plurality of selectable views is selectable by the user device to show each of the different subsets of data.

16. A system as in claim 15, wherein the processing subsystem is further configured to calculate the indexed sales value in dollars.

17. A system as in claim 15, wherein the processing subsystem is further configured to apply a scaling factor to the indexed sales value.

18. A system as in claim 15, wherein the given timeframe comprises a calendar month, and wherein the fluctuation factor is a monthly fluctuation factor.

19. A system as in claim 18, wherein the monthly fluctuation factor is calculated by using a time series of historical daily data from the POS datasets.

\* \* \* \* \*